(12) United States Patent
Wang et al.

(10) Patent No.: US 12,489,551 B2
(45) Date of Patent: Dec. 2, 2025

(54) INTERFACE, ELECTRONIC DEVICE, AND COMMUNICATION SYSTEM

(71) Applicant: HUAWEI TECHNOLOGIES CO., LTD., Guangdong (CN)

(72) Inventors: Xinyuan Wang, Beijing (CN); Xiang He, Beijing (CN); Hao Ren, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 18/648,992

(22) Filed: Apr. 29, 2024

(65) Prior Publication Data

US 2024/0283565 A1    Aug. 22, 2024

Related U.S. Application Data

(63) Continuation of application No. 18/147,557, filed on Dec. 28, 2022, now abandoned, which is a
(Continued)

(30) Foreign Application Priority Data

Jun. 29, 2020    (CN) .......................... 202010605324.3
Jan. 14, 2021    (CN) .......................... 202110049548.5

(51) Int. Cl.
*H04L 1/00*    (2006.01)
*G06F 13/42*   (2006.01)
*H04L 69/324*  (2022.01)

(52) U.S. Cl.
CPC ........ *H04L 1/0042* (2013.01); *G06F 13/4221* (2013.01); *H04L 1/004* (2013.01);
(Continued)

(58) Field of Classification Search
CPC ..... H04L 1/0042; H04L 1/004; H04L 1/0041; H04L 1/0043; H04L 1/0045;
(Continued)

(56) References Cited

U.S. PATENT DOCUMENTS 5,742,602 A    4/1998    Bennett
9,235,540 B1   1/2016    Langhammer et al.
(Continued)

FOREIGN PATENT DOCUMENTS

CN    103875205 A    6/2014
CN    110875796 A    3/2020
(Continued)

OTHER PUBLICATIONS

David Law, IEEE 802.3 Ethernet, Jan. 2010, IEEE, Version 1.0, pp. 1-31. (Year: 2010).
(Continued)

*Primary Examiner* — John J Tabone, Jr.
(74) *Attorney, Agent, or Firm* — WOMBLE BOND DICKINSON (US) LLP

(57) ABSTRACT

An interface includes a first functional part and a second functional part. The first functional part is configured to implement processing dependent on a medium access control (MAC) rate, and the second functional part is configured to implement processing independent of the MAC rate.

29 Claims, 34 Drawing Sheets

Related U.S. Application Data continuation of application No. PCT/CN2021/080048, filed on Mar. 10, 2021.

(52) U.S. Cl.
CPC .......... *H04L 1/0041* (2013.01); *H04L 1/0043* (2013.01); *H04L 1/0045* (2013.01); *H04L 1/0057* (2013.01); *H04L 1/0061* (2013.01); *H04L 1/0064* (2013.01); *H04L 1/0067* (2013.01); *H04L 1/0071* (2013.01); *H04L 69/324* (2013.01)

(58) Field of Classification Search
CPC ... H04L 1/0057; H04L 1/0061; H04L 1/0064; H04L 1/0067; H04L 1/0071; H04L 69/324; G06F 13/4221
See application file for complete search history.

(56) References Cited

U.S. PATENT DOCUMENTS

| | | | |
|---|---|---|---|
| 9,461,941 B2* | 10/2016 | Mehta | H04L 49/30 |
| 9,692,715 B2 | 6/2017 | Krakirian et al. | |
| 10,212,260 B2* | 2/2019 | Sun | H04L 69/14 |
| 10,382,167 B2 | 8/2019 | Gareau et al. | |
| 2009/0175205 A1 | 7/2009 | Mathew et al. | |
| 2014/0376566 A1* | 12/2014 | Mehta | H04L 49/352 |
| | | | 370/419 |
| 2015/0229440 A1* | 8/2015 | Bansal | H04L 65/70 |
| | | | 714/776 |
| 2015/0341277 A1 | 11/2015 | Gravel et al. | |
| 2016/0087753 A1 | 3/2016 | Ran et al. | |
| 2016/0191277 A1 | 6/2016 | Li et al. | |
| 2016/0197743 A1 | 7/2016 | Su et al. | |
| 2016/0241462 A1 | 8/2016 | Wang et al. | |
| 2017/0005742 A1 | 1/2017 | Gareau et al. | |
| 2017/0005901 A1 | 1/2017 | Gareau | |
| 2017/0005949 A1 | 1/2017 | Gareau | |
| 2017/0006360 A1 | 1/2017 | Gareau | |
| 2017/0093757 A1 | 3/2017 | Gareau et al. | |
| 2017/0171163 A1 | 6/2017 | Gareau et al. | |
| 2018/0041332 A1* | 2/2018 | Yang | H04L 7/048 |
| 2018/0167160 A1 | 6/2018 | Gareau et al. | |
| 2019/0140771 A1* | 5/2019 | Basso | H04L 25/14 |
| 2019/0173856 A1 | 6/2019 | Gareau et al. | |
| 2020/0007255 A1 | 1/2020 | Gareau et al. | |
| 2020/0021313 A1* | 1/2020 | Lu | H04L 1/0065 |
| 2020/0076651 A1* | 3/2020 | Sun | H04L 25/03885 |
| 2020/0083974 A1 | 3/2020 | Dalmia | |
| 2021/0013998 A1* | 1/2021 | Sun | H04L 25/0272 |
| 2021/0075540 A1* | 3/2021 | Lu | H04L 1/0042 |
| 2021/0273678 A1* | 9/2021 | Lin | H04L 7/0079 |
| 2023/0133314 A1* | 5/2023 | Wang | H04L 1/0067 |
| | | | 714/776 |
| 2024/0283565 A1* | 8/2024 | Wang | G06F 13/4221 |

FOREIGN PATENT DOCUMENTS

| | | |
|---|---|---|
| CN | 106464427 B | 4/2020 |
| JP | 2017204829 A | 11/2017 |

OTHER PUBLICATIONS

IEEE Draft P802.3bs/D1.4,:"119. Physical Coding Sublayer (PCS) for 64B/66B, type 200G8ASE-R and400G8ASE-R"Draft Amendment to IEEE Std 802.3-2015 IEEE P802.3bs 400 GB/s Ethernet Task Force, Apr. 7, 2016, XP68109143A, total 40 pages.

* cited by examiner

INTERFACE, ELECTRONIC DEVICE, AND COMMUNICATION SYSTEM

CROSS-REFERENCE TO RELATED APPLICATIONS

This application is a continuation of U.S. patent application Ser. No. 18/147,557 filed on Dec. 28, 2022, which is a continuation of International Application No. PCT/CN2021/080048, filed on Mar. 10, 2021, which claims priority to Chinese Patent Application No. 202010605324.3, filed on Jun. 29, 2020 and Chinese Patent Application No. 202110049548.5, filed on Jan. 14, 2021. All of the aforementioned applications are hereby incorporated by reference in their entireties.

TECHNICAL FIELD

This application relates to an interface, an electronic device, and a communication system.

BACKGROUND

In a current evolution process of Ethernet interfaces, a new interface rate needs to be compatible with previous electrical interfaces and previous optical interfaces that are with a plurality of rates. However, utilization of performance of a transmission medium is low in a solution of a logical layer of the Ethernet interface.

SUMMARY

Embodiments of this application provide an interface, an electronic device, and a communication system. According to technical solutions in embodiments of this application, performance of an optical module can be fully utilized. According to a first aspect, an interface includes a functional part 1 and a functional part 2. The functional part 1 is configured to implement processing dependent on a medium access control (MAC) rate, and the functional part 2 is configured to implement processing independent of the MAC rate.

In some embodiments, the interface is an Ethernet interface.

In some embodiments, the functional part 1 includes a media independent interface.

In some embodiments, the functional part 1 includes a MAC module, a reconciliation sublayer RS module, and an encode and rate matching module at a physical coding sublayer (PCS).

In some embodiments, the functional part 2 includes one or more functional units, where the one or more functional units include a first functional unit, and the first functional unit includes a transcode module, a scramble module, an alignment marker insertion module, a forward error correction (FEC) module, a physical medium attachment sublayer (PMA) module, and a physical medium dependent (PMD) module.

In some embodiments, the functional part 2 includes one PMA/PMD module and one or more functional units, the one or more functional units include a second functional unit, the second functional unit includes a transcode module, a scramble module, an alignment marker insertion module, and a forward error correction (FEC) module, and the second functional unit is coupled to the PMA/PMD module.

In some embodiments, the functional part 2 includes a first-level functional unit and a second-level functional unit that are concatenated; the first-level functional unit includes one or more first-level subunits, and at least one first-level subunit in the first-level functional unit includes a transcode module, a scramble module, an alignment marker insertion module, a forward error correction (FEC) module, and a PMA module; and the second-level functional unit includes one or more second-level subunits, and at least one second-level subunit in the second-level functional unit includes a PCS/FEC/PMA module and a PMD module.

In some embodiments, data output by FEC of a plurality of functional parts 2 is interleaved at a PMA layer.

In some embodiments, the FEC module included in the at least one first-level subunit in the first-level functional unit is configured to perform Reed-Solomon (RS) (544,514) FEC encoding and/or decoding, the FEC module included in the at least one second-level subunit in the second-level functional unit is configured to perform BCH FEC encoding and/or decoding, Reed-Solomon forward error correction (RS FEC) encoding and/or decoding, polar FEC encoding and/or decoding, low density parity check forward error correction (LDPC FEC) encoding and/or decoding, concatenated forward error correction (CFEC) encoding and/or decoding, open forward error correction (OFEC) encoding and/or decoding, or Turbo product code (TPC FEC) encoding and/or decoding. Optionally, the FEC module included in the first-level subunit is an outer-code FEC module.

In some embodiments, the interface includes an optical digital signal processor (oDSP).

In some embodiments, the FEC module is a concatenated FEC module, and the second-level functional unit further includes an inner-code encode module, configured to perform concatenated inner-code encode on data entering the second-level functional unit. Optionally, the second-level functional unit further includes a decode module, configured to perform concatenated FEC code inner-code decoding on the data entering the second-level functional unit.

In some embodiments, the functional part 1 includes a MAC module, a reconciliation sublayer (RS) module, an encode and rate matching module at a physical coding sublayer (PCS), and a transcode module.

In some embodiments, the functional part 2 includes one or more functional units, the one or more functional units include a third functional unit, and the third functional unit includes a scramble module, an alignment marker insertion module, a forward error correction (FEC) module, and a physical medium attachment sublayer (PMA)/physical medium dependent (PMD) module.

In some embodiments, the functional part 2 includes one or more functional units, the one or more functional units include a fourth functional unit, and the fourth functional unit includes a transcode module, a scramble module, an alignment marker insertion module, a forward error correction (FEC) module, a physical medium attachment sublayer (PMA) module, and a physical medium dependent (PMD) module.

In some embodiments, the functional part 1 includes a MAC module, a reconciliation sublayer (RS) module, an encode and rate matching module at a physical coding sublayer (PCS), a transcode module, and a scramble module.

In some embodiments, the functional part 2 includes one or more functional units, the one or more functional units include a fifth functional unit, and the fifth functional unit includes an alignment marker insertion module, a forward error correction (FEC) module, and a physical medium attachment sublayer (PMA)/physical medium dependent (PMD) module.

In some embodiments, the interface is an Ethernet interface with a rate of 800 Gb/s or 1.6 Tb/s.

In some embodiments, the transcoding is an IEEE 802.3-2018-compliant 64B/66B-to-256B/257B transcoding.

In some embodiments, a quantity of functional units included in the functional part 2 is 1, 2, 3, 4, 5, 8, or 16.

In some embodiments, the functional part 2 is coupled to the functional part 1 through a data block distribution module.

According to another aspect, an electronic device includes the interface according to any one of the foregoing embodiments.

According to another aspect, a communication system includes a transmitter-side device and a receiver-side device. The transmitter-side device and/or the receiver-side device are/is an electronic device.

In some embodiments, an interface includes a general functional unit and one or more special functional units. The general functional unit includes one or more general functional modules. The special functional unit includes one or more specific functional modules.

In some embodiments, the interface is an Ethernet interface.

In some embodiments, the general functional unit includes a functional module closely dependent on a medium access control (MAC) rate.

In some embodiments, the special functional unit includes a functional part dependent on a rate.

In some embodiments, the general functional unit includes a media independent interface.

In some embodiments, the general functional unit includes a medium access control (MAC) unit, a reconciliation sublayer (RS) unit, and an encode and rate matching module at a PCS layer.

In some embodiments, the special functional unit includes a transcode unit, a scramble unit, an alignment lock unit, a forward error correction (FEC) encode/decode unit, and a physical medium attachment sublayer (PMA)/physical medium dependent (PMD) unit.

In some embodiments, the special functional unit includes a plurality of functional subunits and one PMA/PMD unit. Each functional subunit includes a transcode subunit, a scramble subunit, an alignment lock processing subunit, and an FEC subunit. The plurality of functional subunits are coupled to the PMA/PMD unit.

In some embodiments, the special functional unit includes a first level and a second level. The first level includes one or more first-level subunits, and each first-level subunit includes a transcode subunit, a scramble subunit, an alignment lock subunit, an FEC subunit, and a PMA subunit. The second level includes one or more second-level subunits, and each second-level subunit includes a PCS/FEC/PMA subunit and a PMD subunit.

In some embodiments, data output by FEC of a plurality of special functional units is interleaved at a PMA layer.

In some embodiments, the FEC in the first level is configured to perform RS (544,514) FEC encoding, and the FEC in the second level is configured to perform BCH FEC encoding, polar FEC, LDPC FEC, CFEC, OFEC, or TPC FEC encoding.

In some embodiments, the interface includes an optical digital signal processor (oDSP).

In some embodiments, the FEC is concatenated FEC, and the second level further includes an inner-code decode unit, configured to perform concatenated code inner-code decoding on data entering the second level (where decoding is mainly an error correction function, and overheads are caused by removing inner-code encoding after the decoding is completed).

In some embodiments, the PCS/FEC/PMA in the second level is PCS/CFEC/OFEC/PMA.

In some embodiments, the general functional unit includes MAC, an RS, an encode and rate matching module at a PCS layer, and a transcode module.

In some embodiments, the special functional unit includes scramble, AM, FEC, and PMA/PMD.

In some embodiments, the special functional unit includes a plurality of functional subunits, and each functional subunit includes a scramble subunit, an alignment lock subunit, an FEC subunit, a PMA subunit, and a PMD subunit.

In some embodiments, the general functional unit includes a MAC unit, an RS unit, an encode and rate matching module at a PCS layer, a transcode module, and a scramble module.

In some embodiments, the special functional unit includes an alignment lock unit, an FEC unit, and a PMA/PMD unit.

In some embodiments, the FEC subunit is an 800 Gb/s Ethernet interface.

The interface according to any one of claims 1 to 20, wherein transcoding is an IEEE 802.3-2018-compliant 64B/66B-to-256B/257B transcoding.

In some embodiments, a quantity of special functional units included in the interface is 1, 2, 4, 5, 8, or 16.

In some embodiments, the general functional unit is coupled to the special functional unit through a data block distribution module.

According to another aspect, an electronic device includes the interface according to any one of the foregoing embodiments.

According to another aspect, a network system includes a transmitter-side device and a receiver-side device. The transmitter-side device and/or the receiver-side device are/is an electronic device.

According to another aspect, a computer-readable storage medium includes a computer-readable program or instructions. When the computer-readable program or the instructions are run, a device is enabled to perform a function of the interface according to any one of the foregoing embodiments.

According to another aspect, a computer program product includes a computer-readable program or instructions. When the computer-readable program or the instructions are run, a device is enabled to perform a function of the interface according to any one of the foregoing embodiments.

According to another aspect, a transmission method includes a functional operation of the interface according to any one of the foregoing embodiments.

BRIEF DESCRIPTION OF DRAWINGS

FIG. 2A and FIG. 2B-1 and FIG. 2B-2 are a schematic diagram of other interface composition and communication;

DESCRIPTION OF EMBODIMENTS

In embodiments, a "functional part 1" is also referred to as a "general functional part" or a "general functional unit", a "functional part 2" is also referred to as a "special functional part", and a "functional unit 2" is also referred to as a "special functional part". A plurality of functional units in the "functional part 2" are also referred to as "special functional units". For example, the "functional part 2" includes n functional units: a first functional unit, a second functional unit, . . . , an $n^{th}$ functional unit, and an $i^{th}$ functional unit is also referred to as an $i^{th}$ special functional unit, where i is a positive integer, n is a positive integer greater than 1, and $1 \leq i \leq n$.

In this application, a media independent interface (full English name: media independent interface) for 10 Mb/s operation and 100 Mb/s operation is referred to as an MII, a media independent interface for 1000 Mb/s operation is referred to as a GMII, and a media independent interface for 10 Gb/s operation is referred to as an XGMII. xMIIs in this application may include a plurality of types of Ethernet interfaces such as a reduced MII (RMII), a serial MII (SMII), a serial sync MII (SSMII), a source synchronous SMII (S3MII), a gigabit MII (GMII), a reduced GMII (RGMII), a serial GMII (SGMII), a 10 bit interface (TBI), a reduced TBI (RTBI), a 10 gigabit MII (XGMII), a 25 gigabit MII, a 40 gigabit MII, a 50 gigabit MII, a 100 Gb/s MII (CGMII), a 200 Gb/s MII (200GMII), a 400 Gb/s MII (400GMII), an 800 Gb/s MII, and a 1.6 terabit MII.

A 200 GbE/400 GbE rate standard implements a new-generation Ethernet rate standard based on a single-lane electrical interface 50G four-level pulse amplitude modulation (four-level pulse amplitude modulation, PAM4) technology. In study of a next-generation 800 GbE/1.6 TbE standard, as a single-lane electrical interface rate is increased to 100G PAM4 or 200G PAM-N (using N-level pulse amplitude modulation PAM-N, where N=4, 6, or 8), a next-generation rate may support the electrical interface rate and may need to be compatible with a previous-generation 50 Gb/s per lane electrical interface. Evolution paths for an optical interface may have many possibilities with different rates per wavelength. For example, each wavelength may carry a 50 Gb/s, 100 Gb/s, 200 Gb/s, 400 Gb/s, or 800 Gb/s rate.

Figure 1:
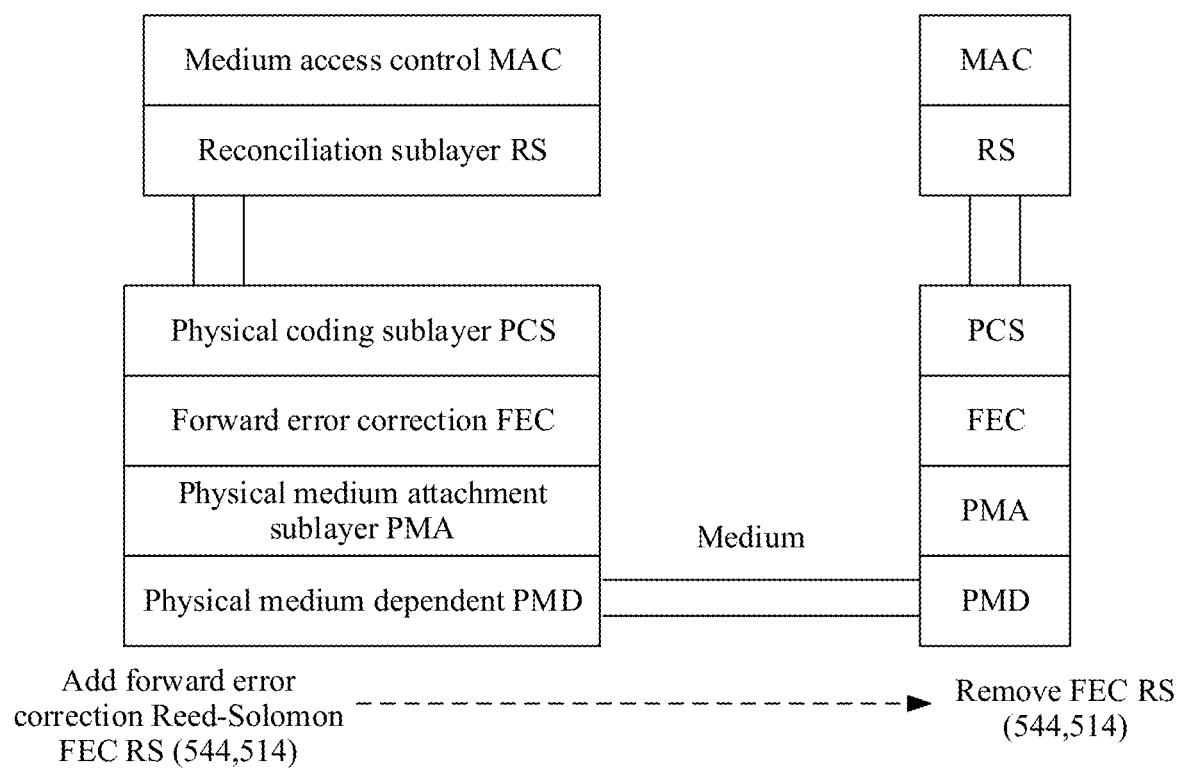
FIG. 1 is a schematic diagram of interface composition and communication.
Figure 2A:
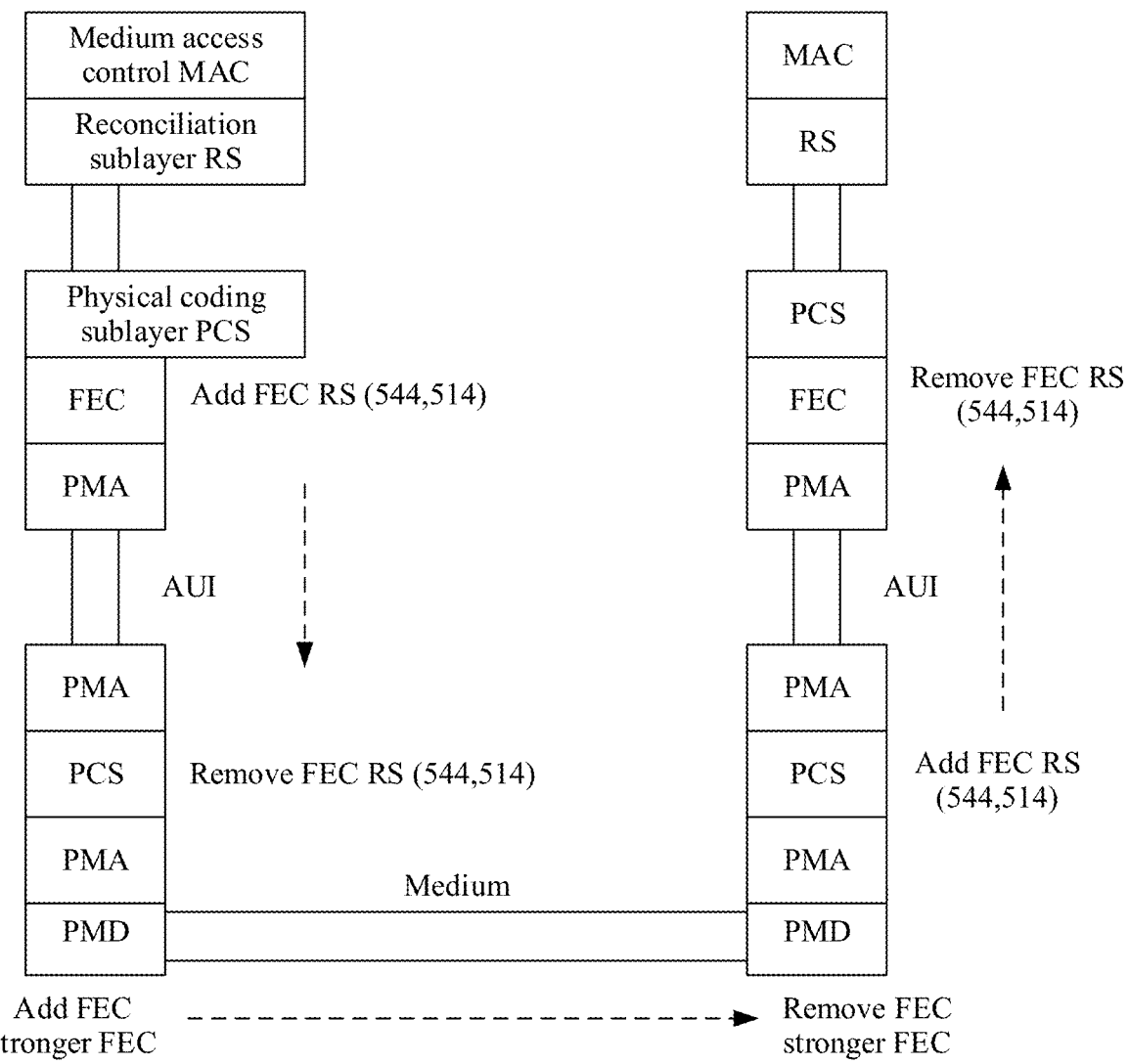
Figures 1, 2B:
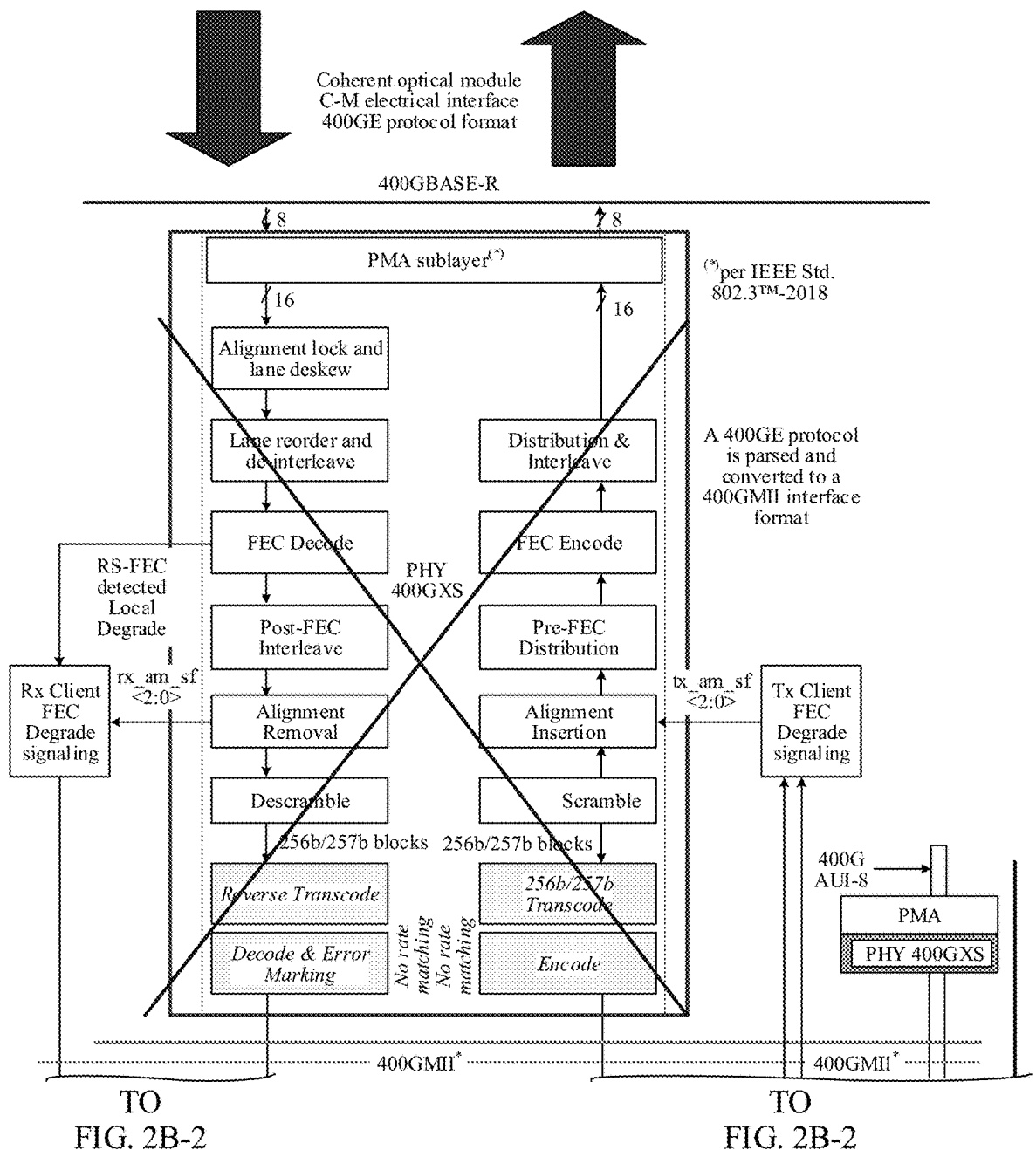
Figures 2, 2B:
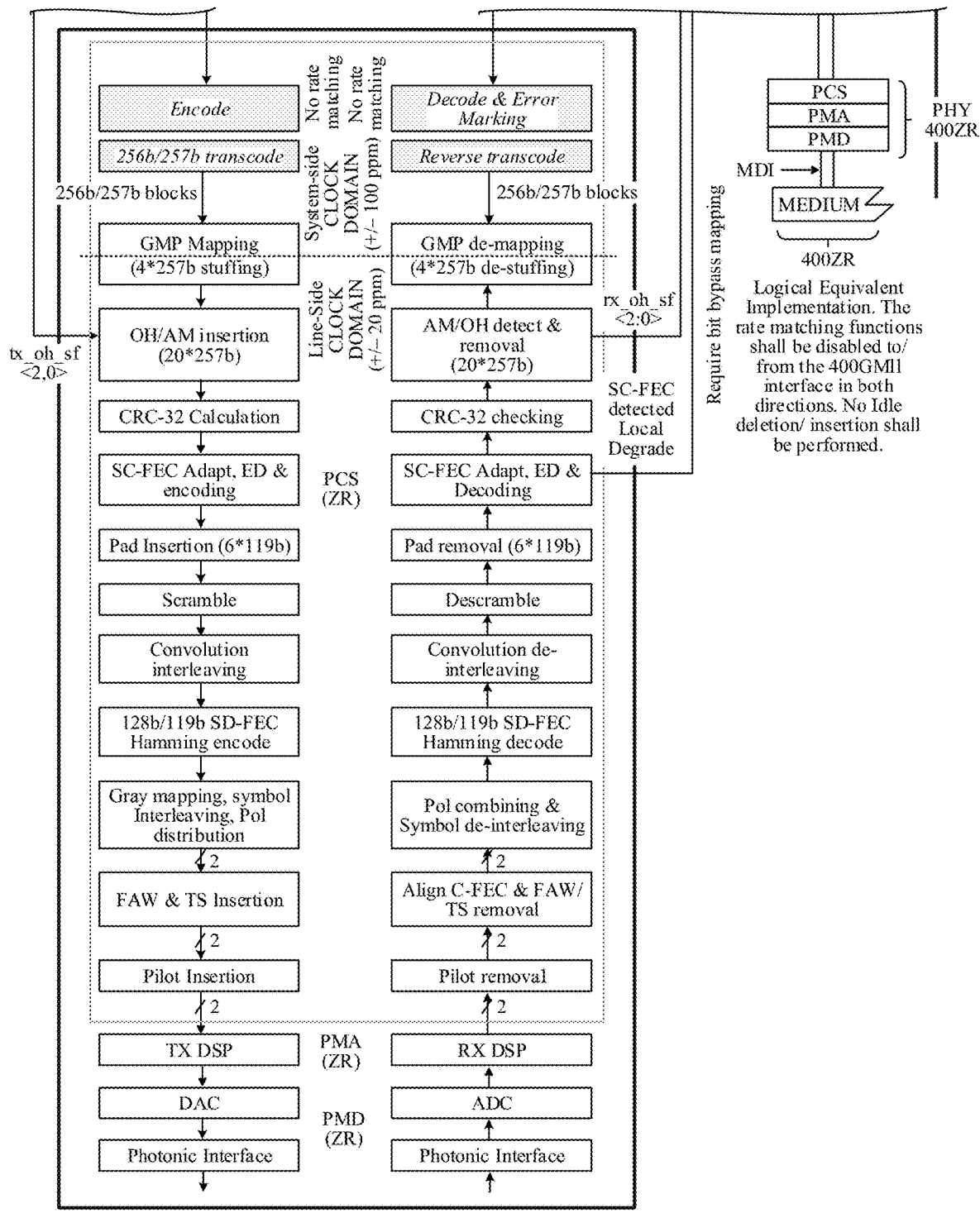

In a plurality of current solutions of logical layers of Ethernet interfaces, logical layers of interfaces with different rates have specific common features and clear differences. These differences make it difficult to share hardware resources between interfaces of different rates, or to implement interworking by binding a plurality of low-rate Ethernet interfaces to one high-rate interface module. For example, on a 200 GbE/400 GbE interface, an architecture of logical layers in FIG. 1 is used. In FIG. 1, a device interface includes a medium access control (MAC) layer, a reconciliation sublayer (RS), a physical coding sublayer (PCS), forward error correction (FEC), a physical medium attachment sublayer (PMA), and a physical medium dependent (PMD) sublayer. Data of a transmitter-side device is processed and then sent from PMD sublayer to PMD sublayer of a receiver-side device, and is processed by a plurality of submodules and then arrives at a MAC layer. The PCS sublayer is configured to implement functions such as 64B/66B encoding and decoding, transcoding, scrambling, alignment marker (AM) insertion, and FEC encoding and decoding. The PMA sublayer is configured to implement functions such as clock recovery, carrier detection, and PAM4 modulation/demodulation. The PMD sublayer is configured to perform parallel-to-serial/serial-to-parallel conversion on received data, and modulate a digital signal to a line for transmission. At an FEC sublayer of the PCS layer, introduction of new interleaving FEC (for example, Reed-Solomon RS (544,514) FEC) causes a heavy redevelopment workload due to a great difference between a logical layer of the new interleaving FEC and a 100 GbE solution. For another example, a logical layer defined in 400G-ZR uses architectures shown in FIG. 2A and FIG. 2B-1 and FIG. 2B-2. In the architectures of the logical layers, an optical module that supports 400G-ZR (80 km) cannot support 2*200 GbE interfaces because a host-side interface is fixed to a 400G AUI (attachment unit interface, AUI).

Figure 3:
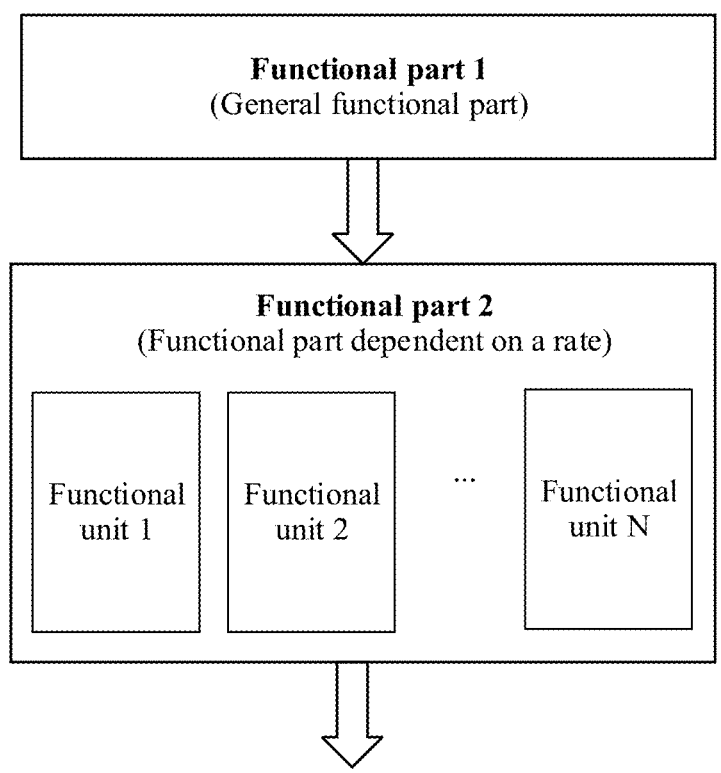
FIG. 3 is a schematic diagram of an architecture of an interface according to an embodiment.

The inventor has found through research that a change of the logical layer that is caused by cross-generation Ethernet rates mainly lies in the functions of the PCS. Above the PCS, data output by the RS is very similar. If similar parts are distinguished from dissimilar parts, and the dissimilar parts are modularized in a direction parallel to a data flow direction, high resource reuse can be implemented, development costs can be reduced, and economic advantages can emerge. According to embodiments of this application, a current Ethernet architecture is divided, based on a functional part dependent on a specific rate and a functional part dependent on a sub-rate corresponding to specific PMD, into two parts: a functional part 1 and a functional part 2. Refer to FIG. 3. A functional part 1 is a general functional part, and the functional part 1 includes a functional module closely dependent on a MAC rate, for example, an RS module and a module that needs to perform rate matching. In some embodiments, the functional part 1 further includes an xMII interface directly dependent on the rate. A functional part 2 includes a functional part independent of the rate. For example, the functional part 2 includes one or more functional units: a functional unit 1, a functional unit 2, . . . , and a functional unit n. The functional part 2 may include a PCS/PMA layer function that performs processing based on a data flow. PMD is dependent on a medium, and may be used as a part of the functional part 2 based on a specific implementation, or it is considered that the PMD is independent of a protocol and is used as a functional component independent of the functional part 1 and the functional part 2.

Herein, a reference standard for selecting a demarcation point between the two functional parts may include one or more of the following: (1) Downward selection is performed as much as possible, so that there are as many general functional parts as possible after cross-generation rates emerge, to save costs. (2) A design of data distribution between the two functional parts is simplified as much as possible, so that a small unit is used for data block distribution. (3) A unit in the functional part 2 is made to have a complete function as much as possible, including a necessary verification function, to ensure reliability. (4) Complexity of a specific implementation and control of chip resources are considered comprehensively, to achieve an optimal design. For (4), in some scenarios, for example, in an ultra-high-speed connection scenario, it is not suitable to use a conventional parallel media independent interface as a connection function interface.

Figure 4A:
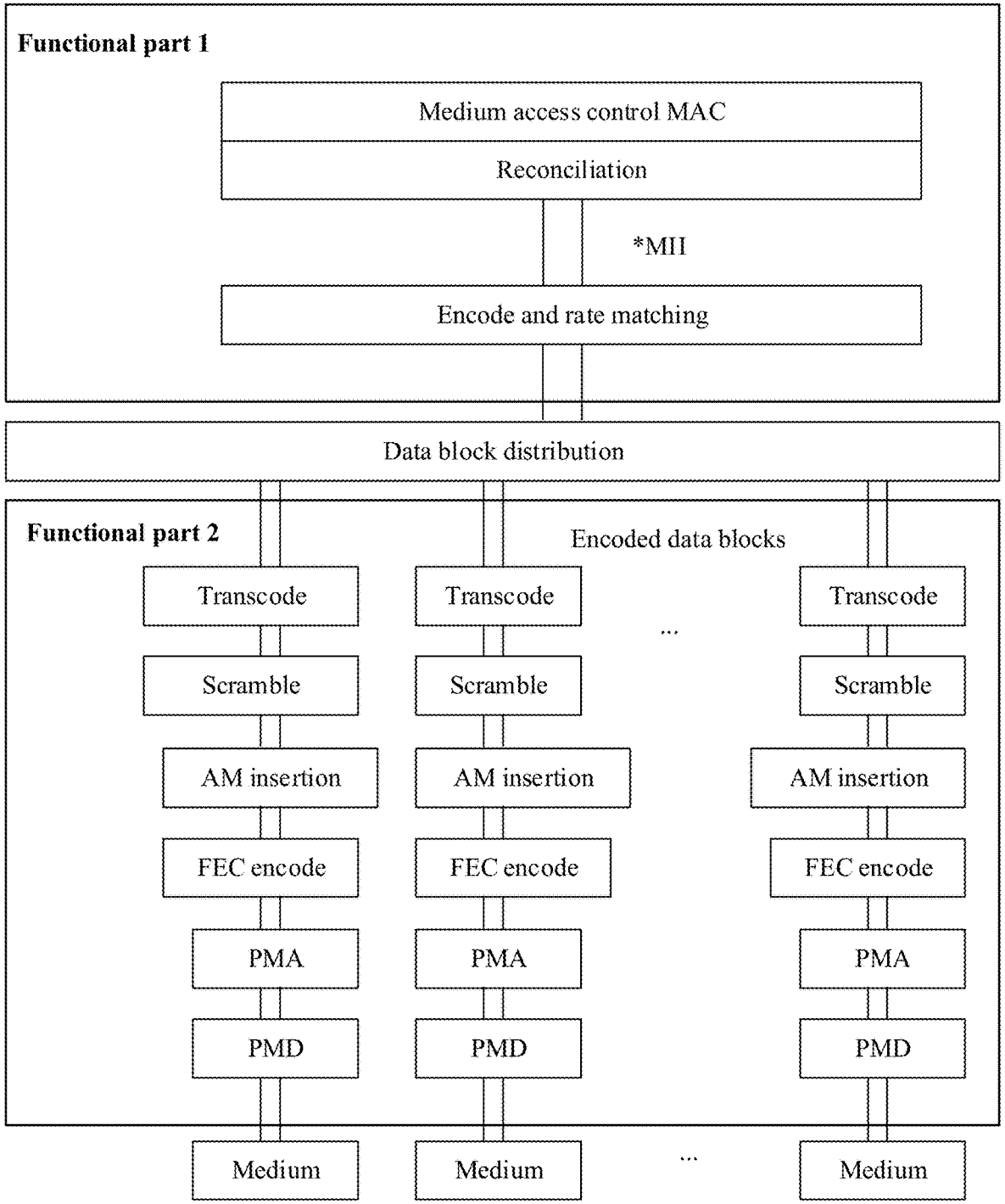
FIG. 4A is a schematic diagram of an architecture of an interface according to another embodiment.

As shown in FIG. 4A, in an embodiment, an interface includes a functional part 1, a functional part 2, and a data block distribution module located between the functional part 1 and the functional part 2. The functional part 1 includes a MAC module, an RS module, and an encode and rate matching module at a PCS layer. The functional part 2 includes one or more functional units. Each of the one or more functional units includes a plurality of functional submodules such as a transcode module, a scramble module, an alignment marker (AM) insertion module, an FEC module, and a PMA/PMD module.

For example, it is assumed that each functional unit in the functional part 2 may process a MAC data flow with a corresponding rate of 200 Gbps. For an 800 Gb/s Ethernet MAC, the functional part 2 may include four functional units, and each functional unit may process a MAC data flow with a corresponding rate of 200 Gbps. The four functional units may be integrated or disposed separately. For a MAC module with a rate of 1 Tbps, the functional part 2 may include five functional units, and each functional unit may process a MAC data flow with a corresponding rate of 200 Gbps. The five functional units may be integrated or disposed separately. For a MAC module with a rate of 1.6 Tbps, the functional part 2 may include eight functional units, and each functional unit may process a MAC data flow with a corresponding rate of 200 Gbps. The eight functional units may be integrated or disposed separately.

In some embodiments, each functional unit in the functional part 2 can process a corresponding MAC data flow with another rate, for example, 5 Gbps, 10 Gbps, 20 Gbps, 25 Gbps, 100 Gbps, 400 Gbps, 800 Gbps, 1 Tbps, or 1.6 Tbps.

In some other embodiments, the functional part 2 includes M functional units, N functional units in the M functional units are in an active state, and the N functional units are configured to transmit data from a current MAC module. The N functional units include a first functional unit and a second functional unit, and a rate of a corresponding MAC data flow that can be processed by the first functional unit is the same as or different from a rate of a corresponding MAC data flow that can be processed by the second function unit. For example, for a 800 Gb/s Ethernet MAC, the functional part 2 may include eight functional units: a, b, c, d, e, f, g, and h. The functional units a, b, c, and d are activated, and each of the functional units a, b, c, and d can process a corresponding MAC data flow with a rate of 200 Gbps. Alternatively, the functional units d, e, and f may be in the active state while the functional units a, b, c, d, g, and h are in an inactive state, and the functional units d, e, and f can process corresponding MAC data flows with rates of 200 Gbps, 200 Gbps, and 400 Gbps respectively. M and N each are a positive integer, and M≥N≥1.

From top to bottom, data obtained by encoding (such as 64B/66B or 256B/257B encoding) and rate matching is a first suitable demarcation point because the data distributed at the demarcation point is in a unit of a data block. Different from an xMII interface that implements synchronous transmission by using data and a clock, the data block itself has a sync header. In addition, a transmission rate of a data block obtained by rate matching is a fixed value, and encoded data blocks may be distributed regularly. After round-robin distribution is performed, it can be ensured that processing rates of activated functional units in the functional part 2 are consistent, so that no rate matching operation needs to be performed in the functional part 2. It should be noted that, for rate matching in an Ethernet interface, a format of a data flow needs to be identified, a packet boundary needs to be found, and an idle code block needs to be inserted to or removed from a MAC inter-frame gap (IFG, also referred to as an IPG: inter-packet gap) for rate adjustment. A rate matching function is transferred to the functional part 1. A part dependent on a MAC rate is distinguished from a part only dependent on a medium rate but independent of the MAC rate.

Figure 4B:
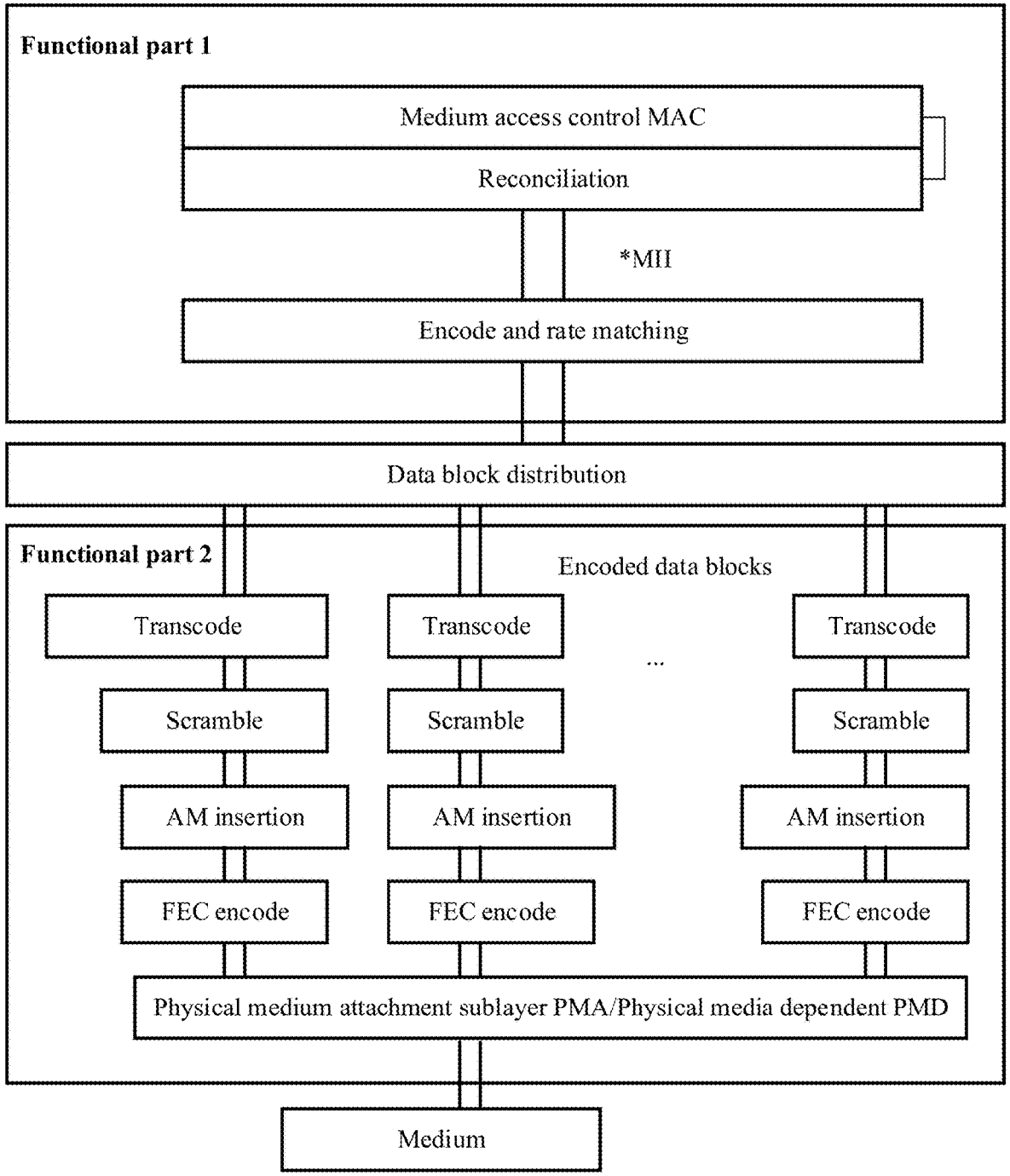
FIG. 4B is a schematic diagram of an architecture of an interface according to another embodiment.

In the interface in FIG. 4A, because the PMA/PMD does not identify any protocol or data format, the PMA/PMD may exist across functional parts. An interface is shown in FIG. 4B. For example, functional units in a functional part 2 that are in an active state and that are configured to process a data flow from a current MAC module, for example, N functional units in M functional units, share one PMA/PMD module. In some embodiments, it is also possible that some of the N functional units share a first PMA/PMD module, and some share a second PMA/PMD module; or some of the N functional units share a first PMA/PMD module, and each of the other functional units uses a separate PMA/PMD module.

Figure 4C:
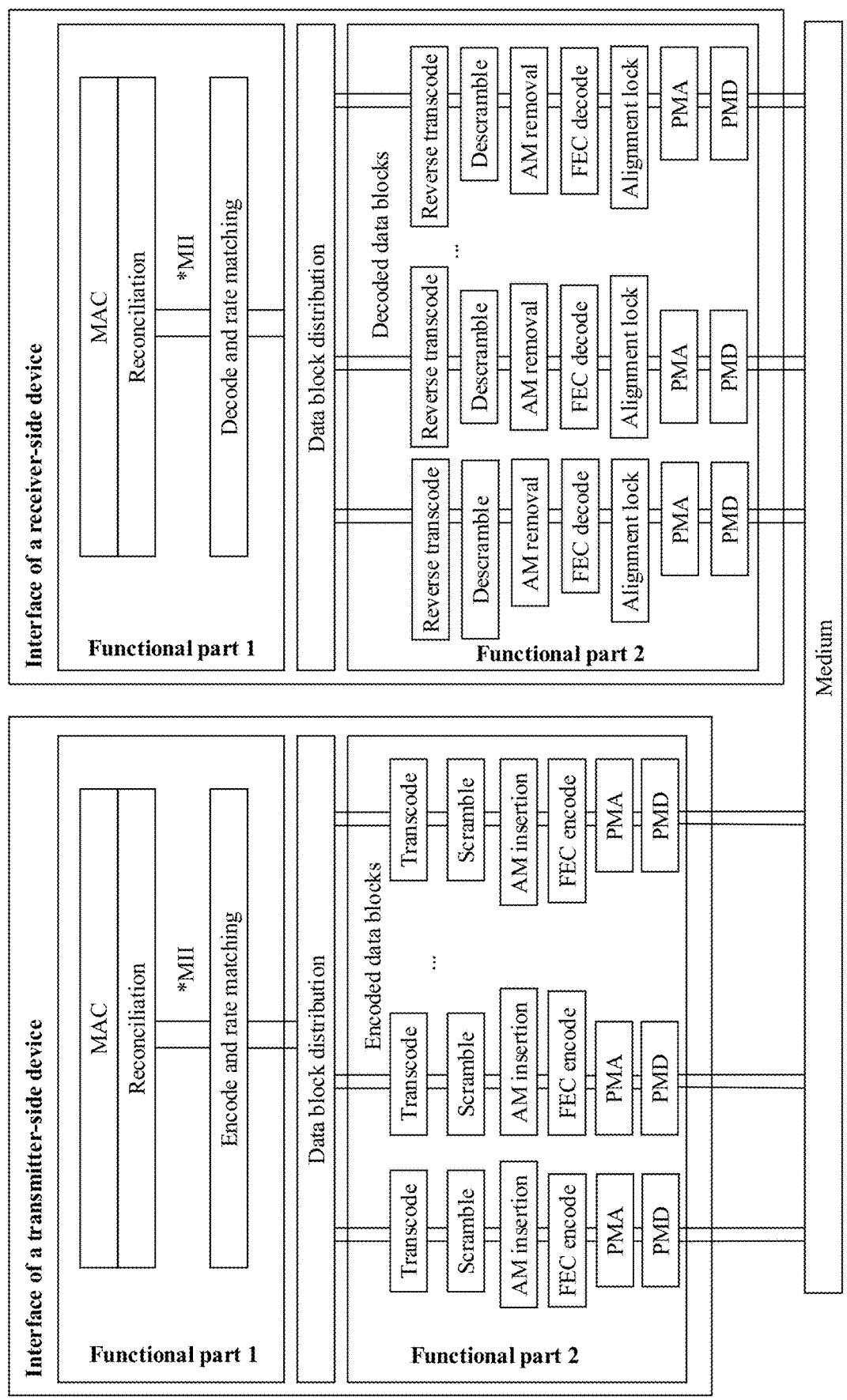
FIG. 4C is a schematic diagram of a communication system including the interface in FIG. 4A.
Figure 4D:
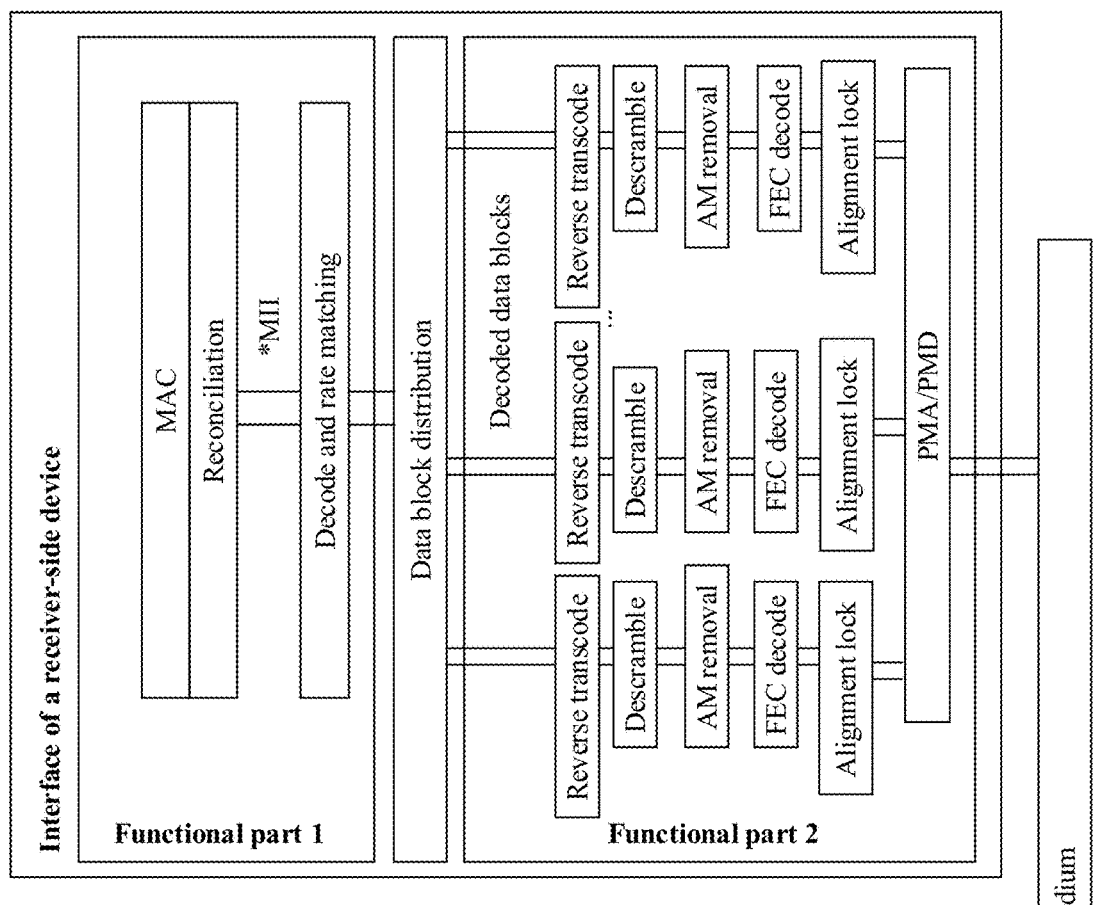
FIG. 4D is a schematic diagram of a communication system including the interface in FIG. 4B.
Figure 4D:
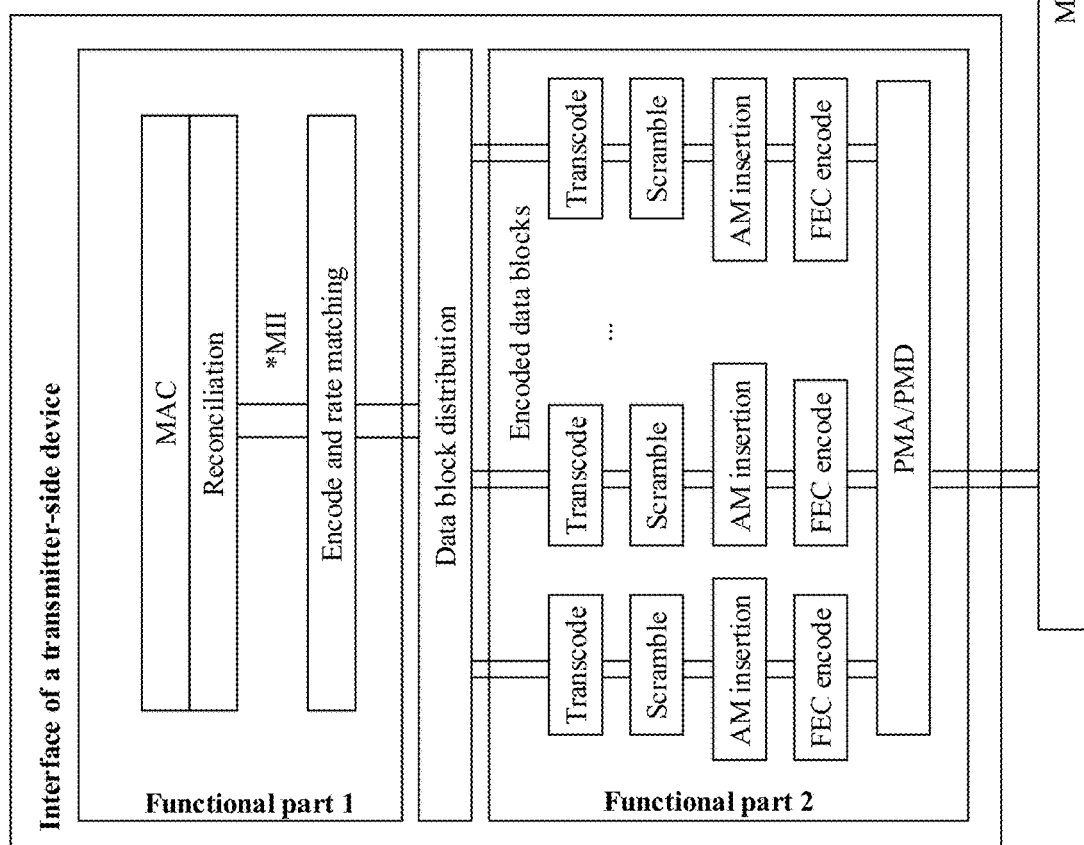
Figure 4E:
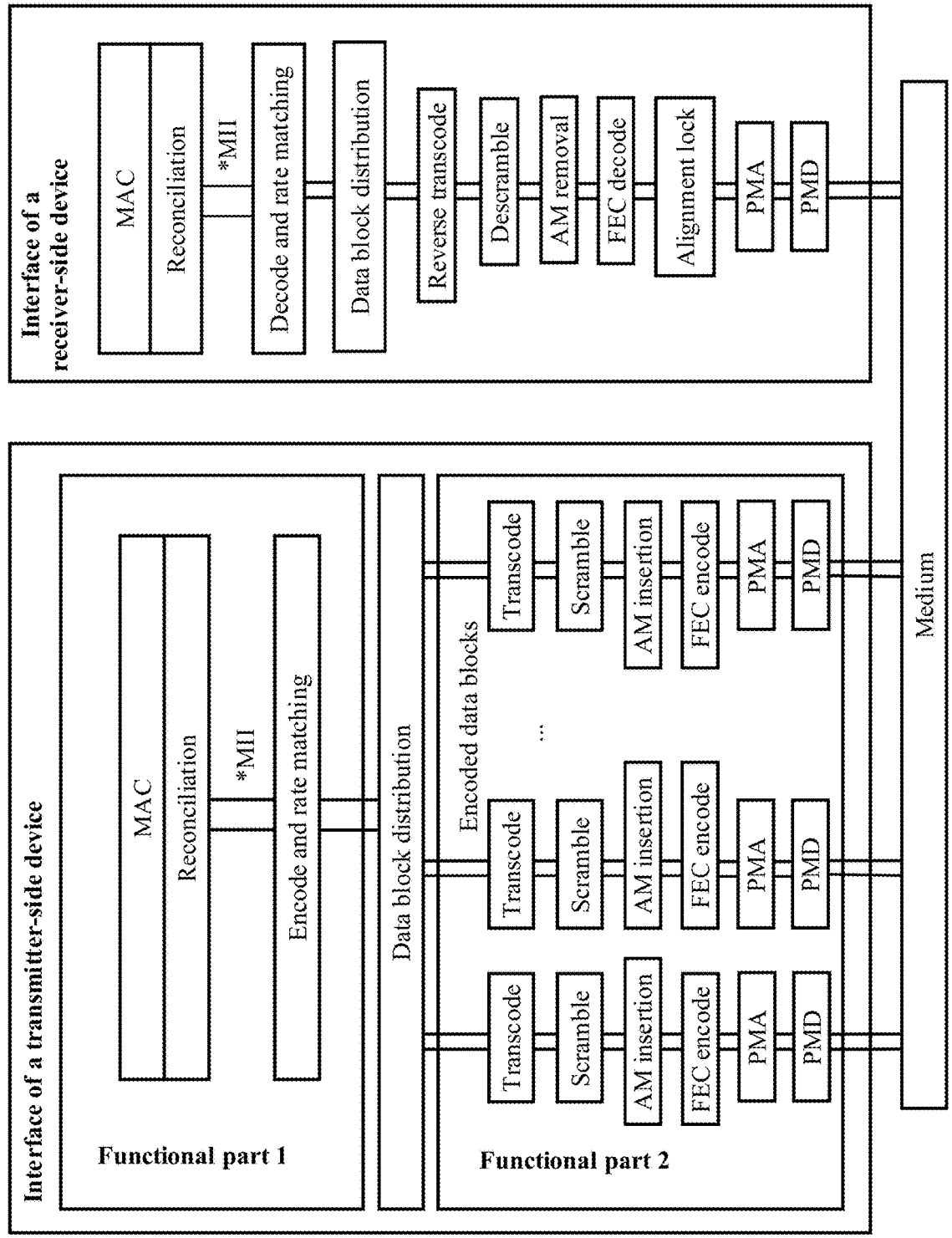
FIG. 4E is a schematic diagram of a communication system including a transmitter-side device with the interface in FIG. 4A and a receiver-side device with an IEEE 802.3 standard interface.
Figure 4F:
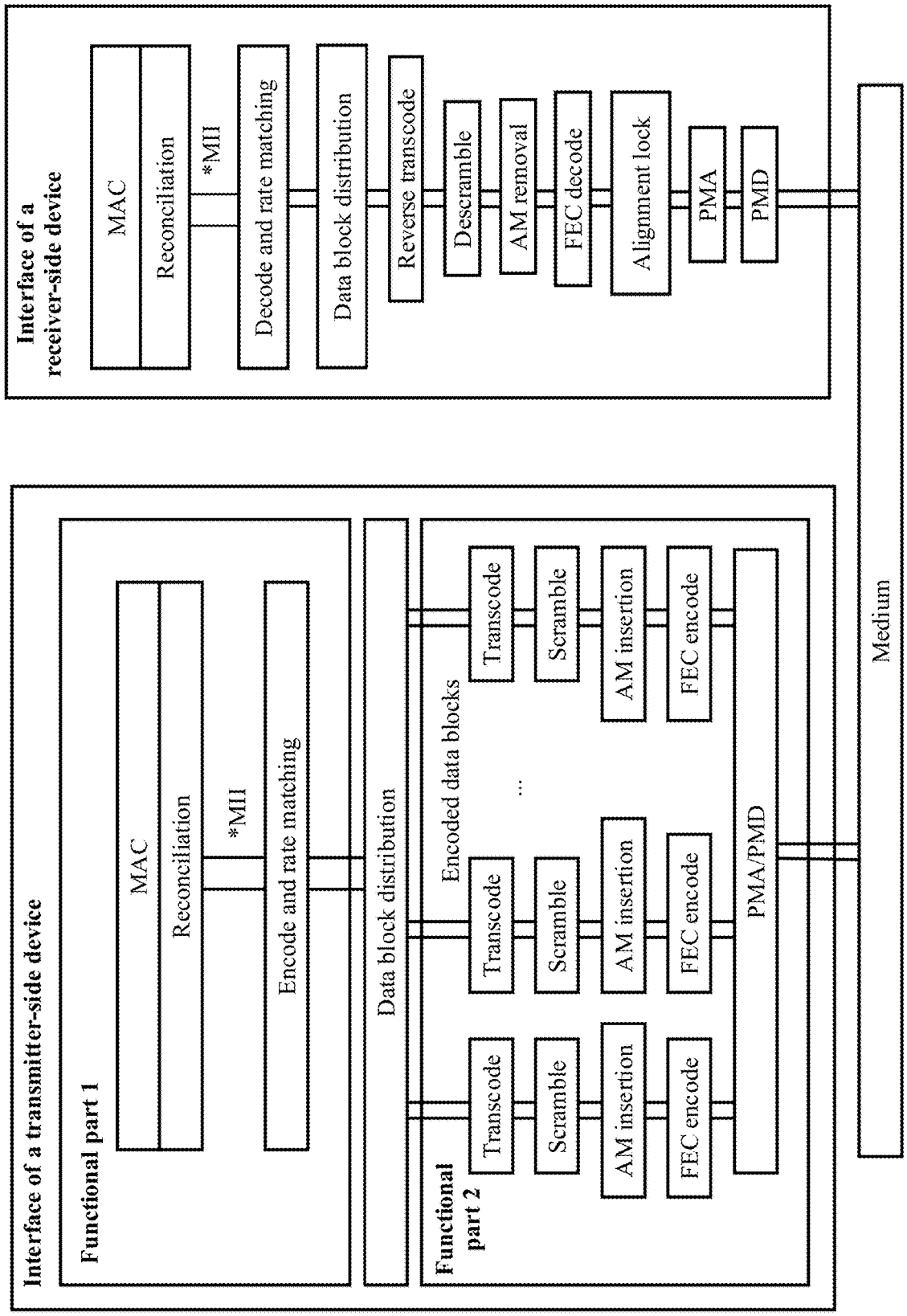
FIG. 4F is a schematic diagram of a communication system including a transmitter-side device with the interface in FIG. 4B and a receiver-side device with an IEEE 802.3 standard interface.
Figure 4G:
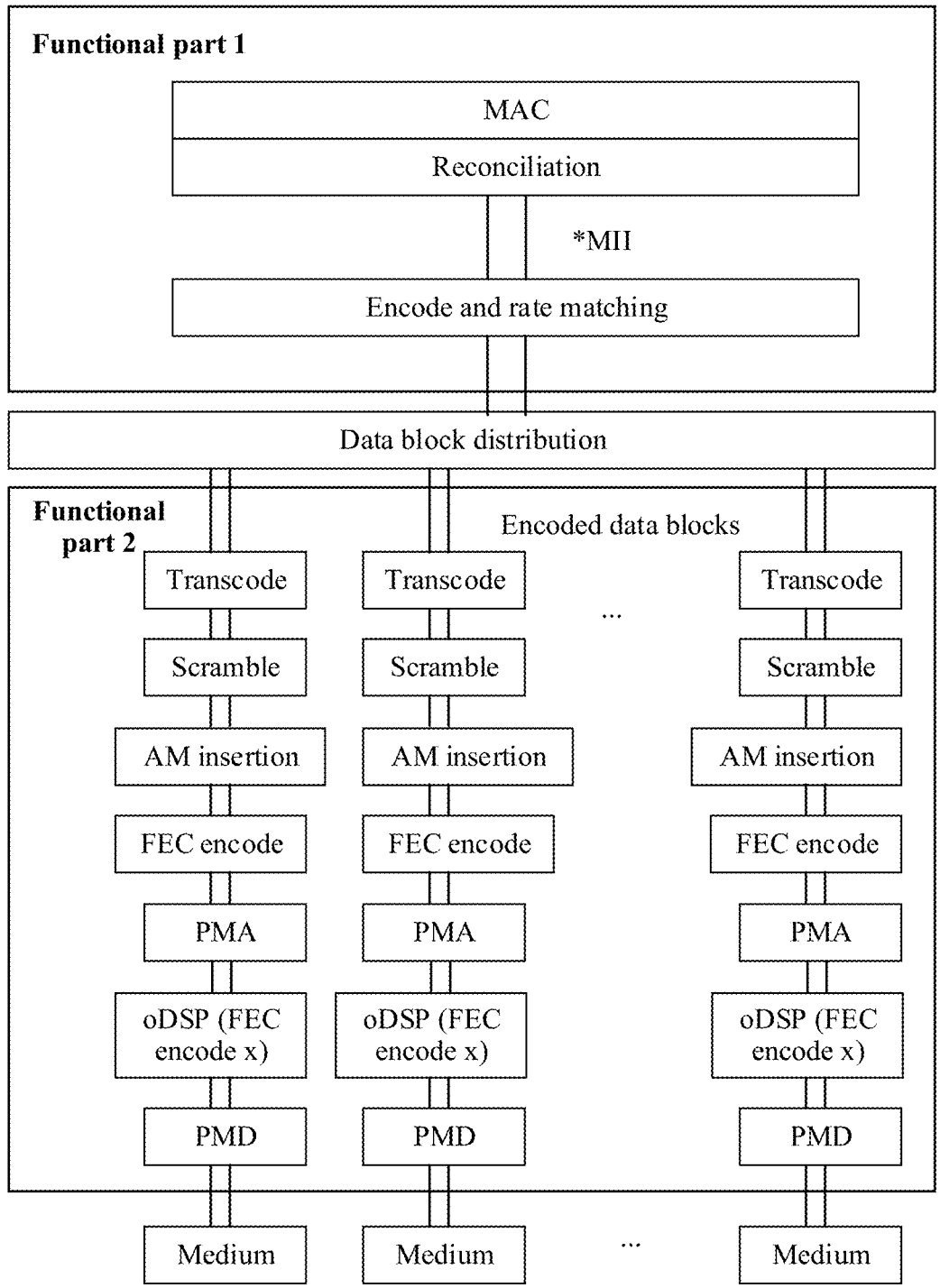
FIG. 4G is a schematic diagram of an architecture of an interface according to still another embodiment.

FIG. 4G corresponds to an embodiment. An oDSP (Optical Digital Signal Processor) is integrated and encapsulated in a host chip. A data flow or a data frame flow output by the oDSP may be sent to PMD, processed by the PMD, and then enter a laser; or a data flow or a data frame flow output by the oDSP is modulated and used as a drive signal of a laser. Modulation may be completed by the oDSP or another modulator.

Optionally, a functional part 2 may further include a new FEC encoding function (FEC encoding x), to encoding data processed by the oDSP. FEC encoding is RS FEC encoding. Secondary FEC encoding is performed after processing by the oDSP. The secondary FEC encoding may be BCH FEC or RS FEC encoding. The FEC encoding x may be set in the oDSP or set independently.

In some embodiments, the functional part 1 and the functional part 2 in FIG. 4A, FIG. 4B, or FIG. 4G may be integrated into a same chip.

In some embodiments, a communication system includes a transmitter-side device and a receiver-side device. The transmitter-side device includes an interface in FIG. 4G, and an interface included in the receiver-side device is an interface of any architecture. For example, in some embodiments, a communication system includes a transmitter-side device and a receiver-side device, the transmitter-side device includes an interface in FIG. 7C, and an interface included in the receiver-side device is an interface of any architecture, for example, an interface in FIG. 4A, FIG. 4B, FIG. 4G, FIG. 5A, FIG. 6A, FIG. 7A, FIG. 7C, FIG. 8, FIG. 9, FIG. 10, FIG. 11, or FIG. 12A, or an IEEE 802.3 standard Ethernet interface.

For example, an interface of a transmitter-side device is an architecture in FIG. 4B. Refer to FIG. 4D. A communication system includes the transmitter-side device and a receiver-side device.

A packet received by an interface of the transmitter-side device enters a functional part 1 of the interface of the transmitter-side device.

In this embodiment, the functional part 1 of the interface of the transmitter-side device includes a MAC module, an RS module, and an encode and rate matching module. The packet is processed by the MAC module, the RS module, and the encode and rate matching module, and then enters a data block distribution module. A data frame obtained by processing by the MAC module is converted by the RS module into data of a corresponding bit width (where the width varies with a rate), and the data is sent to the encode and rate matching module through a media independent interface MII for processing, and the encode and rate matching module processes data sent from the MII to generate a 64B/66B block.

In an embodiment, input data of 100 GbE PCS is parallel data of a 100G Ethernet media independent interface (CGMII) format at a reconciliation sublayer RS. A 400G Ethernet (400 GbE) interface converts the input data into a corresponding CDGMII format. A data format of a CDGMII interface is described as follows: A bit width of the CDGMII interface is (64+8+2), a format of the CDGMII interface is 64-bit data information bits, 8-bit control information indication bits, and two clocks corresponding to transmitting and receiving, where the 8-bit control information bits indicate whether data of 64 bits, namely, 8 bytes, represents data or control information. Data from the CDGMII is transmitted to a 64B/66B encode module for encoding.

After receiving the data block processed by the encode and rate matching module, the data block distribution module in the transmitter-side device distributes the data block to N functional units in a functional part 2 of the transmitter-side device.

In this embodiment, each of the N functional units includes one or more PCS lanes. In some embodiments, each of one or more of the N functional units includes one or more PCS lanes.

In this embodiment, the data block distribution module distributes, to the N functional units, the 64B/66B block generated by processing by the encode and rate matching module. In some embodiments, the data block distribution module distributes 64B/66B blocks to the N functional units one by one in a round-robin mode. For example, the data block distribution module distributes a first received 64B/66B block to a first functional unit in the N functional units, distributes a second received 64B/66B block to a second functional unit in the N functional units, . . . , and distributes a received $N^{th}$ 64B/66B block to an $N^{th}$ functional unit in the N functional units.

In this embodiment, each of the N functional units includes a transcode module, a scramble module, an AM module, an FEC encode module, and a PMA/PMD module. The transcode module, the scramble module, the AM module, and the FEC encode module in each functional unit respectively perform corresponding processing on a data block entering the functional unit. For example, an $i^{th}$ functional unit in the N functional units sequentially performs transcoding, scrambling, AM insertion, and FEC encoding processing on data received from the data block distribution module, and processed data is sent to the receiver-side device through the PMA/PMD and a medium (for example, a backplane or an optical fiber). For example, a block obtained by performing 64B/66B encoding on a data flow is transcoded. A specific format of data transcoded by the transcode module includes 256B/257B, 512B/513B, 256B/258B, or 512B/514B. A specific transcoding manner is not limited in this application.

The scramble module scrambles a transcoded data flow. In some embodiments, global or partial scrambling may be performed at a specific granularity. Self-synchronizing scrambling (also referred to as multiplicative scrambling) may be performed on a unified overall data flow, or synchronous scrambling (also referred to as additive scrambling) may be performed at an FEC granularity, or self-synchronizing or synchronous scrambling may be performed at a granularity of a PCS lane (English name: lane). In a case of the synchronous scrambling, initialization values of the scrambling module and a descrambling module may be configured to ensure performance of an entire system.

After the alignment marker insertion module inserts an alignment marker (AM) into a scrambled data flow, the data flow enters the FEC encode module for FEC encoding. In some embodiments, the FEC encode module may process the received data flow based on one or more of encoding manners of Reed-Solomon RS (544,514) FEC, Bose-Chaudhuri-Hocquenghem (BCH) FEC, polar FEC, LDPC FEC, CFEC FEC, OFEC FEC, or TPC FEC. Data processed by the FEC encode module arrives at the transmission medium through the PMA module and the PMD module in sequence. The PMA module and the PMD module may be integrated into one functional module or disposed separately. The PMA module performs serial-to-parallel conversion on the received data and sends converted data to the PMD module. The PMD module then converts a received signal to the corresponding transmission medium.

As shown in FIG. 4D, in an embodiment, an architecture of an interface of a receiver-side device corresponds to a structure of the interface shown in FIG. 4A. In this case, N flows of data processed by a functional part 2 of a transmitter-side device enter a functional part 2 of the interface of the receiver-side device through a medium, and N functional units in the functional part 2 of the interface of the receiver-side device are in one-to-one correspondence with N functional units in the functional part 2 of an interface of the transmitter-side device. The N functional units in the functional part 2 of the interface of the receiver-side device respectively receive data sent by the N functional units in the functional part 2. Each of the N functional units in the functional part 2 includes a reverse transcode module, a descramble module, an alignment marker removal (AM removal) module, an FEC decode module, and an alignment lock module. For example, an $i^{th}$ functional unit in the N functional units sequentially performs alignment marker alignment lock, FEC decoding, alignment marker removal, descrambling, and reverse transcoding processing on data received from a PMA/PMD module, and N processed flows of data enter a data block distribution module of the interface of the receiver-side device. The data block distribution module of the interface of the receiver-side device sends N flows of data to a functional part 1 of the interface of the receiver-side device. The functional part 1 of the interface of the receiver-side device interface includes a MAC module, an RS module, and a decode and rate matching module. The decode and rate matching module of the interface of the receiver-side device decodes the N flows of data distributed by the data block distribution module, and performs rate matching and sends data obtained by the rate matching to the RS module. The data is processed by the RS module and arrives at the MAC module of the interface of the receiver-side device. Optionally, the decode and rate matching module of the interface of the receiver-side device performs rate matching on the N flows of data, and data obtained by the rate matching arrives at the RS module of the interface of the receiver-side device through an xMII.

Refer to FIG. 4C. A communication system includes a transmitter-side device and a receiver-side device. An architecture of an interface of the transmitter-side device is shown in FIG. 4A. An architecture of an interface of the receiver-side device corresponds to the architecture of the interface in FIG. 4A. A process in which the interface of the transmitter-side device processes data and then sends processed data to the interface of the receiver-side device and a process in which the interface of the receiver-side device processes the received data are similar to those of the interface of the transmitter-side device and the interface of the receiver-side device in the communication system in FIG. 4D. Details are not described herein again.

Refer to FIG. 4E. A communication system includes a transmitter-side device and a receiver-side device. The transmitter-side device includes the interface shown in FIG. 4A, and an interface of the receiver-side device is an IEEE 802.3 standard Ethernet interface. A process in which the interface of the transmitter-side device processes to-be-sent data is similar to an operation of the interface of the transmitter-side device in FIG. 4C. Details are not described herein again. After the interface of the transmitter-side device processes the data, N flows of data processed by a functional part 2 of the transmitter-side device enter the interface of the receiver-side device through a medium. The interface of the receiver-side device is an IEEE 802.3 Ethernet interface, including a MAC module, an RS module, a decode and rate matching module, a data block distribution module, a reverse transcode module, a descramble module, an alignment marker removal module, an FEC decode module, and a PMA/PMD module. After the interface of the receiver-side device receives a data flow from the transmitter-side device through the medium, PMD/PMA processing, alignment marker alignment lock, FEC decoding, alignment marker removal, descrambling, and reverse transcoding are sequentially performed on the data flow, and then a processed data flow arrives at the data block distribution module. The data block distribution module processes the received data flow. Decode and rate matching, and RS processing are sequentially performed on the data flow, and then a processed data flow arrives at the MAC module. The MAC module processes the data flow to generate an Ethernet frame.

Refer to FIG. 4F. A communication system includes a transmitter-side device and a receiver-side device. The transmitter-side device includes the interface shown in FIG. 4B, and an interface of the receiver-side device is an IEEE 802.3 standard Ethernet interface. A process in which the interface of the transmitter-side device processes to-be-sent data is similar to an operation of the interface of the transmitter-side device in FIG. 4D. Details are not described herein again. A process in which the interface of the receiver-side device processes received data is similar to a processing process of the interface of the receiver-side device in FIG. 4E. Details are not described herein again.

Figure 5A:
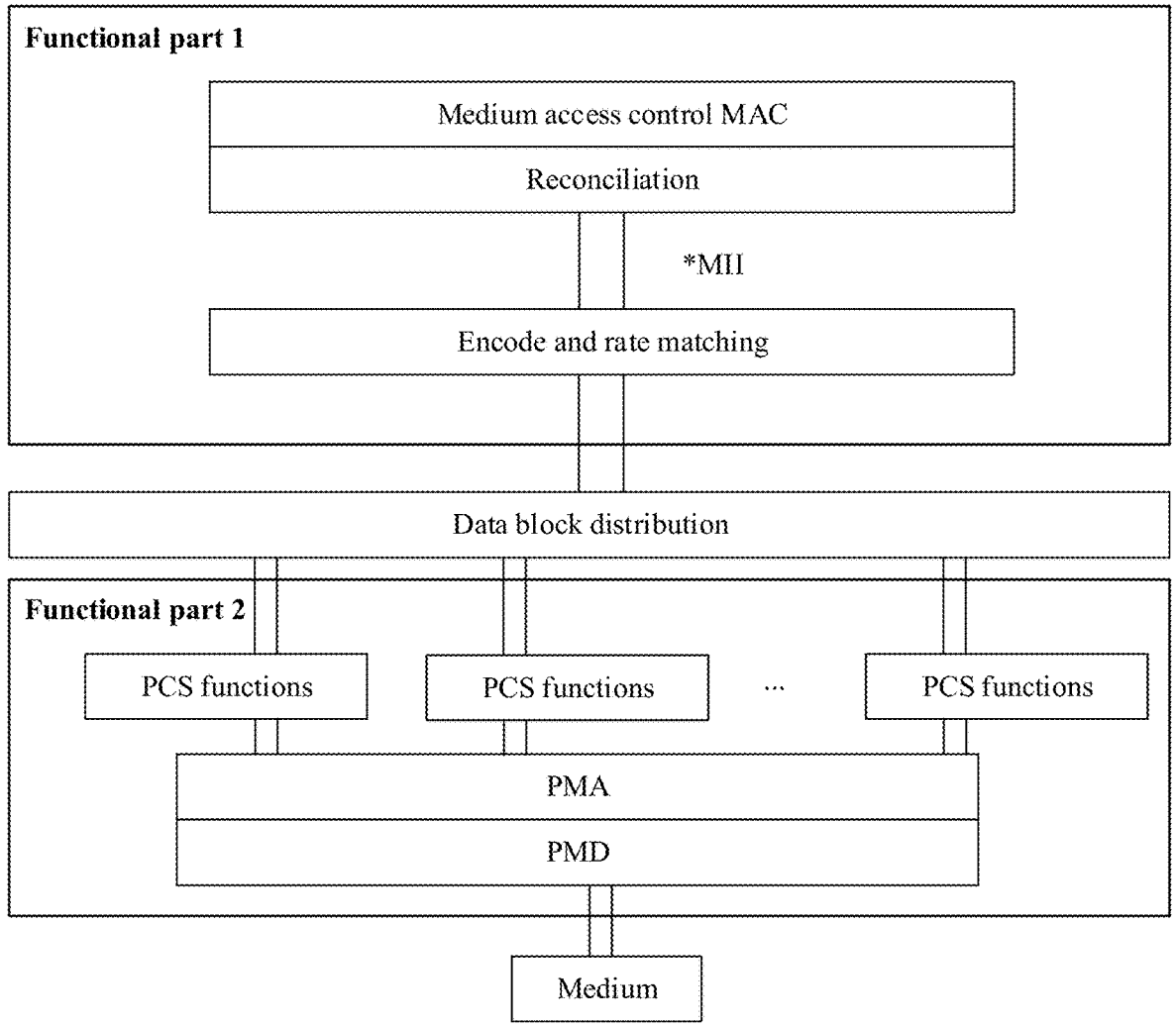
FIG. 5A is a schematic diagram of an architecture of an interface according to still another embodiment.

As shown in FIG. 5A, in an embodiment, an Ethernet interface includes a functional part 1, a functional part 2, and a data block distribution module located between the functional part 1 and the functional part 2. The functional part 1 includes a MAC module, a reconciliation module, and an encode and rate matching module. The functional part 2 includes a plurality of functional units. For example, each functional unit includes a plurality of flows of PCS functions. The data block distribution module is included between the functional part 1 and the functional part 2. The data block distribution module accesses the plurality of functional units in the functional part 2. The plurality of functional units in the functional part 2 perform output through PMA/PMD. In some embodiments, the plurality of functional units in the functional part 2 may be connected to shared PMA/PMD.

Figure 5B:
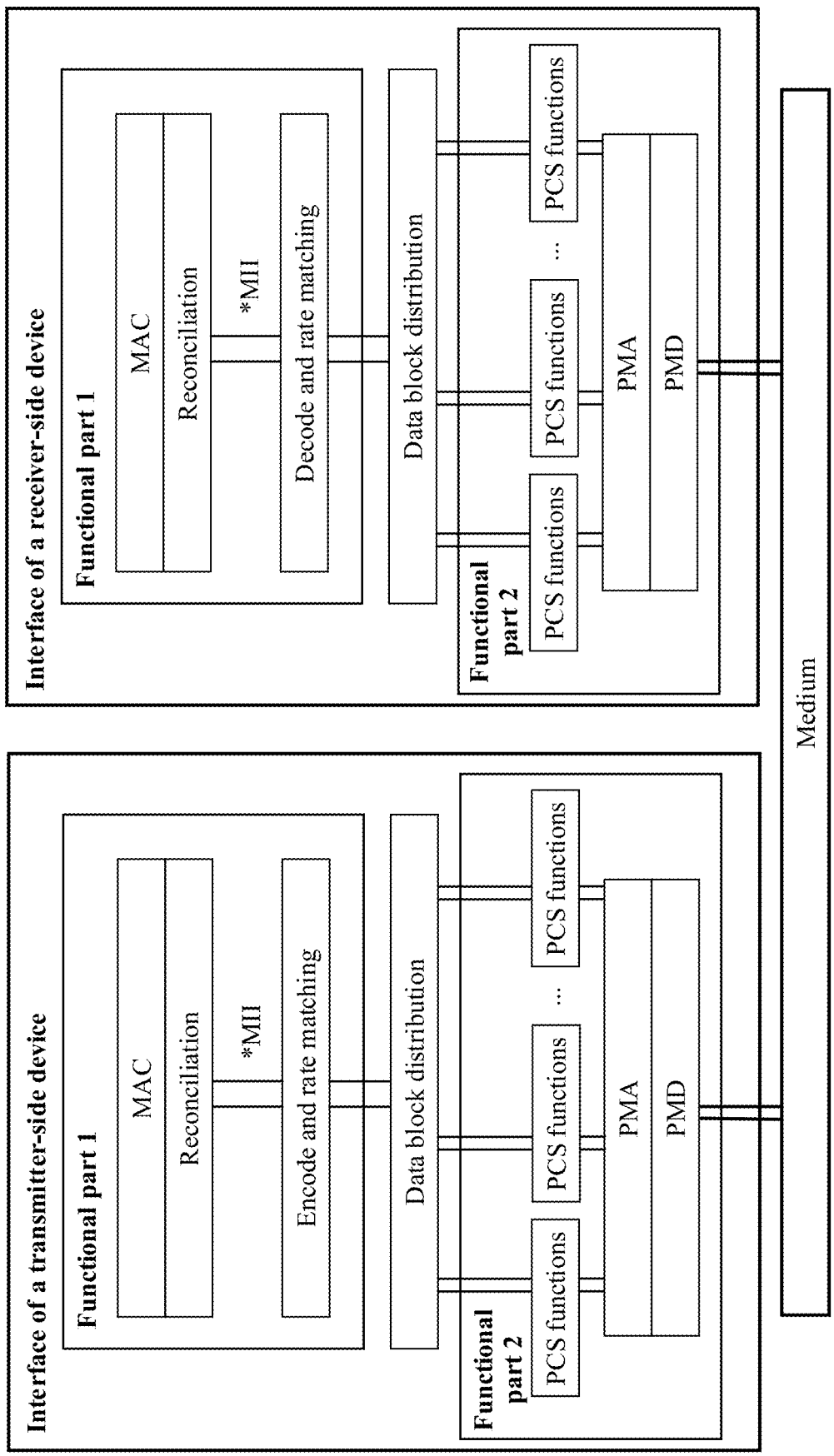
FIG. 5B is a schematic diagram of a communication system including the interface in FIG. 5A.

Refer to FIG. 5B. A communication system includes a transmitter-side device and a receiver-side device. The transmitter-side device includes the interface shown in FIG. 5A, and the receiver-side device includes an interface corresponding to the interface shown in FIG. 5A. A processing manner of each module in the functional part 1 of the interface shown in FIG. 5A is similar to that of the functional part 1 in FIG. 4A. Details are not described herein again. The functional part 2 in FIG. 5A includes m flows of PCS functions, where m is an integer greater than or equal to 1. Each flow of PCS functions includes a transcode module, a scramble module, an alignment marker insertion module, and an FEC encode module. Processing manners of these modules are similar to those of corresponding modules in FIG. 4A. The data block distribution module distributes data blocks from the encode and rate matching module to the m flows of PCS functions. After performing corresponding processing, the m flows of PCS functions send data of the m flows of PCS functions to one PMA module. Data processed by the PMA module is distributed to one or more PMD modules, and is processed by the PMD module and then sent to a transmission medium. In the solution in FIG. 5A, in the functional part 2, only the transcode module, the scramble module, the alignment marker insertion module, and the FEC encode module are disposed separately, and a separate PMA module is used to process the data output by the m flows of PCS functions, so that the data can be processed more flexibly. m flows of data processed by the functional part 2 of the transmitter-side device enter a functional part 2 of the receiver-side device through the medium. The functional part 2 of the receiver-side device includes m flows of PCS functions, and PMA and PMD shared by the m flows of PCS functions. The m flows of data processed by the functional part 2 of the transmitter-side device enter the functional part 2 through the medium, and are processed by the PMA and the PMD of the receiver-side device, and then respectively enter the m flows of PCS functions of the receiver-side device. The m flows of PCS functions of the functional part 2 of the receiver-side device are in one-to-one correspondence with m flows of functional units in the functional part 2 of the transmitter-side device, and each flow of functional units includes a reverse transcode module, a descramble module, an alignment marker removal module, an FEC decode module, and an alignment lock module. The m flows of PCS functions of the functional part 2 of the receiver-side device respectively receive the data sent by the m flows of PCS functions of the functional part 2 of the transmitter-side device. For example, an $i^{th}$ flow of PCS functions in the m flows of PCS functions performs PCS processing on data received from the PMA. Data output after being processed by the m flows of PCS functions of the functional part 2 of the receiver-side device is processed by a data block distribution module and then enters a functional part 1 of the receiver-side device. The functional part 1 of the receiver-side device performs decode and rate matching, reconciliation, and MAC processing on the data from the data block distribution module in sequence to obtain an Ethernet frame.

Figure 6A:
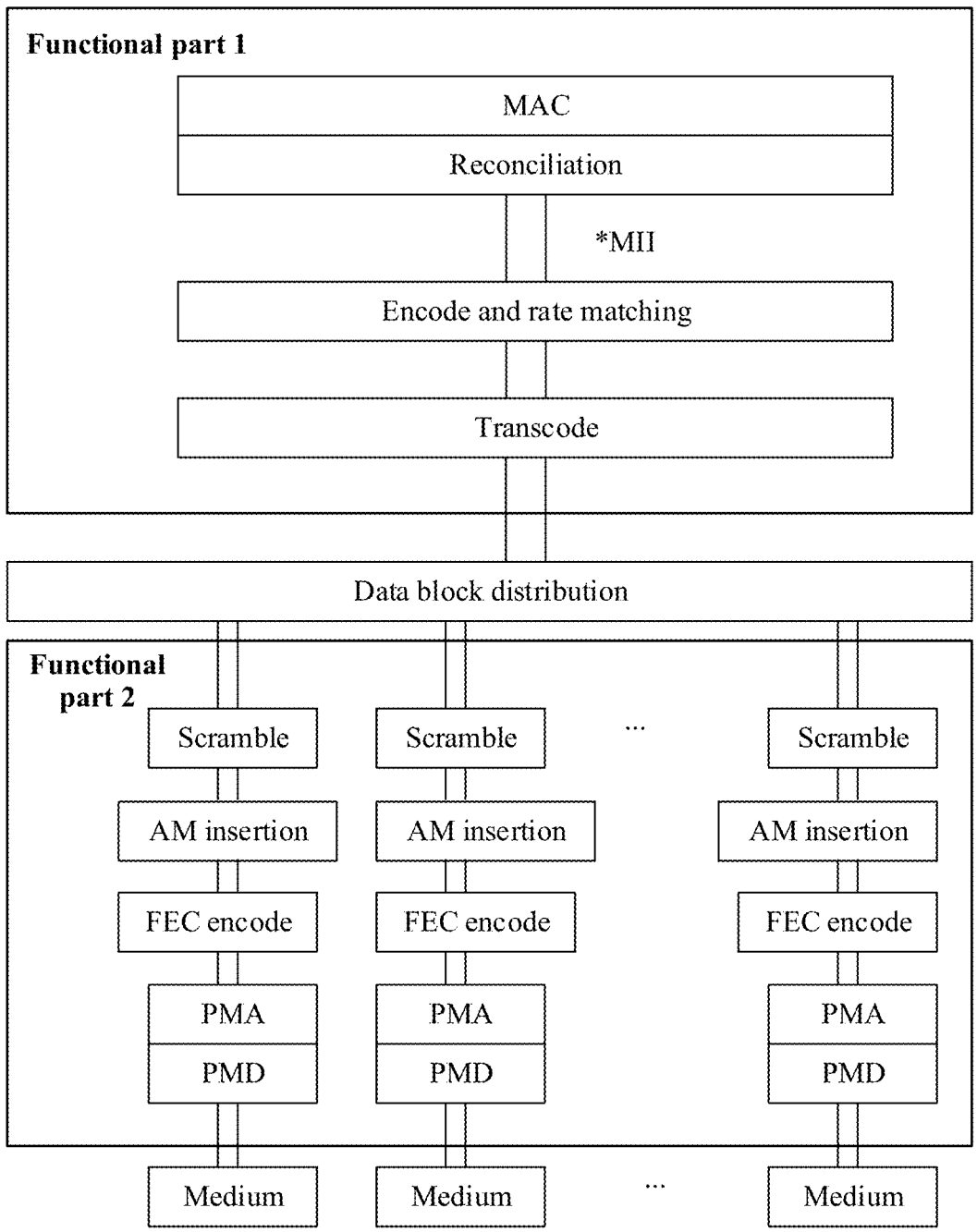
FIG. 6A is a schematic diagram of an architecture of an interface according to still another embodiment.
Figure 6B:
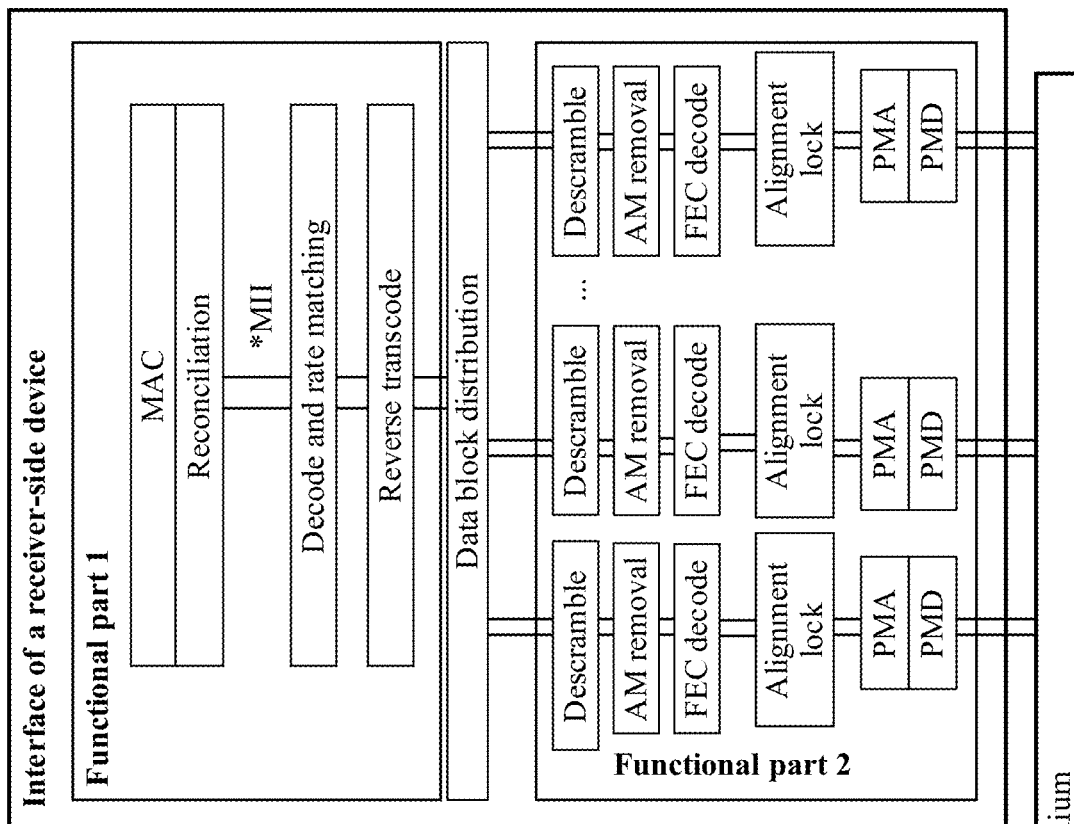
FIG. 6B is a schematic diagram of a communication system including the interface in FIG. 6A.
Figure 6B:
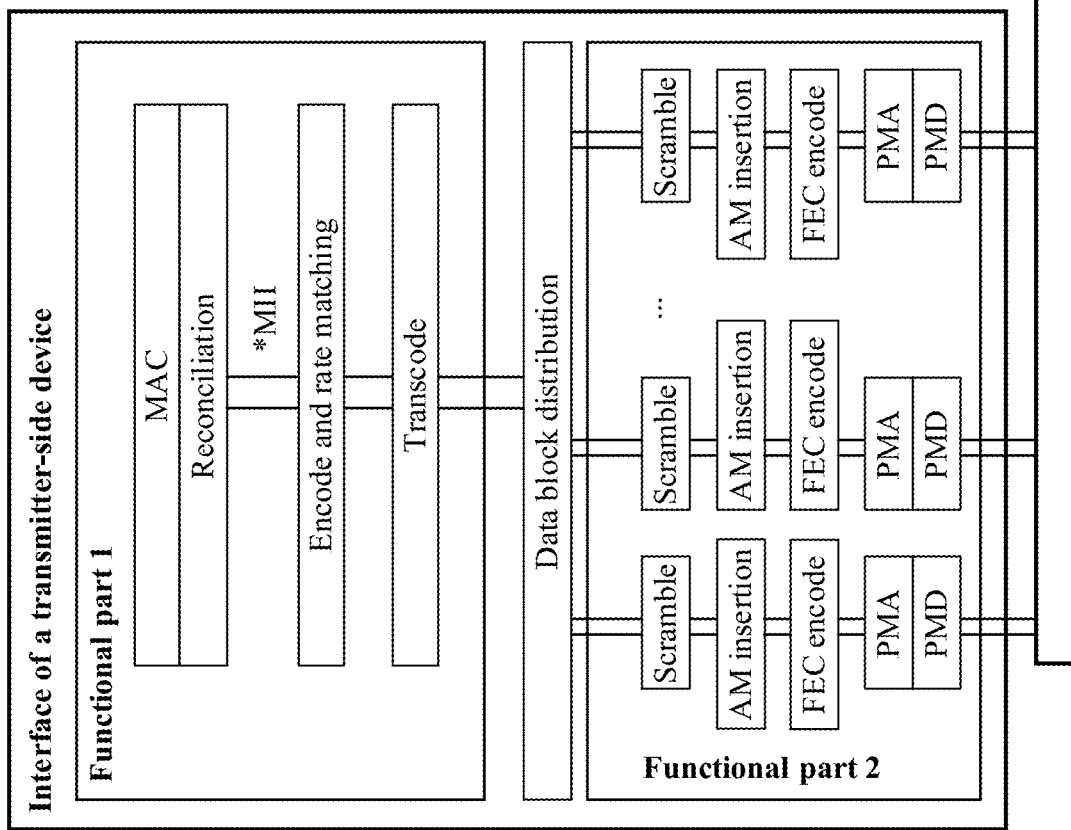

In some embodiments, as shown in FIG. 6A and FIG. 6B, data distribution locations in interfaces may be different. Transcoded data is used as a boundary for distribution. In this case, data is distributed at a granularity (for example, 257 bits) after transcoding, and a functional part 2 processes a data flow at a granularity of 257 bits. In FIG. 6A, the interface includes a functional part 1, a functional part 2, and a data block distribution module located between the functional part 1 and the functional part 2. The functional part 1 includes a MAC module, an RS module, an encode and rate matching module at a PCS layer, and a transcode module. The functional part 2 includes a plurality of functional units, and each functional unit includes a scramble module, an alignment marker insertion (AM insertion) module, an FEC encode module, and a PMA/PMD module. The functional part 1 is coupled to and communicates with the functional part 2 through the data block distribution module. A structure of the Ethernet interface in FIG. 6A may be applied to a transmitter-side device. Functions of the functional modules, namely, the MAC module, the RS module, the encode and rate matching module, the transcode module, the data block distribution module, the scramble module, the FEC module, the PMA module, and the PMD module, in FIG. 6A are similar to functions of corresponding modules in FIG. 4A. Details are not described herein again. In FIG. 6A, the functional part 1 includes the MAC module, the RS module, and the transcode module. For the transmitter-side device, after the transmitter-side device receives a packet, the packet enters the functional part 1 of the transmitter-side device. The MAC module of the functional part 1 processes the packet to form a data frame. The RS module converts the data frame into data of a corresponding bit width, and sends the data to the encode and rate matching module. The encode and rate matching module processes the received data to generate a 64B/66B block. The 64B/66B block is forwarded to the transcode module. The transcode module transcodes the received data block, for example, transcoding the block obtained by performing 64B/66B encoding on a data flow. A specific format of data transcoded by the transcode module includes 256B/257B, 512B/513B, 256B/258B, or 512B/514B. A specific transcoding manner is not limited in this application.

The data block distribution module distributes a transcoded data flow to m flows of functional units included in the functional part 2, where each of the m flows of functional units includes a scramble module, an alignment marker insertion module, an FEC encode module, a PMA module, and a PMD module. Functions and operations of the scramble module, the alignment marker insertion module, the FEC encode module, the PMA module, and the PMD module herein are similar to functions of corresponding functional modules in FIG. 4A. Details are not described herein again. That the data block distribution module distributes a transcoded data flow to m flows of functional units included in the functional part 2 includes: The data block distribution module distributes, in a round-robin mode, the transcoded data flow to the m flows of functional units included in the functional part 2.

In some embodiments, in the functional part 2 in FIG. 6A, each of the m flows of functional units includes a scramble module, an alignment lock module, and an FEC encode module. The FEC encode module in the m flows of functional units sends data on which FEC processing has been performed to one or more PMA modules. The data is processed by the one or more PMA modules and then sent to one or more PMD modules for processing. The one or more PMD modules send processed data to a receiver-side device through a transmission medium.

As shown in FIG. 6B, a communication system includes a transmitter-side device and a receiver-side device. The transmitter-side device includes the interface shown in FIG. 6A, and the receiver-side device includes an interface corresponding to the interface shown in FIG. 6A. The interface of the receiver-side device includes a functional part 1, a functional part 2, and a data block distribution module located between the functional part 1 and the functional part 2. The functional part 1 includes a MAC module, an RS module, a decode and rate matching module at a PCS layer, and a transcode module. The functional part 2 includes a plurality of functional units, and each functional unit includes a descramble module, an alignment marker removal (AM Removal) module, an FEC decode module, an alignment lock module, and a PMA/PMD module. The functional part 1 is coupled to and communicates with the functional part 2 through the data block distribution module. Functions of the functional modules, namely, the MAC module, the RS module, the decode and rate matching module, the reverse transcode module, the data block distribution module, the descramble module, the alignment marker removal (AM Removal) module, the FEC decode module, the alignment lock module, the PMA module, and the PMD module, of the interface of the receiver-side device in FIG. 6B are similar to functions of corresponding modules in FIG. 4C. Details are not described herein again.

In some embodiments, the functional part 1 and the functional part 2 in FIG. 6A may be integrated into a same chip.

Figure 6C:
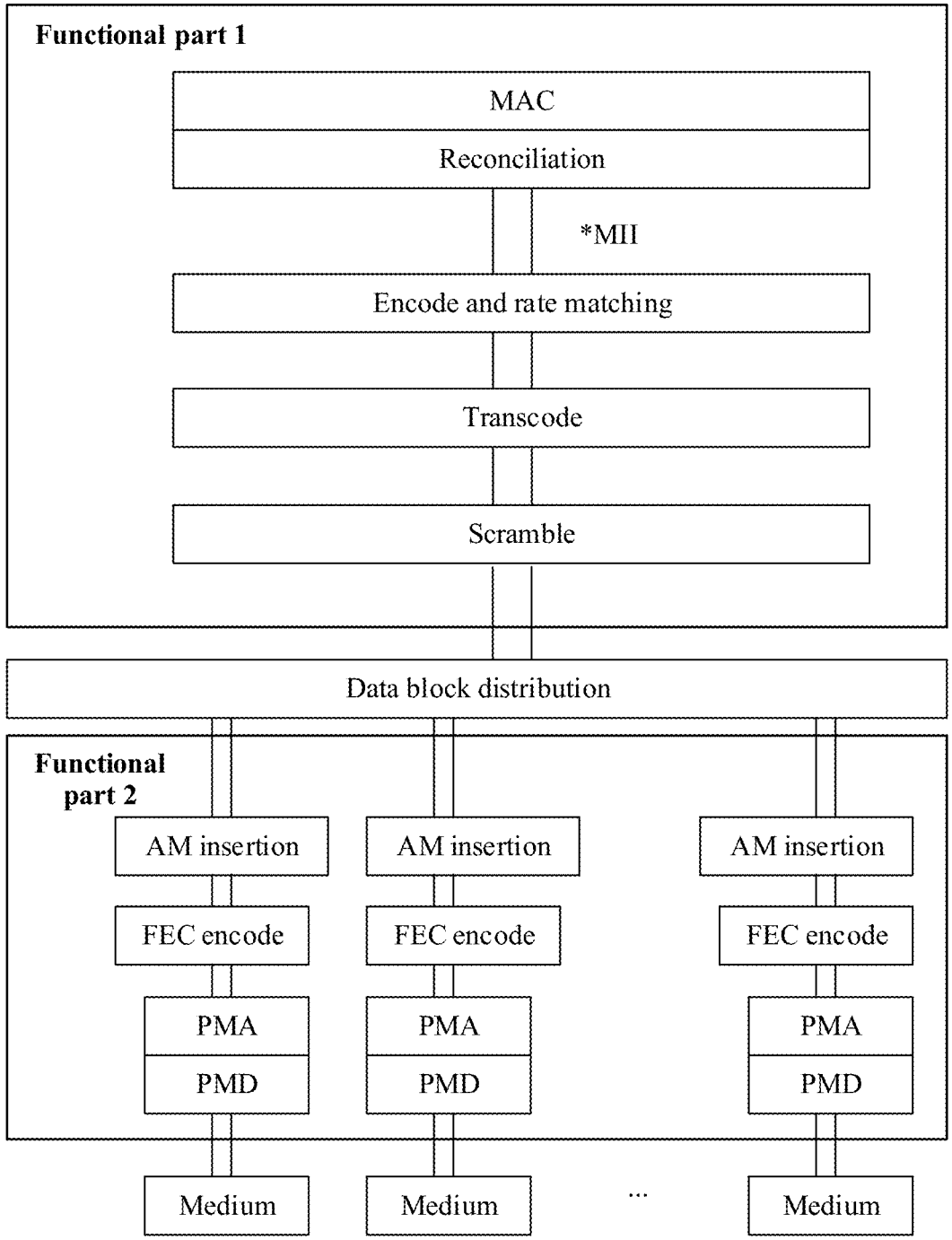
FIG. 6C is a schematic diagram of an architecture of an interface according to still another embodiment.

Refer to FIG. 6C. In a structure of another interface, if scrambled data is used as a boundary for distribution, data may be distributed at a plurality of granularities, for example, 1 bit and 10 bits. The interface includes a functional part 1, a functional part 2, and a data block distribution module located between the functional part 1 and the functional part 2. The functional part 1 is coupled to and communicates with the functional part 2 through the data block distribution. The functional part 1 includes a MAC module, an RS module, an encode and rate matching module at a PCS layer, a transcode module, and a scramble module. The functional part 2 includes an AM insertion module, an FEC encode module, and a PMA/PMD module. The functional part 2 includes m flows of functional units, and each of the m flows of functional units includes an alignment marker insertion module, an FEC module, and a PMA/PMD module.

Figure 6D:
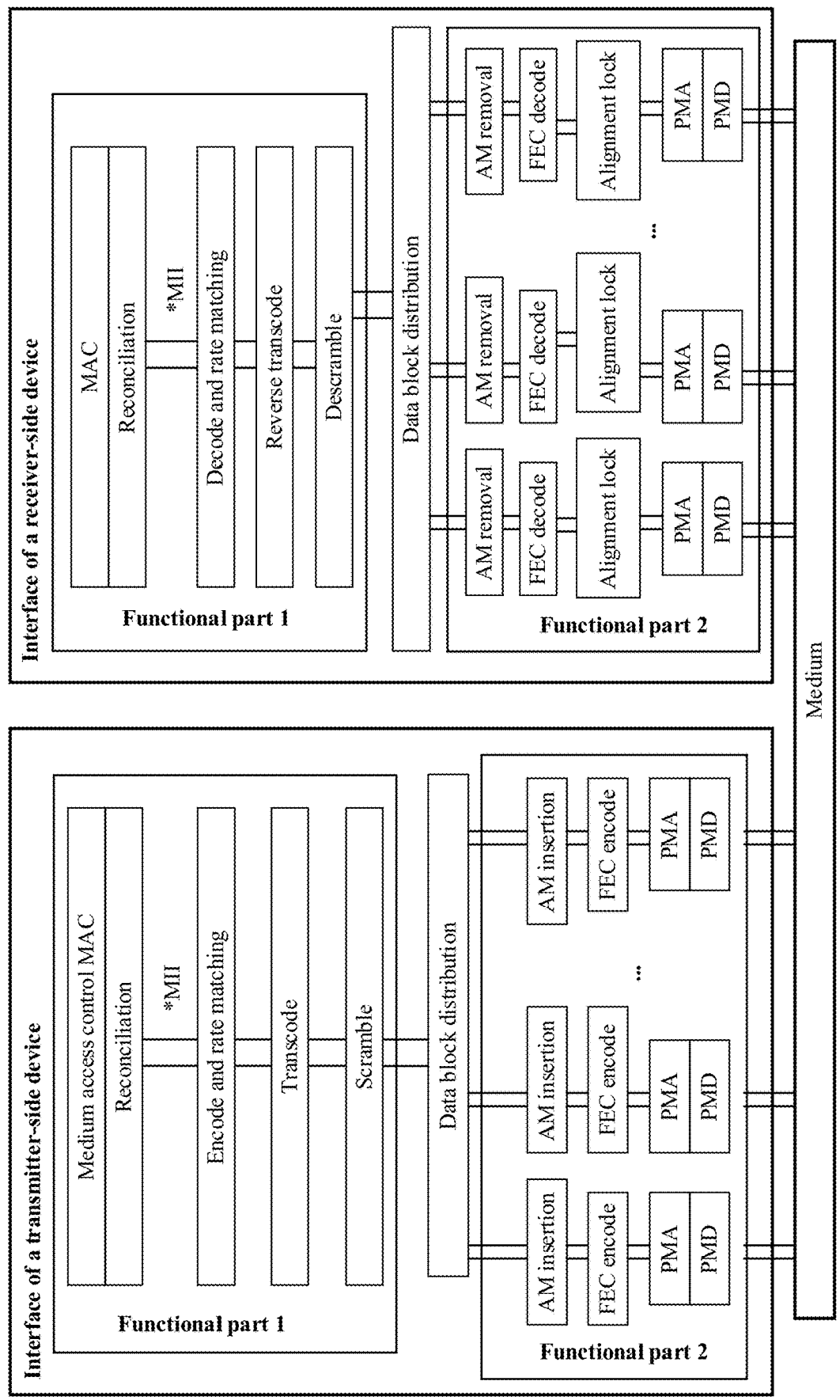
FIG. 6D is a schematic diagram of a communication system including the interface in FIG. 6C.

As shown in FIG. 6D, a communication system includes a transmitter-side device and a receiver-side device. The transmitter-side device includes the interface shown in FIG. 6C, and the receiver-side device includes an interface corresponding to the interface shown in FIG. 6C. The interface of the receiver-side device includes a functional part 1, a functional part 2, and a data block distribution module located between the functional part 1 and the functional part 2. The functional part 1 includes a MAC module, an RS module, a decode and rate matching module at a PCS layer, a reverse transcode module, and a descramble module. The functional part 2 includes a plurality of functional units, and each functional unit includes an alignment marker removal (AM Removal) module, an FEC decode module, an alignment lock module, and a PMA/PMD module. The functional part 1 is coupled to and communicates with the functional part 2 through the data block distribution module. Functions of the functional modules, namely, the MAC module, the RS module, the decode and rate matching module, the reverse transcode module, the data block distribution module, the descramble module, the alignment marker removal (AM Removal) module, the FEC decode module, the alignment lock module, the PMA module, and the PMD module, of the receiver-side device in FIG. 6D are similar to functions of corresponding modules in FIG. 4C. Details are not described herein again. In the transmitter-side device, a MAC module processes a received packet to obtain a data frame, and forwards the data frame to an RS module. The RS module converts the received data frame into data of a corresponding bit width, and sends the converted data to an encode and rate matching module. The encode and rate matching module processes the data to generate a 64B/66B block. A transcode module receives the data block processed by the encode and rate matching module, and transcodes the data block. A specific format of data transcoded by the transcode module includes 256B/257B, 512B/513B, 256B/258B, or 512B/514B. A specific transcoding manner is not limited in this application. A data flow transcoded by the transcode module is scrambled by a scramble module and then sent to a data block distribution module. The data block distribution module distributes the received data flow to m flows of functional units in a functional part 2 of the transmitter-side device, where m is an integer greater than or equal to 1. An alignment marker insertion (AM Insertion) module in each of the m flows of functional units adds an alignment marker (AM) to the received data flow, and then sends the data flow to an FEC encode module. The FEC encode module performs FEC encoding processing on the received data flow, and then sends a processed data flow to a PMA module. The data flow is sent to a transmission medium through the PMA module and a PMD module. Processing performed by the alignment marker insertion module in the transmitter-side device on the data flow is inserting an alignment marker, which is referred to as AM insertion. That the data block distribution module distributes the received data flow to m flows of functional units in a functional part 2 of the transmitter-side device includes: The data block distribution module performs round-robin distribution on a scrambled data flow at a specific granularity (for example, 1 bit, 2 bits, 8 bits, or 10 bits), and distributes the received data flow to the m flows of functional units in the functional part 2 of the transmitter-side device.

In the receiver-side device, the receiver-side device receives, through the transmission medium, the data flow sent by the transmitter-side device including the interface shown in FIG. 6C. m flows of data sent by the transmitter-side device respectively enter m flows of functional units in the functional part 2 of the receiver-side device. For each of the m flows of functional units in the receiver-side device, the PMD module converts the received data that conforms to a transmission format of the transmission medium into data that conforms to a format of the receiver-side device, and sends the data to the PMA module. The PMA module performs parallel-to-serial conversion on the received data and sends a converted data to the alignment lock module. Aligned data enters the FEC decode module. The FEC decode module performs FEC decode on the data, the alignment marker is removed, and then the data is sent to the data block distribution module. The data block distribution module sends the m received flows of data to the descrambling module of the functional part 1 of the interface of the receiver-side device. The descramble module performs descrambling processing on the received data and then sends the data to the transcode module. The transcode module performs reverse transcoding processing on the received data, for example, transcodes data of formats such as 256B/257B, 512B/513B, 256B/258B, and 512B/514B into a 64B/66B code block. The reverse transcode module sends the generated 64B/66B code block to the decode and rate matching module. The decode and rate matching module processes the 64B/66B block to obtain data of a corresponding bit width, and sends the data of the corresponding bit width to the RS module. The RS module processes the data of the corresponding bit width to obtain a data frame, and sends the data frame to the MAC module for processing. The MAC module processes the data frame to obtain the packet sent by the transmitter-side device. Processing of removing the alignment marker in the received data flow by the alignment marker removal (AM Removal) module of the receiver-side device is also referred to as AM removal, processing performed by the RS module of the receiver-side device on the data of the corresponding bit width is referred to as reconciliation, and processing of the FEC decoding by the FEC decode module of the receiver-side device on the data flow is referred to as FEC decoding.

In some embodiments, a transmitter-side device includes the interface shown in FIG. 6A or FIG. 6C, and a receiver-side device includes an IEEE 802.3 standard interface. m flows of data processed by the transmitter-side device enter the receiver-side device through a medium. PMA of the interface of the receiver-side device converts the m received flows of data into data. The data is sent to an alignment marker removal module after serial-to-parallel/parallel-to-serial conversion is performed by the PMA module on the data. Aligned data enters an FEC decode module. The FEC decode module performs FEC decoding on the received data and sends the data to a descramble module. The descramble module descrambles the received data and sends the data to a transcode module. The transcode module transcodes the received data. A specific format of the data transcoded by the transcode module includes 256B/257B, 512B/513B, 256B/258B, or 512B/514B. A specific transcoding manner is not limited in this application. A block obtained by reverse transcoding is sequentially processed by a data block distribution module, a decode and rate matching module, and an RS module, and then arrives at a MAC module. In some embodiments, the RS module is connected to the decode and rate matching module through an MII.

In some embodiments, in the m flows of functional units in the functional part 2 in FIG. 6A to FIG. 6D, each flow of functional units may not include a PMA module or a PMD module, and the m flows of functional units share one PMA module and one PMD module.

In some embodiments, a functional part 2 of an interface in embodiments of this application may be extended, and may include two levels or even a plurality of levels of functional parts 2. For example, in FIG. 7A, FEC concatenation is implemented by using two levels of functional parts 2, to increase a transmission distance. A functional part 1 includes MAC, an RS, and an encode and rate matching functional unit at a PCS layer. A functional part 2 includes two levels. The first level includes a plurality of first-level functional units. Each first-level functional unit includes a transcode module, a scramble module, an alignment marker insertion module, an FEC encode module, and a PMA module. The second level includes a plurality of second-level functional units, the second-level functional units are in one-to-one correspondence with the first-level functional units. Each second-level functional unit includes a PCS/FEC/PMA module and a PMD module. The functional part 1 is coupled to and communicates with the functional part 2 through a data block distribution module.

Figure 7A:
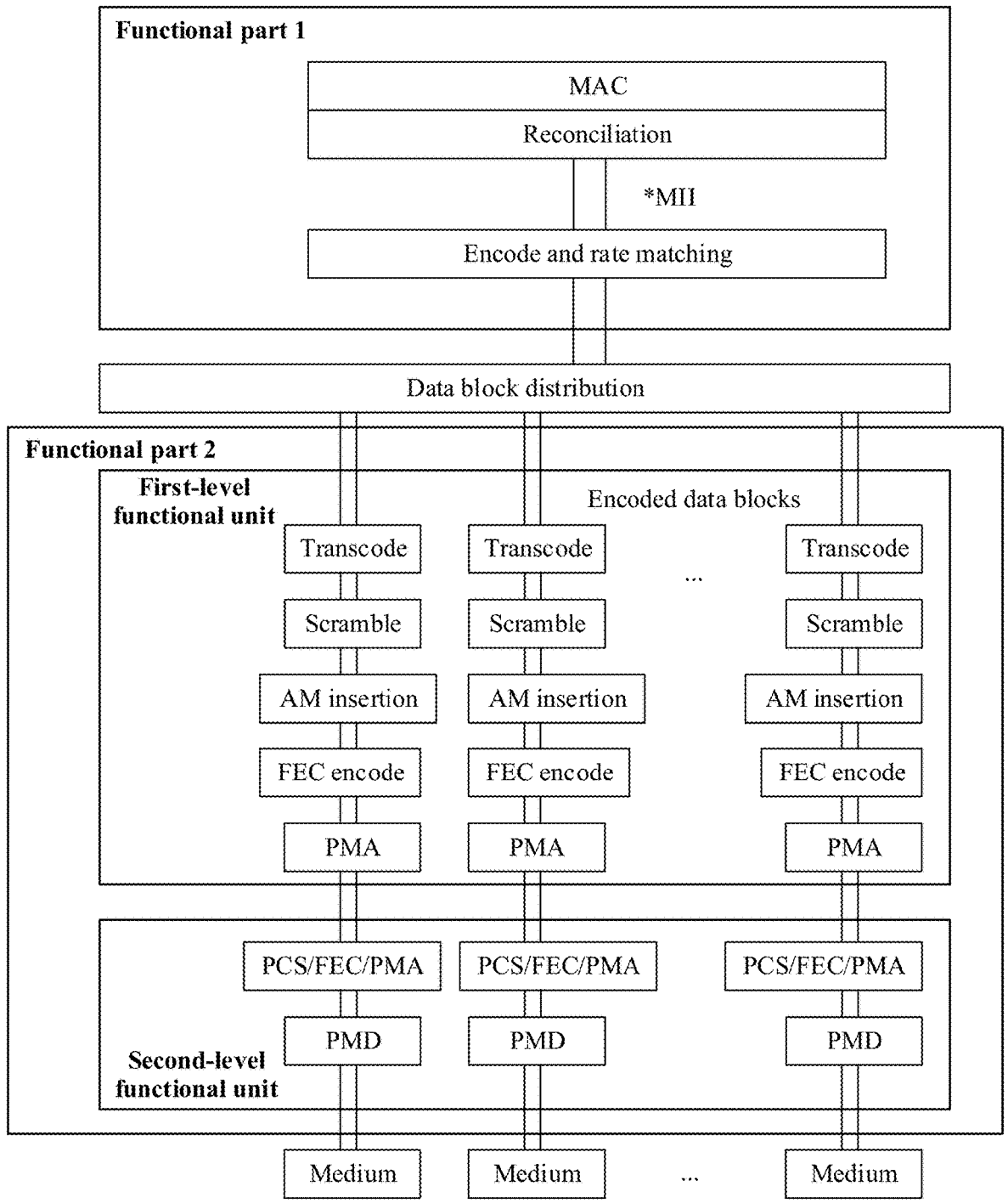
FIG. 7A is a schematic diagram of an architecture of an interface according to still another embodiment.

An interface shown in FIG. 7A includes a functional part 1, a functional part 2, and a data block distribution module. The functional part 2 includes m flows of first-level functional units and m flows of second-level functional units, and the m flows of second-level functional units are in one-to-one correspondence with the m flows of first-level functional units. The functional part 1 includes a MAC module, an RS module, and an encode and rate matching module. Each first-level functional unit includes a transcode module, a scramble module, an alignment lock module, an FEC encode module, and a PMA module. Each second-level functional unit includes a PCS module, an FEC module, and a PMA/PMD module.

Figure 7B:
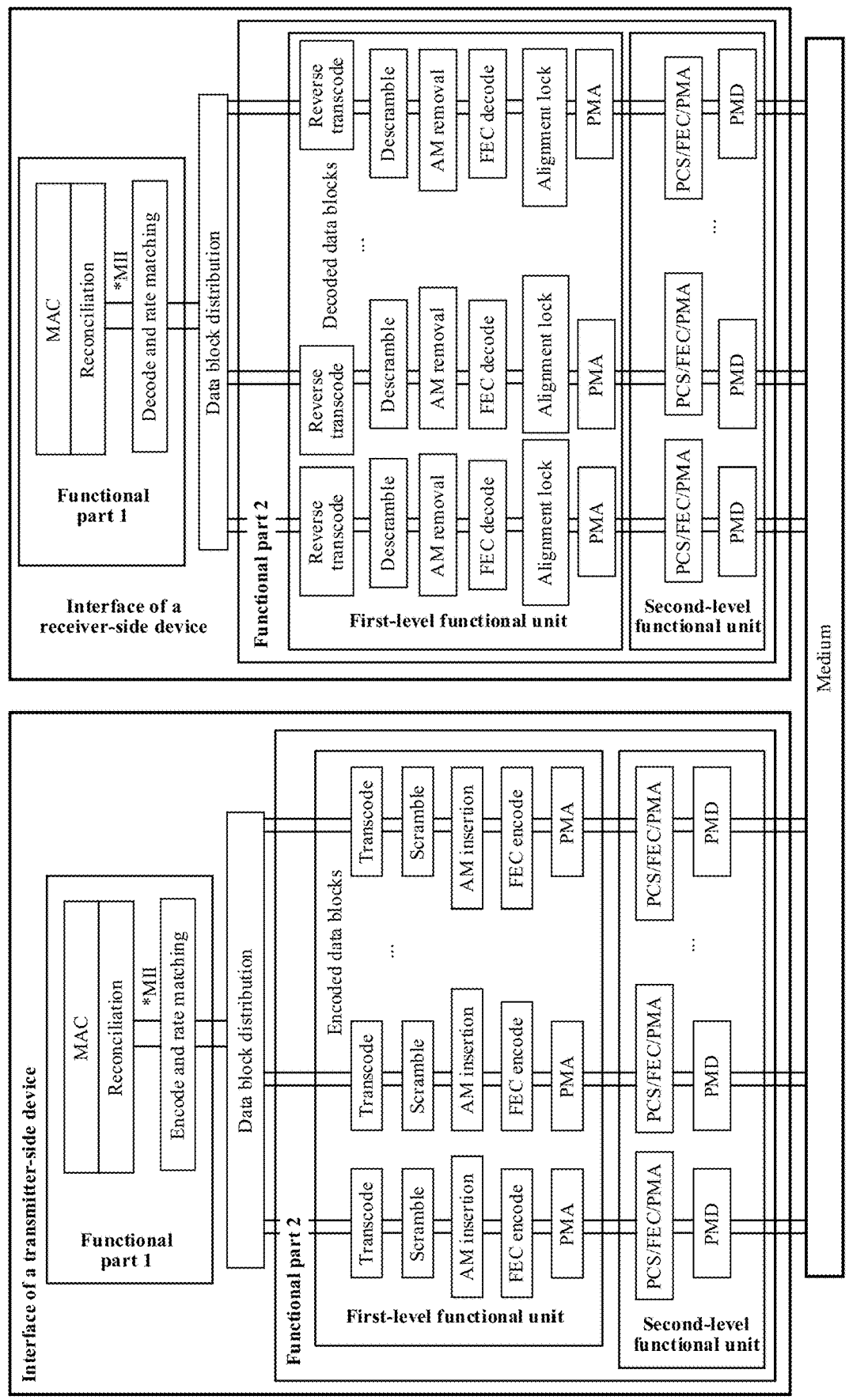
FIG. 7B is a schematic diagram of a communication system including the interface in FIG. 7A.

As shown in FIG. 7B, a communication system includes a transmitter-side device and a receiver-side device. The transmitter-side device includes the interface shown in FIG. 7A, and the receiver-side device includes an interface corresponding to the interface in FIG. 7A. In the transmitter-side device, a MAC module processes a received packet flow to obtain a data frame, and forwards the data frame to an RS module. The RS module converts the received data frame into data of a corresponding bit width, and sends the converted data to an encode and rate matching module. The encode and rate matching module processes the data to generate a data block, for example, a 64B/66B block, and sends the data block to a data block distribution module. The data block distribution module receives the data block processed by the encode and rate matching module, and distributes the data block to m flows of first-level functional units in a functional part 2 of the transmitter-side device, where m is a positive integer greater than or equal to 1. A method for the data block distribution module to distribute the data block to the m flows of first-level functional units in the functional part 2 and a function of each module in each flow of first-level functional units are similar to those in the foregoing embodiments. Details are not described herein again. m flows of data processed by the transmitter-side device enter the receiver-side device through a medium. A second-level functional unit, a first-level functional unit, a data block distribution module, an decode and rate matching module, an RS module, and a MAC module of the interface of the receiver-side device sequentially process the m received flows of data to obtain an Ethernet frame. The m flows of data processed by the transmitter-side device arrive, through the medium, at m flows of second-level functional units corresponding to the interface of the transmitter-side device in the second-level functional units. A PMD module and a PCS/FEC/PMA module in each flow of functional units convert the received data into data. The data enters each flow of corresponding first-level functional units in the first-level functional units. A PMA module in each flow of first-level functional units performs serial-to-parallel/parallel-to-serial conversion on the received data and sends a converted data to an FEC decode module. The FEC decode module performs FEC decoding on the received data. Data obtained by the FEC decoding is sequentially processed by an alignment marker removal (AM removal) module, a descramble module, and a transcode module, and then arrives at the data block distribution module. The alignment marker removal module removes an alignment marker from the data. The descramble module descrambles data from which the alignment marker is removed. Descrambled data arrives at the reverse transcode module. The reverse transcode module performs reverse transcoding processing on the received data. A specific format of the data transcoded by the transcode module includes 256B/257B, 512B/513B, 256B/258B, or 512B/514B. A specific transcoding manner is not limited in this application. A transcoded block is sequentially processed by the data block distribution module, the decode and rate matching module, and the RS module, and then arrives at the MAC module. In some embodiments, the RS module is connected to the decode and rate matching module through an MII.

Figure 7C:
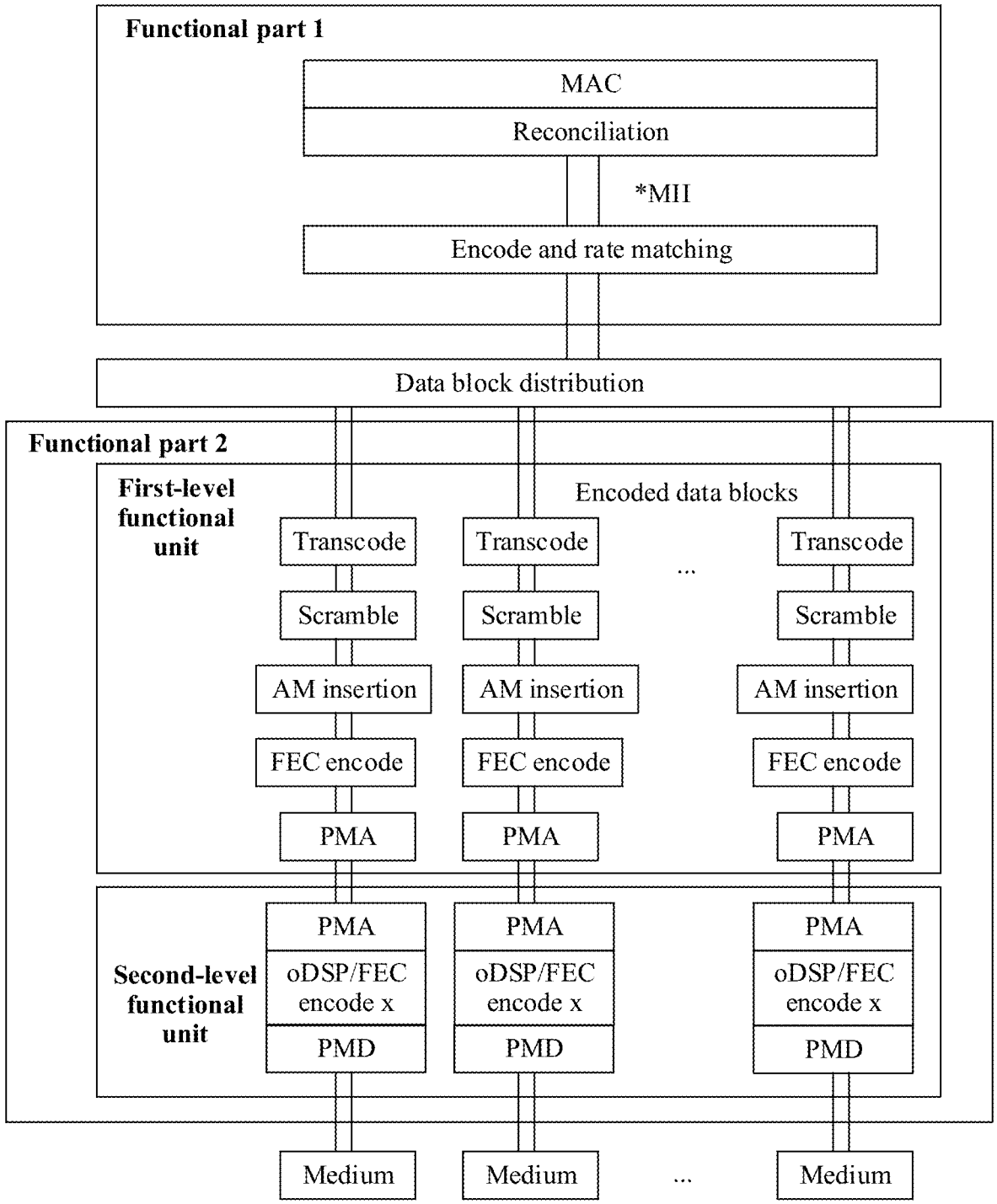
FIG. 7C is a schematic diagram of an architecture of an interface according to still another embodiment.

Refer to FIG. 7C. A second-level functional unit further includes an integrated package optical digital signal processor (oDSP). An output of PMA in the second-level functional unit enters the oDSP. A data flow or a data frame flow that is output after being processed by the oDSP may be sent to PMD, processed by the PMD, and then enter a laser; or a data flow or a data frame flow output by the oDSP is modulated and used as a drive signal of a laser, without a need of passing through the PMD module. Modulation may be completed by the oDSP or another modulator.

Optionally, the oDSP may further include a new FEC encoding function (FEC encoding x), to encoding data processed by the oDSP. FEC encoding in a first-level functional unit is RS FEC encoding. Secondary FEC encoding is performed after processing by the oDSP. The secondary FEC encoding may be BCH FEC or RS FEC encoding.

Optionally, the second-level functional unit may further include an FEC decode module. The FEC decode module decodes the data flow or the data frame flow that is encoded by the FEC encode module in the first-level functional unit, and a decoded data flow enters the FEC encoding x in the oDSP in the second-level functional unit for secondary FEC encoding. The FEC decode module is located in the first-level functional unit or the second-level functional unit. The FEC encoding x may be set in the oDSP or set independently.

In some embodiments, a communication system includes a transmitter-side device and a receiver-side device. The transmitter-side device includes an interface in FIG. 7C, and an interface included in the receiver-side device is an interface of any architecture, for example, an interface in FIG. 4A, FIG. 4B, FIG. 7A, or FIG. 7B, or an IEEE 802.3 standard Ethernet interface.

In some embodiments, a communication system includes a transmitter-side device and a receiver-side device. The transmitter-side device includes an interface in FIG. 7C, and an interface included in the receiver-side device is an interface of any architecture, for example, an interface in FIG. 4A, FIG. 4B, FIG. 4G, FIG. 5A, FIG. 6A, FIG. 7A, FIG. 7C, FIG. 8, FIG. 9, FIG. 10, FIG. 11, or FIG. 12A, or an IEEE 802.3 standard Ethernet interface.

In FIG. 3 to FIG. 7, in the diagrams of each group of functional units in a functional part 2, each block diagram represents only a function, and does not represent a quantity of circuits and modules that perform the function. For example, in an FEC function, a plurality of FEC encoders/decoders may be included. Data obtained by FEC encoding is not necessarily output through a single lane, but is output through a plurality of virtual lanes (or PCS lanes).

The following describes in detail the technical solutions in embodiments of this application based on a specific MAC rate.

Embodiment 1: a functional part 2 includes a group of functional units that support a MAC rate of 800 Gb/s.

Figure 8:
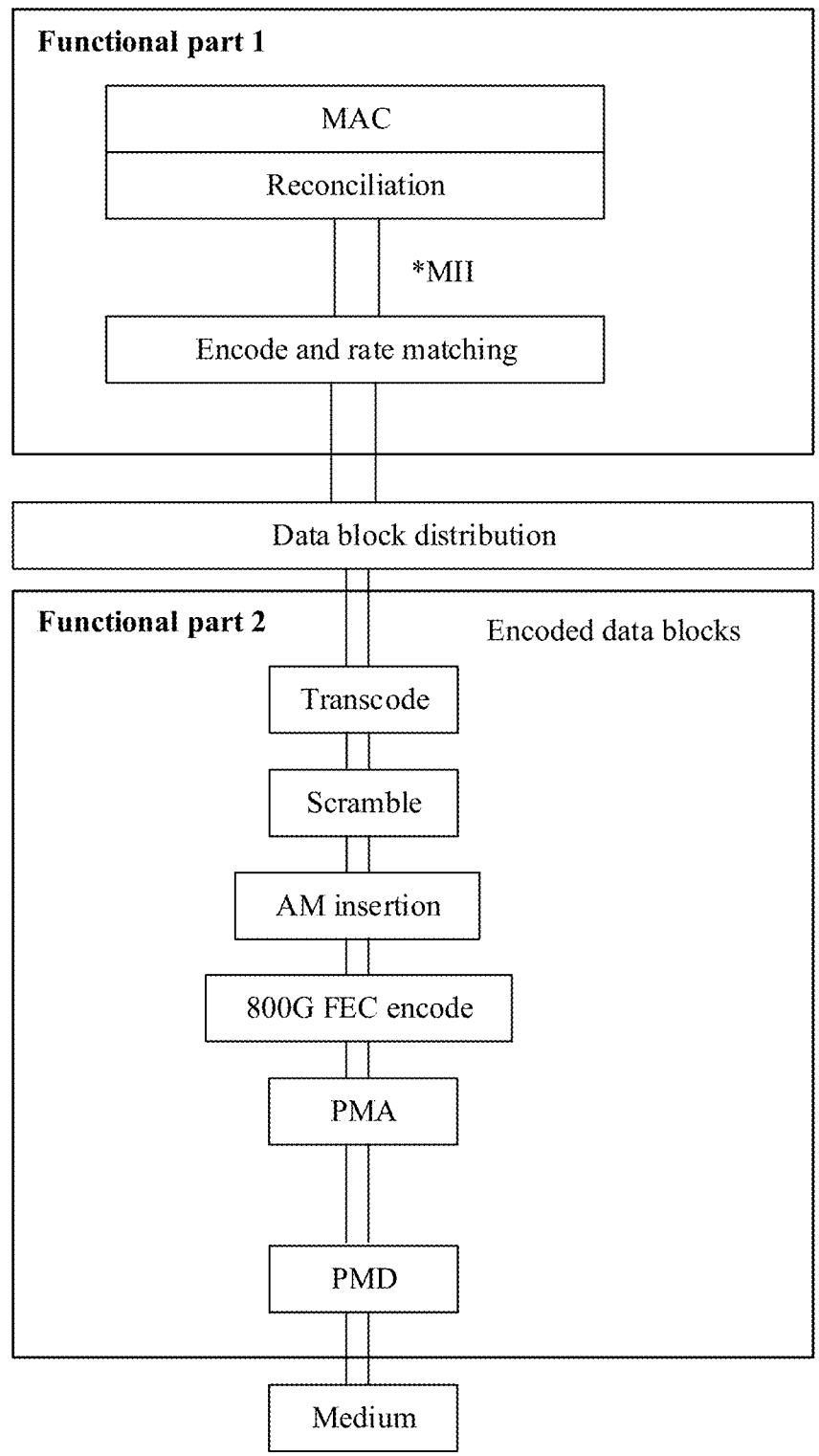
FIG. 8 is a schematic diagram of an architecture of an interface according to Embodiment 1.

FIG. 8 is a schematic diagram of a structure of a possible 800GE interface. The interface includes a functional part 1, a functional part 2, and a data block distribution module located between the functional part 1 and the functional part 2. The functional part 1 includes a MAC module, an RS module, and an encode and rate matching module. The functional part 2 includes a transcode module, a scramble module, an alignment lock module, an FEC encode module, a PMA module, and a PMD module. The FEC encode module is configured to implement FEC encoding on a data flow. 66-bit data blocks encoded based on 64B/66B are output. These data blocks enter the functional part 2 through the data block distribution in an original sequence, and processing operations in the functional part 2 are performed one by one. The functional part 2 includes one or more groups of functional units. Each group of functional units include a transcode module, a scramble module, an AM insertion module, an 800G FEC module, a PMA module, and a PMD module. Transcoder herein may be a 64B/66B-to-256B/257B transcoding the same as that in IEEE 802.3-2018. AM insertion may be an AM insertion manner similar to that for 200GE/400GE interface. FEC encoding may be Reed-Solomon RS-FEC to perform encoding and interleaving of a plurality of code blocks. After the encoding, data is interleaved and distributed to a plurality of PCS lanes based on an FEC symbol (10-bit symbol), and then adaptation to PMD of a plurality of types is implemented through Bit-mux at a PMA layer.

In some embodiments, the functional part 2 may include a plurality of functional units, and each functional unit includes a transcode module, a scramble module, an alignment marker insertion module, an FEC encode module, a PMA module, and a PMD module. For a specific implementation, refer to the foregoing embodiments. The interface shown in FIG. 8 may be applied to a transmitter-side device. For a data processing method of the transmitter-side device, refer to the foregoing embodiments.

Embodiment 2: A functional part 2 includes two groups of functional units, and a 1.6 TbE interface is implemented by using the technology in Embodiment 1.

Figure 9:
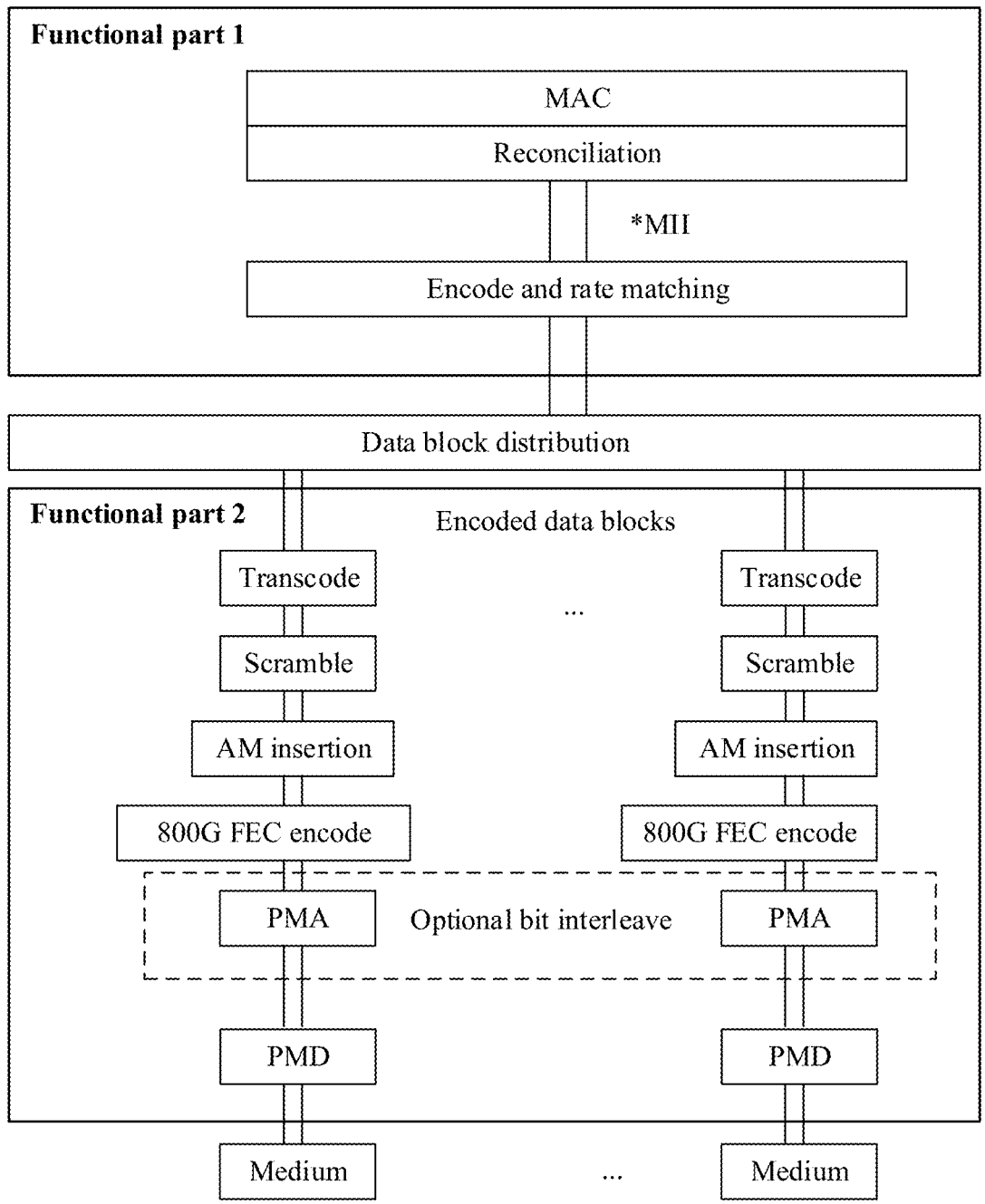
FIG. 9 is a schematic diagram of an architecture of an interface according to Embodiment 2.

Based on the architecture of the interface shown in FIG. 8, as shown in FIG. 9, 1.6 Tb/s Ethernet MAC can be supported by implementing functional units in two groups of functional parts 2. A MAC module, an RS module, and an encode and rate matching module are located in a functional part 1, and are similar to those in Embodiment 1 in terms of functions, except that a rate is doubled. A data block distribution module distributes encoded 66-bit data blocks to the two groups of functional units in the functional part 2 in a round-robin mode. Therefore, a running rate and a running manner of each group of functional units are the same as those in Embodiment 1. A PMA layer may perform a simple bit level operation across functional units, that is, perform Bit-mux on two parts of data, to support PMD of a plurality of types.

Embodiment 3: A functional part 2 is concatenated to implement FEC concatenation.

Figure 10:
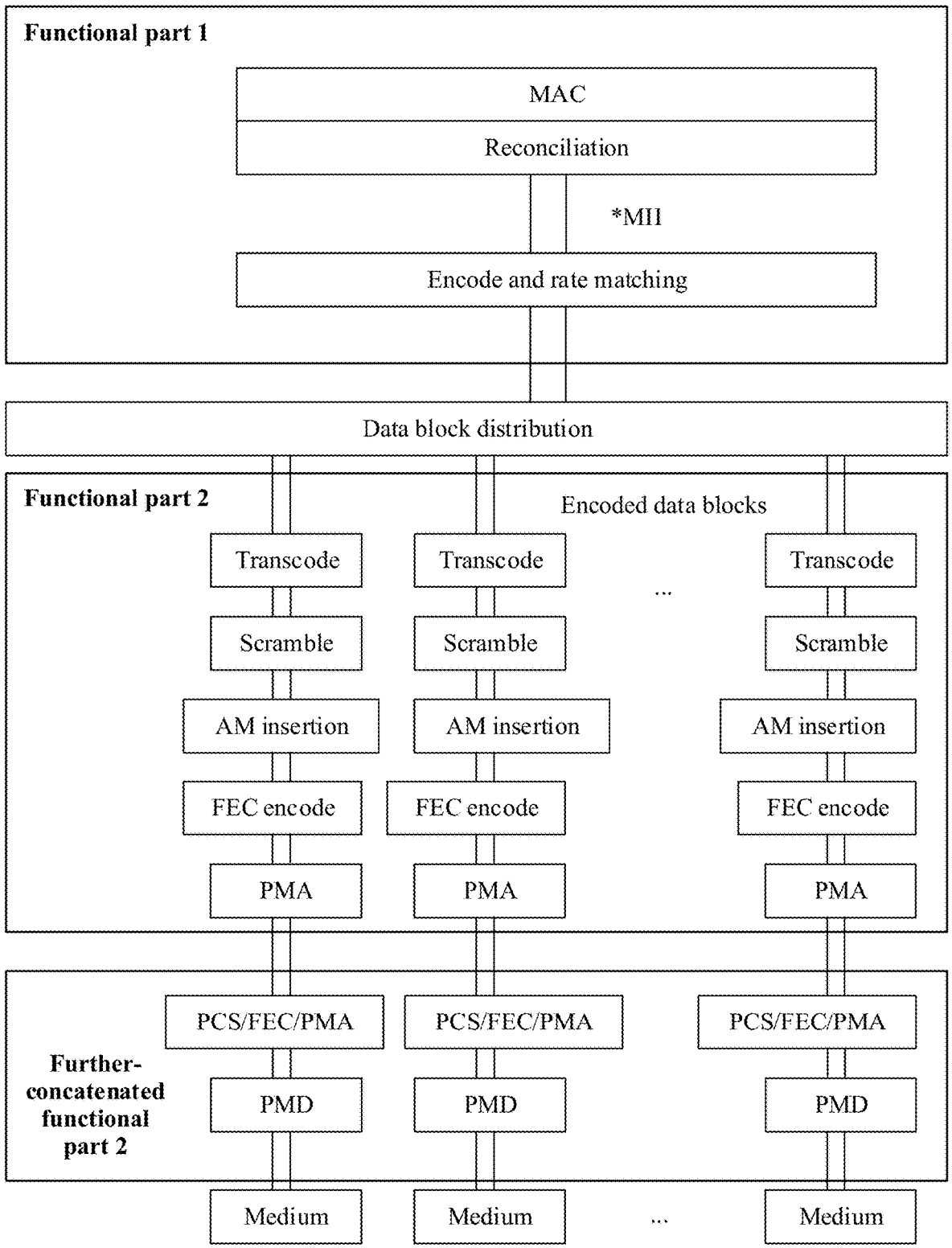
FIG. 10 is a schematic diagram of an architecture of an interface according to Embodiment 3.

In FIG. 10, a functional part 1 includes a MAC function, an RS function, and an encode and rate matching function. 66-bit data blocks encoded based on 64B/66B are output. These data blocks enter the functional part 2 through data block distribution in an original sequence, and processing operations in the functional part 2 are performed one by one. The functional part 2 includes a first level and a second level, and functional units in the two levels are different. For example, the first level in the "functional part 2" includes a plurality of groups of functional units, and each group of functional units include a plurality of functional submodules such as a transcode submodule, a scramble submodule, an alignment marker insertion submodule, an FEC encode submodule, and a PMA submodule. Data processed by the first level enters the second level. In a "concatenated functional part 2", that is, in the second level, a second-level FEC encoding operation may be performed on an output data flow from an upper layer. The second level includes functional units in one-to-one correspondence with those in the first level, and each functional unit includes PCS/FEC/PMA and PMD. Functions of the two levels of the functional part 2 are to process data transmitted from an upper layer of the two levels, without a need of sensing a protocol of MAC data in the functional part 1. A typical scenario of this embodiment may be a scenario in which a host chip (e.g. host ASIC) is externally connected to an optical digital signal processor (oDSP). The second-level functional part 2 may not terminate FEC of the upper layer, but directly performs FEC encoding in the second level. For example, FEC in the first level is RS (544,514) FEC encoding, and FEC in the second level may be one or more of BCH codes (Bose-Chaudhuri-Hocquenghem codes) FEC, polar FEC, low density parity check (low density parity check, LDPC)

FEC, concatenated FEC (CFEC), open FEC (OFEC), Turbo product code (TPC) FEC, and source coding FEC (SCFEC).

Embodiment 4: A functional part 2 is concatenated to implement FEC concatenation.

Figure 11:
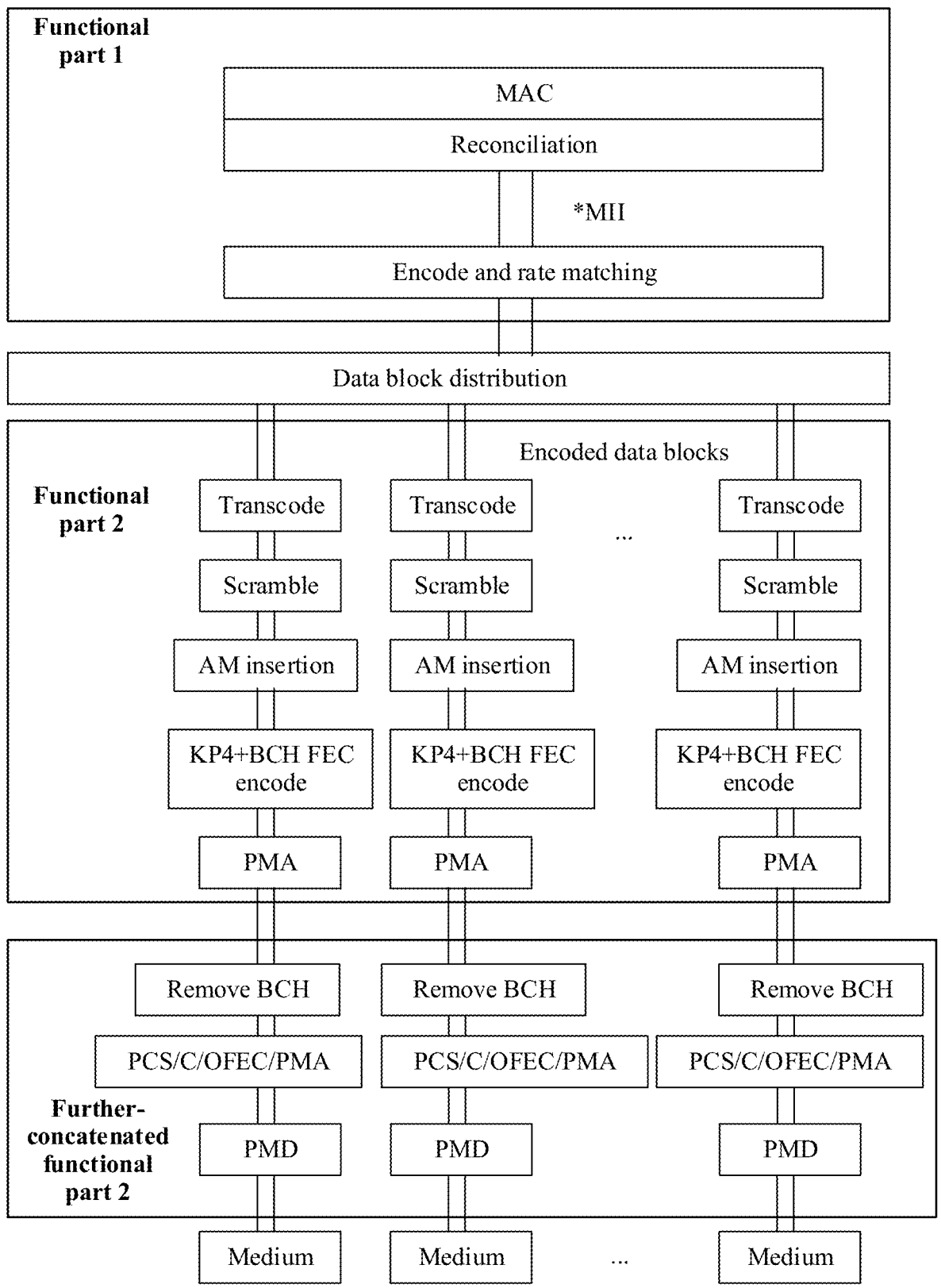
FIG. 11 is a schematic diagram of an architecture of an interface according to Embodiment 4.

As shown in FIG. 11, similar to Embodiment 3, in some scenarios, stronger FEC protection may be required between two functional parts 2. As shown in FIG. 11, an upper-layer functional part 2 already includes concatenated FEC, and RS+BCH concatenation is used. However, in a concatenated functional part 2, due to a data overhead limitation and a SerDes rate limitation, an inner code of the concatenated FEC may need to be removed first, and then encapsulation is implemented by a stronger FEC frame in an oDSP. In this case, in the concatenated functional part 2, no operation needs to be performed on a data flow corresponding to a MAC rate of a functional part 1, but only a data flow corresponding to a rate of one functional unit in the upper-layer functional part 2 is processed.

According to the technical solutions of this application, through multi-flow parallelism of the functional part 2, one flow of functional units may be replicated into a plurality of flows of functional units, and any rate is implemented through combination of the functional units, to finally implement reuse of investments of the functional units and greatly reduce Ethernet interface costs.

In some embodiments, an Ethernet interface is divided into two layers of functional parts from a logical-layer architecture: a functional part 1 that performs processing based on a total data rate of a specific interface, and a functional part 2 that performs processing based on a subset (a part of the total data rate) of the specific interface. The functional part 2 includes at least one functional unit. In some embodiments, the functional part 2 includes two or more functional units.

In some embodiments, the functional part 1 completes data processing based on the specific total data rate, and includes a MAC sublayer and an RS sublayer in a current Ethernet standard, and a 64/66B encode/decode sublayer subordinate to a PCS sublayer. The functional part 1 may further include a transcode sublayer, a scramble/descramble sublayer, or a complete PCS/FEC/PMA sublayer of the specific total data rate based on different embodiments.

In some embodiments, the functional part 1 distributes data to functional units subordinate to the functional part 2 in a round-robin mode based on a specific rule or sequence, and a data block that does not reflect content of a packet format of the specific interface rate is obtained through distribution. A granularity of the data block may be a bit, 64/66B, 256/257B after transcoding, another different transcoded data form, an FEC symbol, or a combination thereof.

In some embodiments, each functional unit of the functional part 2 performs, on the data block from the functional part 1, PCS/FEC/PMA layer processing required for further data transmission. However, panoramic information of the specific interface rate of the functional part 1 does not need to be known for the processing. To be simple, it is understood as that each functional unit considers only information about data received by the functional unit and performs reinterleaving and recombination to form a data block, and further performs the PCS/FEC/PMA layer processing based on the data block. Content information that can be reflected only by sensing data of total data rate of the functional part 1 does not need to be processed in a combination process, and the process is implemented without a need of recovering or sensing specific information (such as Idle and Preamble/SFD) of an Ethernet data frame of the functional part 1. Further, only recombination or interleaving and distribution of bit-level data is performed between different functional units at the PMA layer, and interaction based on sensing of information obtained through multi-bit combination does not need to be performed between a plurality of functional units.

In some embodiments, each functional unit in the functional part 2 works independently, and some or all functions of the functional part 1 of the specific interface rate no longer need to be recovered. For example, the functional part 2 no longer performs unified adjustment of insertion or deletion of Idle in the functional part 1, or no longer performs AM identification in the functional part 1 or no longer recover corresponding data after re-alignment.

In some embodiments, each functional unit in the functional part 2 corresponds to a PMD physical layer subordinate to a functional unit of the functional unit. In this way, theoretically, a plurality of functional units may be combined in any quantity to form a physical layer solution required by an Ethernet interface matching the specific rate, to implement an Ethernet architecture independent of a rate.

In some embodiments, an interface in embodiments of this application is an independent chip or a functional module deployed on another device.

In some embodiments, an interface in embodiments of this application is located on a network device, a workstation, a storage device, or a server.

In some embodiments, the workstation may be various types of devices such as a host, a terminal, a server, or a virtual machine. The network device may be a device, for example, a switch or a router, configured to forward a packet in a communication network. In addition, network devices in a same communication network may be a same network device, or may be different network devices. For example, all network devices in a same communication network are routers, or some network devices are routers, and the other network devices are switches.

For non-breakout scenarios in FIG. 1 to FIG. 11 of this application, in a process of inserting an alignment marker, collaborative insertion (for example, insertion based on a bit spacing or a code block spacing) between a plurality of functional units needs to be implemented. In this way, a data block recovery operation can be performed at a receiver side based on a distribution sequence of a distribution unit at a transmitter side.

Embodiment 5: Breakout scenario

Figure 12A:
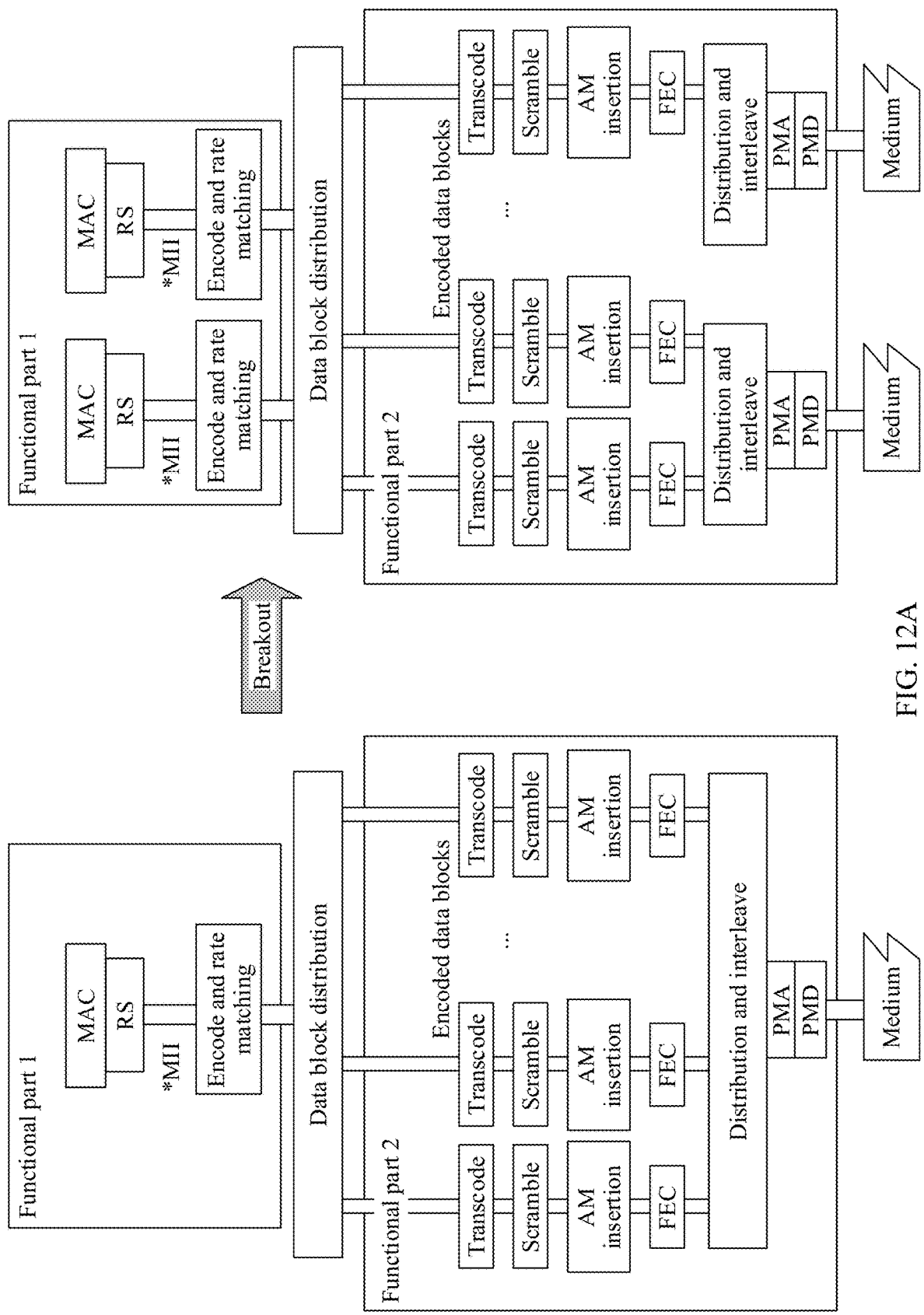
FIG. 12A is a schematic diagram of an architecture of an interface according to Embodiment 5.

In the breakout scenario, a large-capacity port is separated through a physical channel to support a plurality of low-rate ports or interfaces. For example, a 400 GbE port that supports breakout on a switch may support four 100 GbE ports or eight 50 GbE ports through breakout cables, fanout cables, or modules. In this application, because a functional part 2 naturally supports multi-flow parallelism, there is an innate advantage in supporting the breakout scenario. For example, if a functional part 1 already has 1.6 TbE MAC, the functional part 2 has eight flows of functional units, and each flow supports a 200 Gb/s data processing capability, breakout of 2*800 GbE can be implemented in an architecture through a minor change, as shown in FIG. 12A. In this case, the functional part 1 includes a 1.6 TbE functional unit that is divided into two 800 GbE functional units. Each unit is standard 800 GbE MAC. The eight functional units of the functional part 2 remain unchanged. Only a final data aggregation mode is modified: one flow of output is changed into to two flows of outputs. Each flow is a standard 800 GbE physical port.

In the breakout scenario, each unit carries its own Ethernet data flow. An alignment marker insertion process is adaptive. Collaborative insertion between a plurality of functional units does not need to be performed. In other words, a data block recovery operation can be performed at a receiver side based on a distribution sequence of a distribution unit at a transmitter side.

Figure 12B:
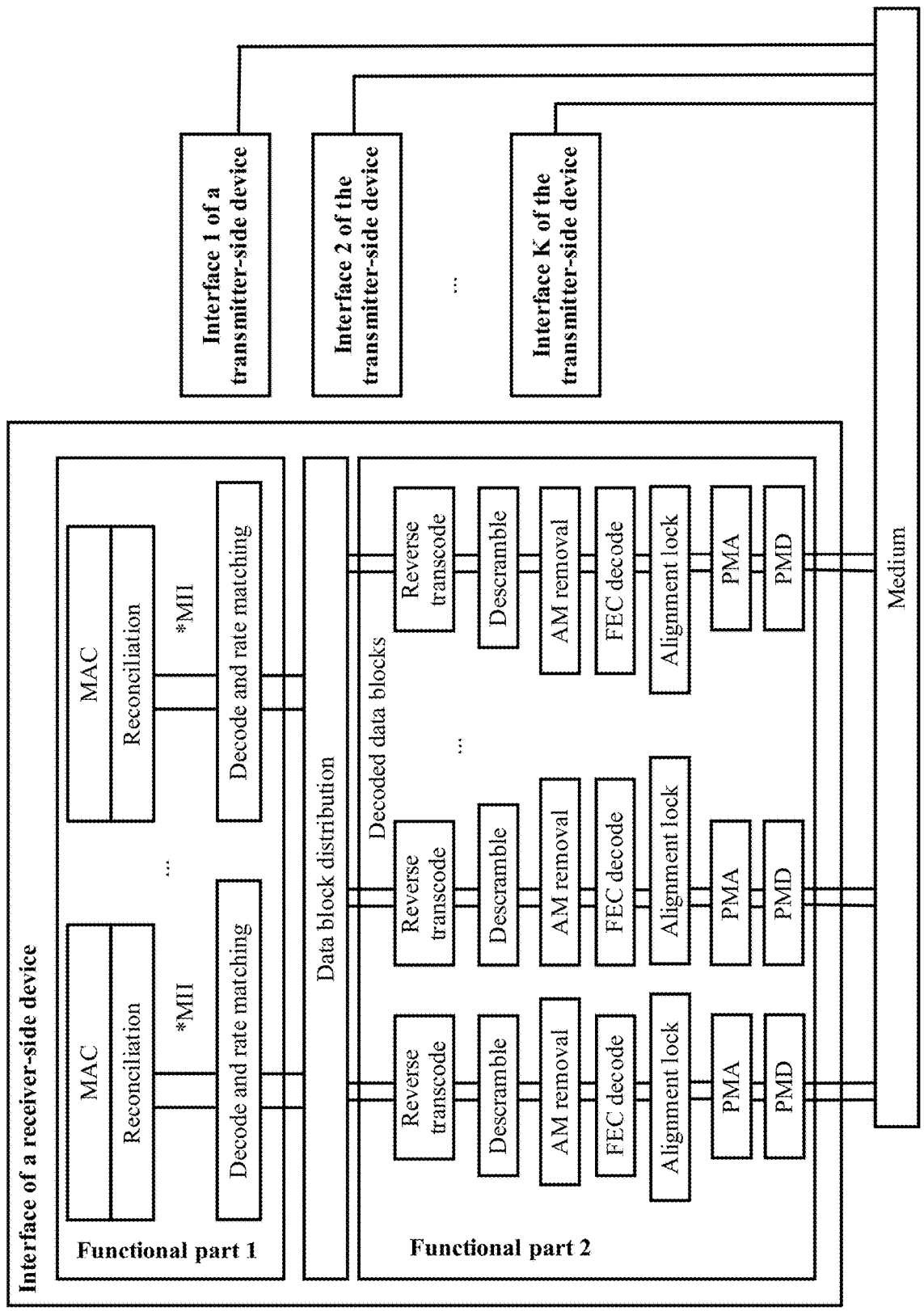
FIG. 12B is a schematic diagram of a communication system including a receiver-side device with an interface corresponding to the interface in FIG. 4A and a transmitter-side device with an IEEE 802.3 standard interface.

Refer to FIG. 12B. In some embodiments, a communication system includes a receiver-side device and a plurality of transmitter-side devices. An interface of the transmitter-side device is an IEEE 802.3 standard Ethernet interface. The receiver-side device includes an interface corresponding to the interface shown in FIG. 4A, but further includes an alignment lock module between a PMA module and an FEC module; and the scramble module in FIG. 4A is replaced with a descramble module, and the alignment marker insertion (AM Insertion) module in FIG. 4A is replaced with an alignment marker removal (AM Removal) module. The interface of the transmitter-side device processes to-be-sent data in a processing manner of an IEEE 802.3 Ethernet interface, and then sends processed data to the receiver-side device through a medium. The interface of the receiver-side device receives the data from the transmitter-side device. In a breakout scenario, the interface of the receiver-side device respectively and correspondingly distributes data from interfaces of the plurality of transmitter-side devices to one or more functional units that are in the interface of the receiver-side device and that correspond to a rate of the interface of the transmitter-side device. For example, four IEEE 802.3 standard Ethernet interfaces with a rate of 200 Gbps send data to the interface shown in FIG. 4A. The interface shown in FIG. 4A receives four flows of data with the rate of 200 Gbps, respectively maps the four flows of data with the rate of 200 Gbps to four functional units with a rate of 200 Gbps in a functional part 2 of the interface, performs processing in the functional part 2, and then performs processing in a functional part 1, to obtain data sent by four transmitter-side devices.

Figure 12C:
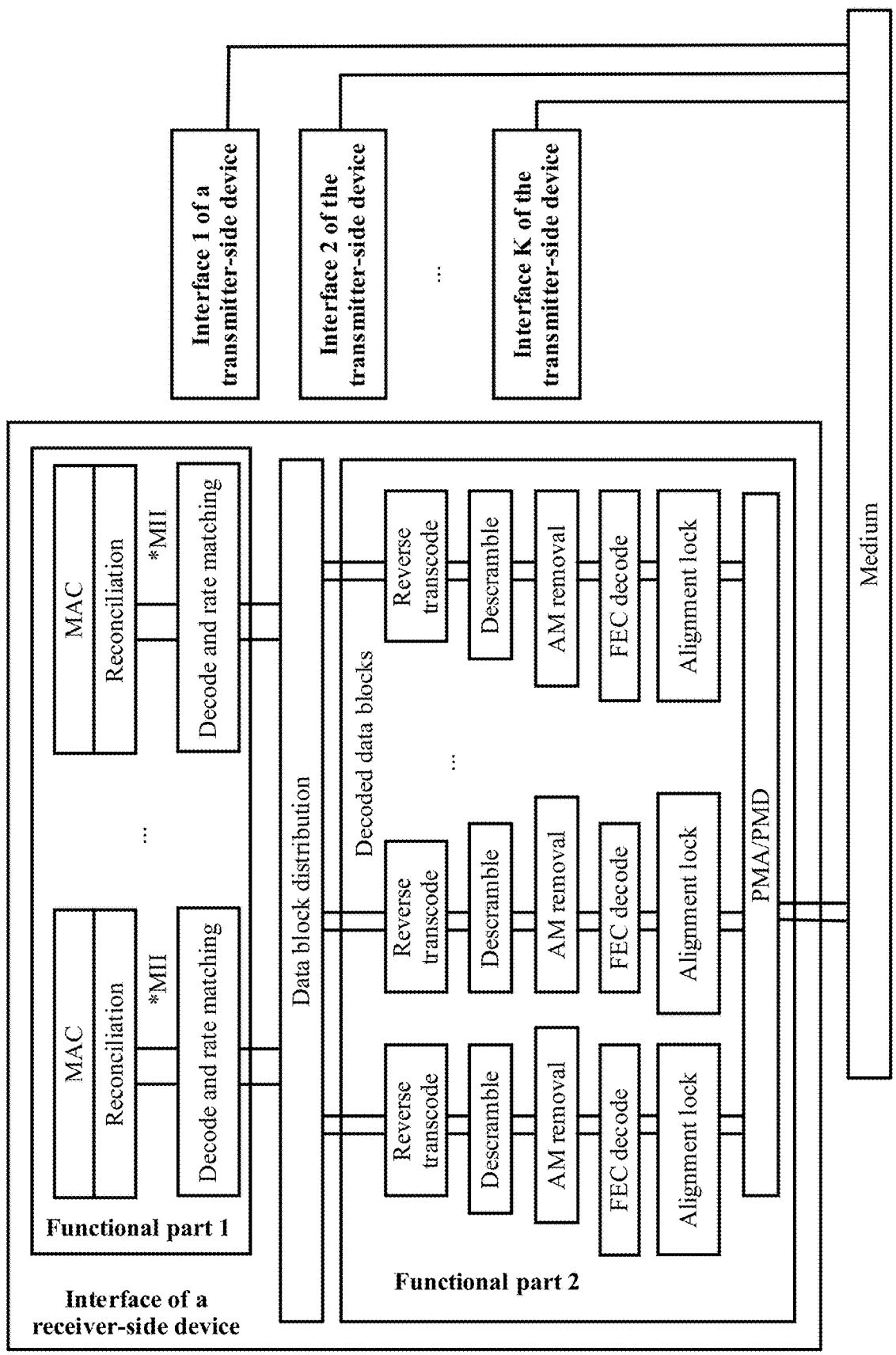
FIG. 12C is a schematic diagram of another communication system including a receiver-side device with an interface corresponding to the interface in FIG. 4B and a transmitter-side device with an IEEE 802.3 standard interface.

Refer to FIG. 12C. A communication system includes a receiver-side device and a plurality of transmitter-side devices. An interface of the transmitter-side device is an IEEE 802.3 standard Ethernet interface. The receiver-side device includes an interface corresponding to the interface shown in FIG. 4B, but further includes an alignment lock module between a PMA module and an FEC module; and the scramble module in FIG. 4B is replaced with a descramble module, and the alignment marker insertion (AM Insertion) module in FIG. 4B is replaced with an alignment marker removal (AM Removal) module. A process in which the interface of the transmitter-side device processes to-be-sent data is similar to an operation of the interface of the transmitter-side device in FIG. 12B. Details are not described herein again.

Figure 12D:
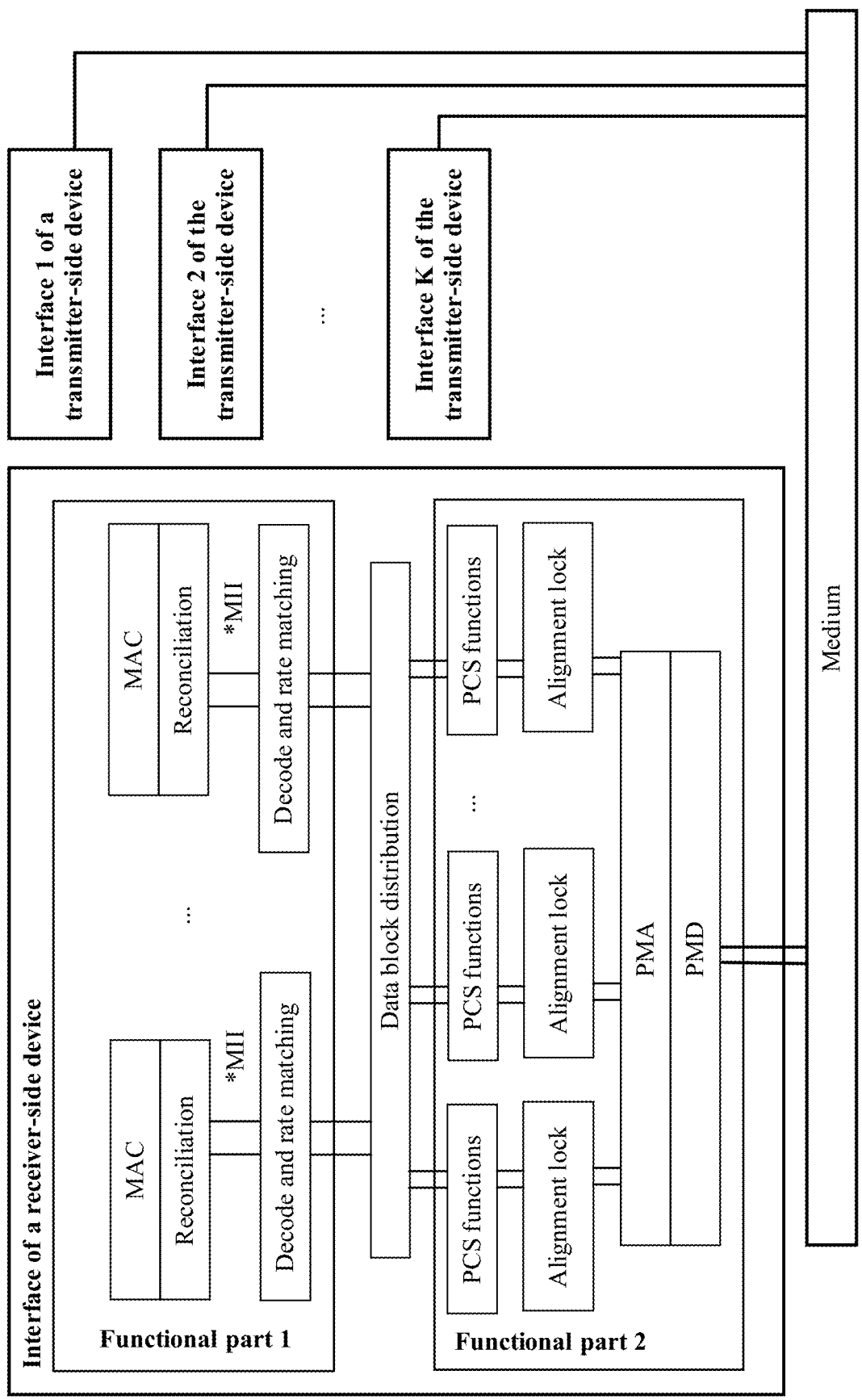
FIG. 12D is a schematic diagram of another communication system including a receiver-side device with an interface corresponding to the interface in FIG. 5A and a transmitter-side device with an IEEE 802.3 standard interface.

Refer to FIG. 12D. A communication system includes a receiver-side device and a plurality of transmitter-side devices. An interface of the transmitter-side device is an IEEE 802.3 standard Ethernet interface. The receiver-side device includes an interface corresponding to the interface shown in FIG. 5A, but further includes an alignment lock module between a PMA module and an FEC module; and the scramble module in FIG. 5A is replaced with a descramble module, and the alignment marker insertion (AM Insertion) module in FIG. 5A is replaced with an alignment marker removal (AM Removal) module. A process in which the interface of the transmitter-side device processes to-be-sent data is similar to an operation of the interface of the transmitter-side device in FIG. 12B. Details are not described herein again.

Figure 12E:
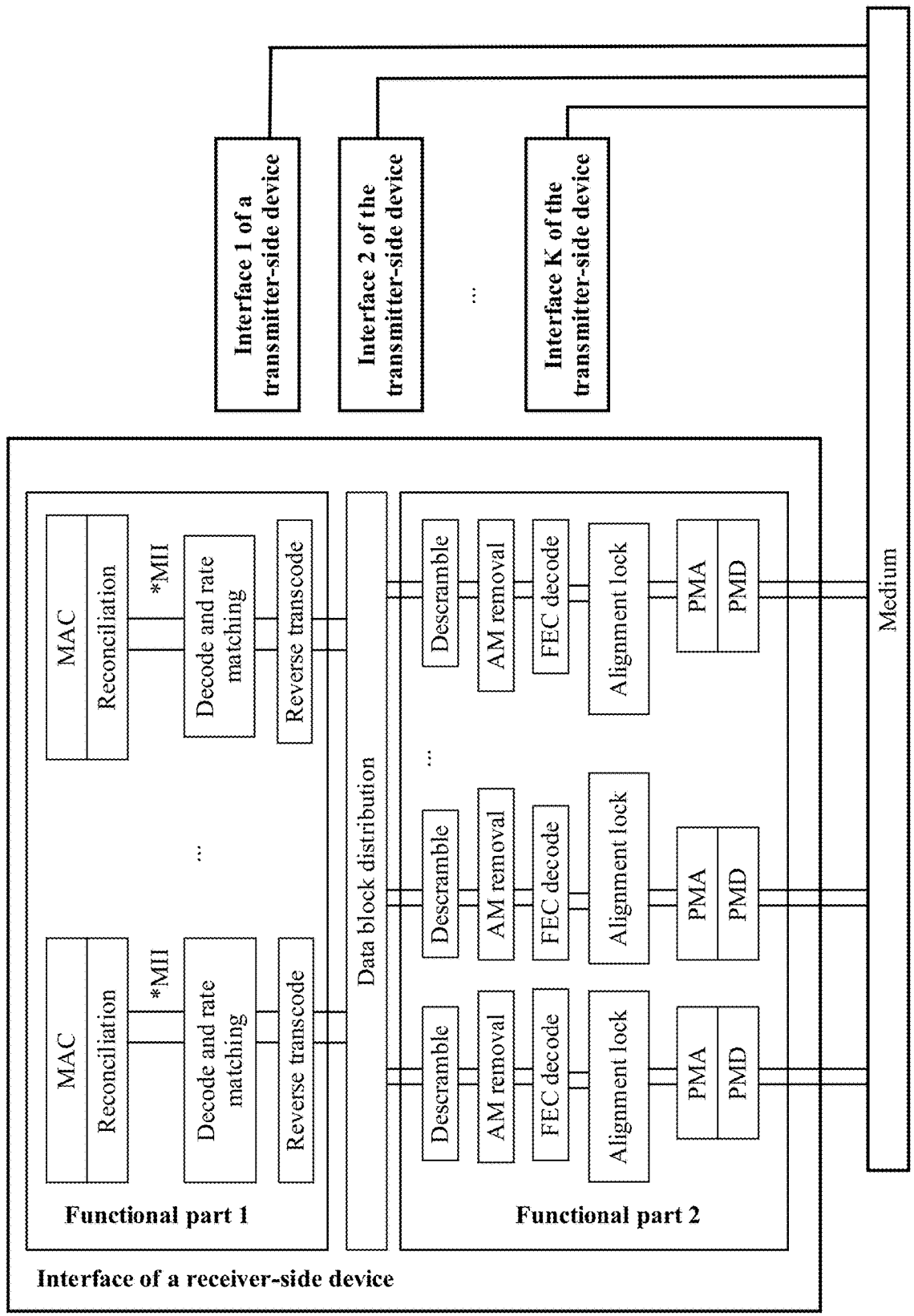
FIG. 12E is a schematic diagram of another communication system including a receiver-side device with an interface corresponding to the interface in FIG. 6A and a transmitter-side device with an IEEE 802.3 standard interface.

Refer to FIG. 12E. A communication system includes a receiver-side device and a plurality of transmitter-side devices. An interface of the transmitter-side device is an IEEE 802.3 standard Ethernet interface. The receiver-side device includes an interface corresponding to the interface shown in FIG. 6A, but further includes an alignment lock module between a PMA module and an FEC module; and the scramble module in FIG. 6A is replaced with a descramble module, and the alignment marker insertion (AM Insertion) module in FIG. 6A is replaced with an alignment marker removal (AM Removal) module. A process in which the interface of the transmitter-side device processes to-be-sent data is similar to an operation of the interface of the transmitter-side device in FIG. 12B. Details are not described herein again.

Figure 12F:
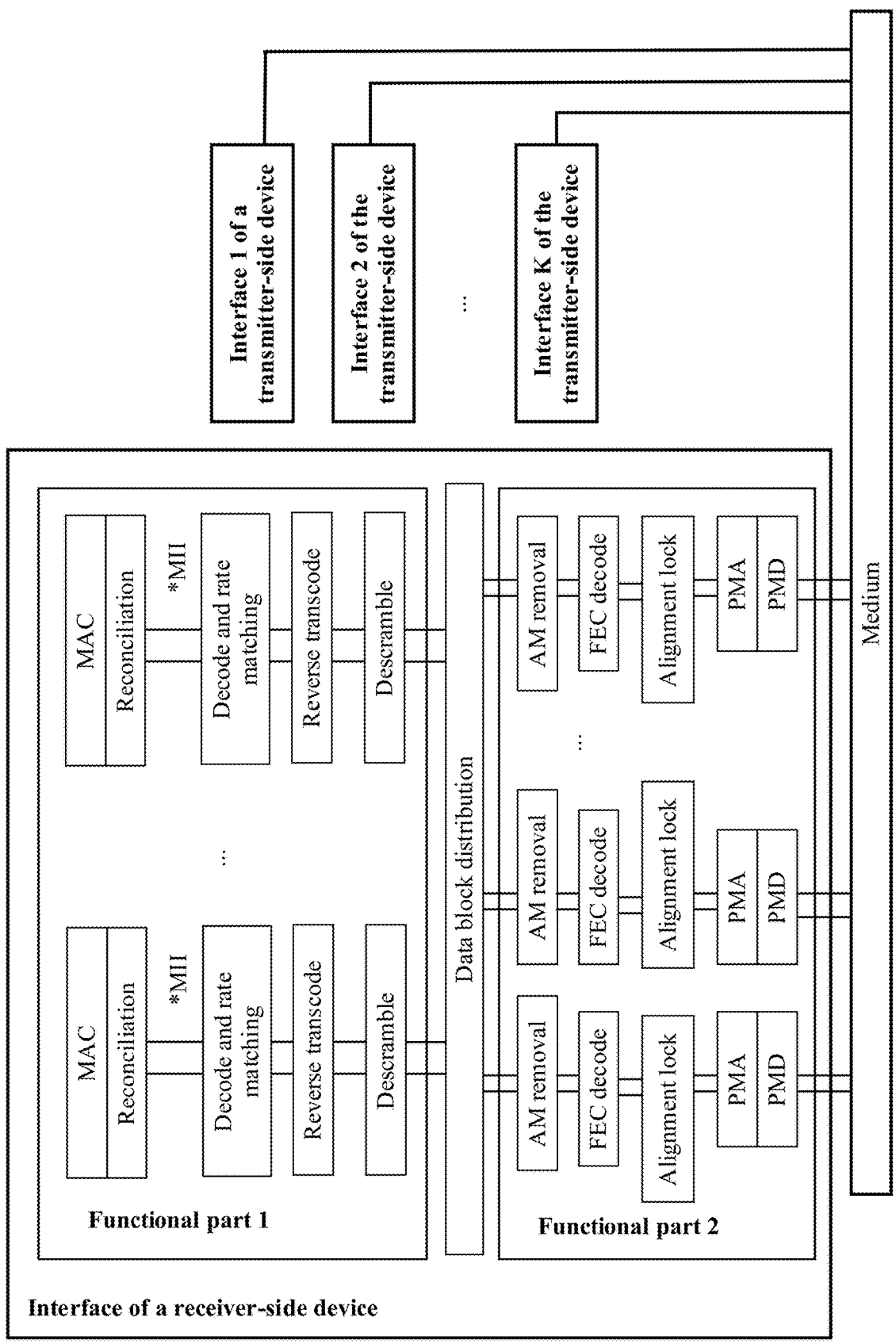
FIG. 12F is a schematic diagram of another communication system including a receiver-side device with an interface corresponding to the interface in FIG. 6C and a transmitter-side device with an IEEE 802.3 standard interface.

Refer to FIG. 12F. A communication system includes a receiver-side device and a plurality of transmitter-side devices. An interface of the transmitter-side device is an IEEE 802.3 standard Ethernet interface. The receiver-side device includes an interface corresponding to the interface shown in FIG. 6C, but further includes an alignment lock module between a PMA module and an FEC module; and the scramble module in FIG. 6C is replaced with a descramble module, and the alignment marker insertion (AM Insertion) module in FIG. 6C is replaced with an alignment marker removal (AM Removal) module. A process in which the interface of the transmitter-side device processes to-be-sent data is similar to an operation of the interface of the transmitter-side device in FIG. 12B. Details are not described herein again.

Figure 12G:
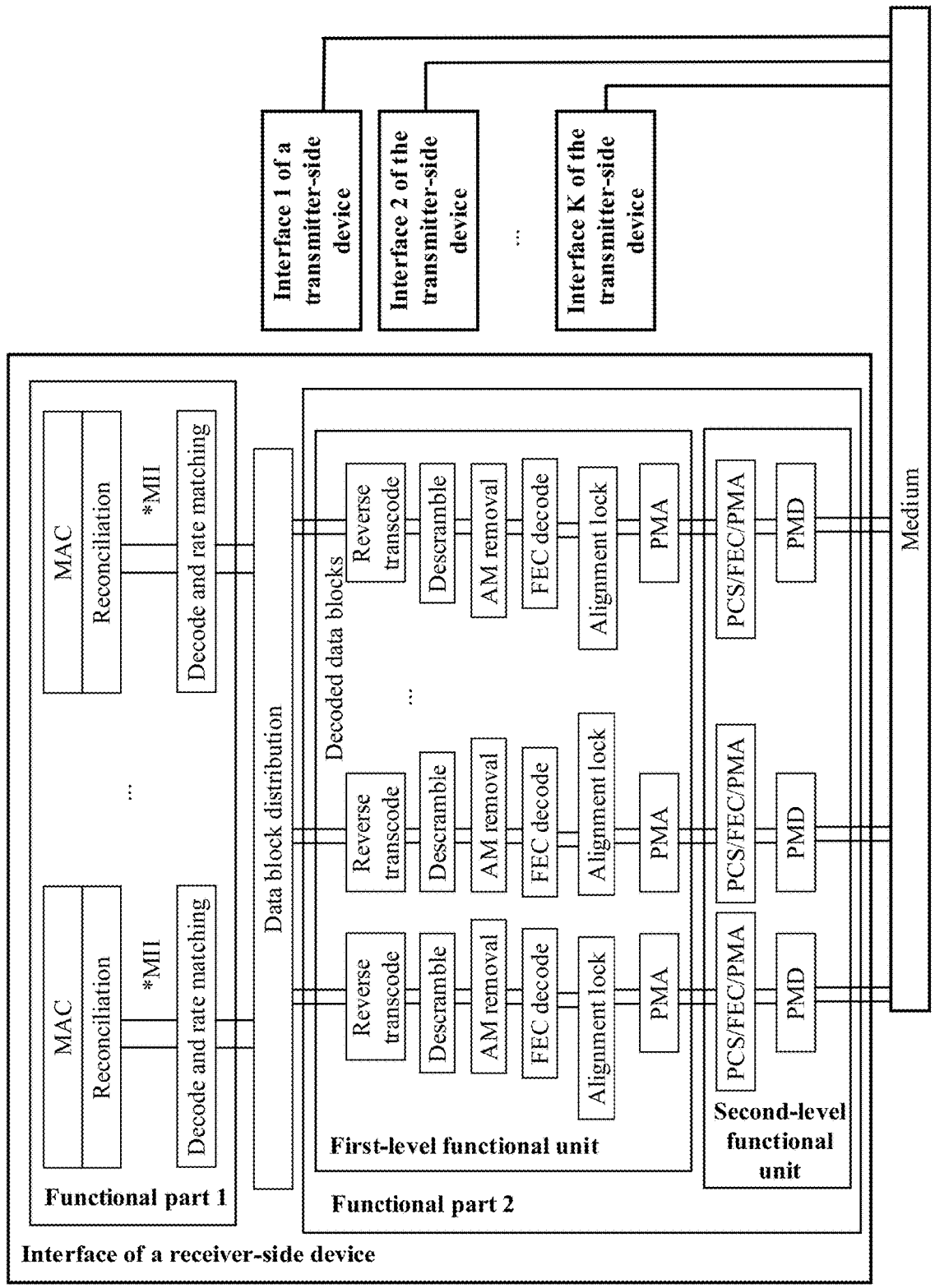
FIG. 12G is a schematic diagram of another communication system including a receiver-side device with an interface corresponding to the interface in FIG. 7A and a transmitter-side device with an IEEE 802.3 standard interface.

Refer to FIG. 12G. A communication system includes a receiver-side device and a plurality of transmitter-side devices. An interface of the transmitter-side device is an IEEE 802.3 standard Ethernet interface. The receiver-side device includes an interface corresponding to the interface shown in FIG. 7A, but further includes an alignment lock module between a PMA module and an FEC module; and the scramble module in FIG. 7A is replaced with a descramble module, and the alignment marker insertion (AM Insertion) module in FIG. 7A is replaced with an alignment marker removal (AM Removal) module. A process in which the interface of the transmitter-side device processes to-be-sent data is similar to an operation of the interface of the transmitter-side device in FIG. 12B. Details are not described herein again.

For functional units in a functional part 2 of an interface of a receiver-side device in embodiments of this application, if there is only a single PCS lane, only alignment lock needs to be performed; or if there are a plurality of PCS lanes, lane deskew needs to be performed between the lanes after alignment lock.

In some embodiments, for functional units in a functional part 2 of an interface of a receiver-side device, an FEC decode module may be shared. To be specific, a plurality of functional units or all functional units in the functional part 2 share a same FEC decode module, and the same FEC decode module performs FEC decode on data from another module in the plurality of functional units or all the functional units.

Figure 13:
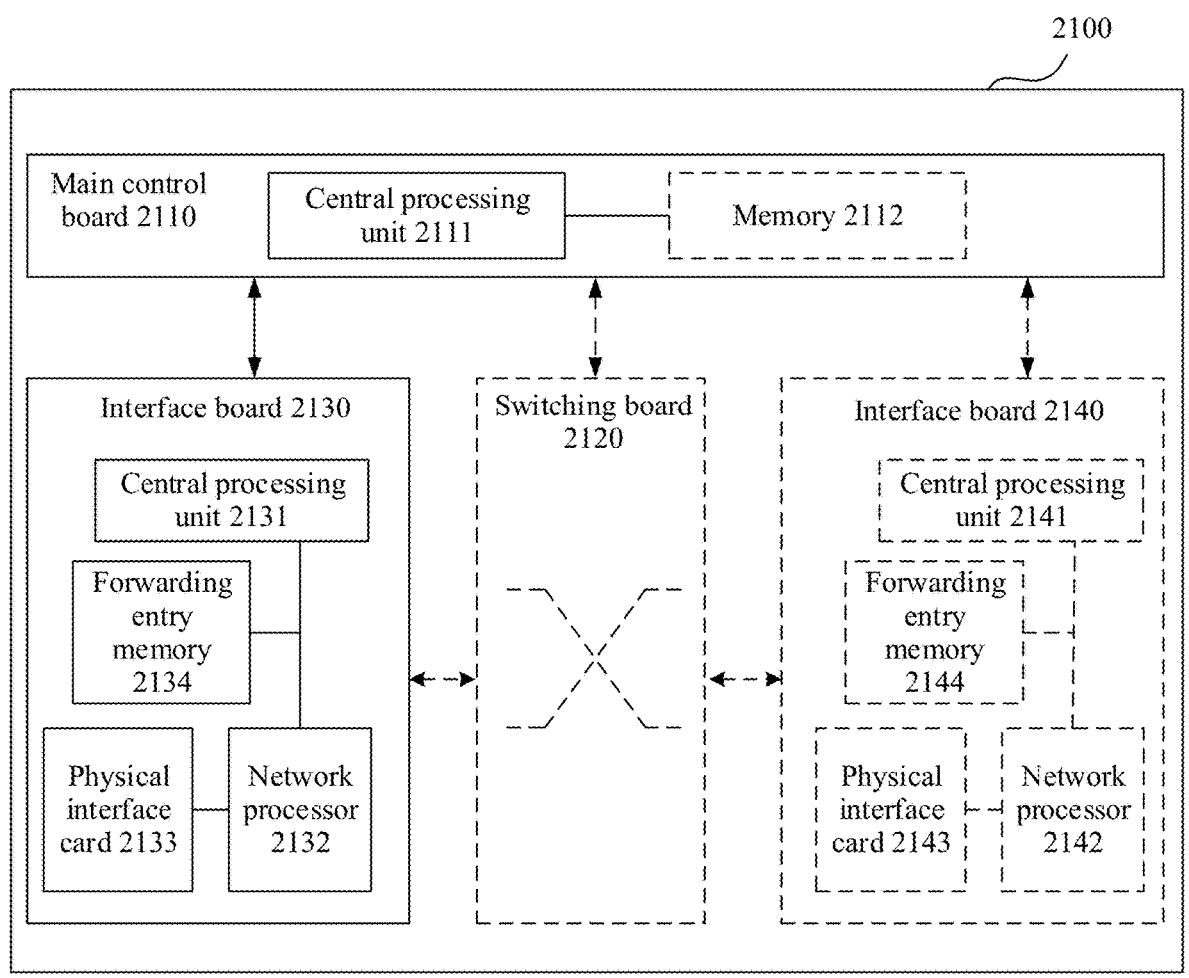
FIG. 13 is a schematic diagram of a structure of an apparatus according to an embodiment.

FIG. 13 is a schematic diagram of a structure of an apparatus 2100 according to an example embodiment of this application. The apparatus 2100 is, for example, a switch or a router, and the apparatus 2100 may be implemented using a bus architecture.

As shown in FIG. 13, the apparatus 2100 includes a main control board 2110 and an interface board 2130. The interface board 2130 includes any interface shown in FIG. 3 to FIG. 12.

The main control board is also referred to as a main processing unit (MPU) or a route processor card. The main control board 2110 is configured to control and manage components in the apparatus 2100, including route computation, device management, device maintenance, and protocol-based processing. The main control board 2110 includes a central processing unit 2111 and a memory 2112.

The interface board 2130 is also referred to as a line processing unit (LPU), a line card, or a service board. The interface board 2130 is configured to: provide various service interfaces, and forward a data packet. The service interfaces include but are not limited to an Ethernet interface, a POS (Packet over SONET/SDH) interface, and the like. The Ethernet interface is, for example, a flexible Ethernet service interface. The interface board 2130 includes a central processing unit 2131, a network processor 2132, a forwarding entry memory 2134, and a physical interface card (physical interface card, PIC) 2133.

The central processing unit 2131 on the interface board 2130 is configured to: control and manage the interface board 2130, and communicate with the central processing unit 2111 on the main control board 2110.

The network processor 2132 is configured to forward a packet. A form of the network processor 2132 may be a forwarding chip. The forwarding chip may be a network processor (NP). In some embodiments, the forwarding chip may be implemented using an application-specific integrated circuit (ASIC) or a field programmable gate array (FPGA). The network processor 2132 is configured to forward a received packet based on a forwarding table stored in the forwarding entry memory 2134. If a destination address of the packet is an address of the apparatus 2100, the network processor 2132 sends the packet to a CPU (for example, the central processing unit 2131) for processing. If a destination address of the packet is not an address of the apparatus 2100, the network processor 2132 searches for, based on the destination address, a next hop and an outbound interface corresponding to the destination address in the forwarding table, and forwards the packet to the outbound interface corresponding to the destination address. Processing on an uplink packet may include processing at a packet ingress interface and forwarding table lookup, and processing on a downlink packet may include forwarding table lookup and the like. In some embodiments, the central processing unit may also perform a function of the forwarding chip, for example, implement software forwarding based on a general-purpose CPU. Therefore, the forwarding chip is not required in the interface board.

The physical interface card 2133 is configured to implement a physical layer interconnection function. Original traffic enters the interface board 2130 from the physical interface card 2133, and a processed packet is sent out from the physical interface card 2133. The physical interface card 2133, also referred to as a subcard, may be mounted on the interface board 2130, and is responsible for converting an optical/electrical signal into a packet, performing validity check on the packet, and forwarding the packet to the network processor 2132 for processing. In some embodiments, the central processing unit 2131 may also perform a function of the network processor 2132, for example, implement software forwarding based on a general-purpose CPU. Therefore, the network processor 2132 is not required in the physical interface card 2133.

Optionally, the apparatus 2100 includes a plurality of interface boards. For example, the apparatus 2100 further includes an interface board 2140, and the interface board 2140 includes a central processing unit 2141, a network processor 2142, a forwarding entry memory 2144, and a physical interface card 2143. Functions and implementations of components in the interface board 2140 are the same as or similar to those of the interface board 2130, and details are not described herein again. The interface board includes one or more interfaces described in the foregoing embodiments.

Optionally, the apparatus 2100 further includes a switching board 2120. The switching board 2120 may also be referred to as a switch fabric unit (SFU). When the apparatus has a plurality of interface boards, the switching board 2120 is configured to complete data exchange between the interface boards. For example, the interface board 2130 and the interface board 2140 may communicate with each other via the switching board 2120.

The main control board 2110 is coupled to the interface board. For example: the main control board 2110, the interface board 2130, the interface board 2140, and the switching board 2120 are connected to a system backplane through a system bus to implement interworking. In a possible implementation, inter-process communication (IPC) channels are established between the main control board 2110 and the interface board 2130 and between the main control board 2110 and the interface board 2140, and the main control board 2110 communicates with the interface board 2130 and the interface board 2140 through the IPC channels.

Logically, the apparatus 2100 includes a control plane and a forwarding plane. The control plane includes the main control board 2110 and the central processing unit 2111. The forwarding plane includes components used for forwarding, for example, the forwarding entry memory 2134, the physical interface card 2133, and the network processor 2132. The control plane performs functions such as routing, generating a forwarding table, processing signaling and a protocol packet, and configuring and maintaining an apparatus status. The control plane delivers the generated forwarding table to the forwarding plane. On the forwarding plane, the network processor 2132 searches the forwarding table delivered by the control plane to forward a packet received by the physical interface card 2133. The forwarding table delivered by the control plane may be stored in the forwarding entry memory 2134. In some embodiments, the control plane and the forwarding plane may be totally separated, and are not on a same apparatus.

It should be noted that, there may be one or more main control boards, and when there are a plurality of main control boards, the main control boards may include a primary main control board and a secondary main control board. There may be one or more interface boards, and the more interface boards are provided, the stronger a data processing capability of the apparatus is. There may also be one or more physical interface cards on the interface board. There may be no switching board or one or more switching boards. When there are a plurality of switching boards, the plurality of switching boards may jointly implement load sharing and redundancy backup. In a centralized forwarding architecture, the switching board may be not required in the apparatus, and the interface board provides a function of processing service data of an entire system. In a distributed forwarding architecture, the apparatus may have at least one switching board, and data exchange between a plurality of interface boards is implemented using the switching board, to provide a large-capacity data exchange and processing capability. Therefore, a data access and processing capability of an apparatus of a distributed architecture is better than that of an apparatus of a centralized architecture. Optionally, the apparatus may alternatively be in a form in which there is only one card. To be specific, there is no switching board, and functions of the interface board and the main control board are integrated on the card. In this case, the central processing unit on the interface board and the central processing unit on the main control board may be combined to form one central processing unit on the card, to perform functions obtained by combining the two central processing units. This form of apparatus (for example, an apparatus such as a low-end switch or a router) has a weak data exchange and processing capability. A specific architecture that is to be used depends on a specific networking deployment scenario. This is not limited herein.

It should be understood that the processor may be a central processing unit (CPU), or may be another general-purpose processor, a digital signal processor (DSP), an application-specific integrated circuit ( ), a field-programmable gate array (FPGA) or another programmable logic device, a discrete gate or a transistor logic device, a discrete hardware component, or the like. The general-purpose processor may be a microprocessor or any conventional processor or the like. It should be noted that the processor may be a processor that supports an advanced reduced instruction set computing machines (ARM) architecture.

Further, in an optional embodiment, the memory may include a read-only memory and a random access memory, and provide instructions and data for the processor. The memory may further include a non-volatile random access memory. For example, the memory may further store information about a device type.

The memory may be a volatile memory or a non-volatile memory, or may include a volatile memory and a non-volatile memory. The non-volatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), used as an external cache. By way of example but not limitation, many forms of RAMs may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus random access memory (DR RAM).

Figure 14:
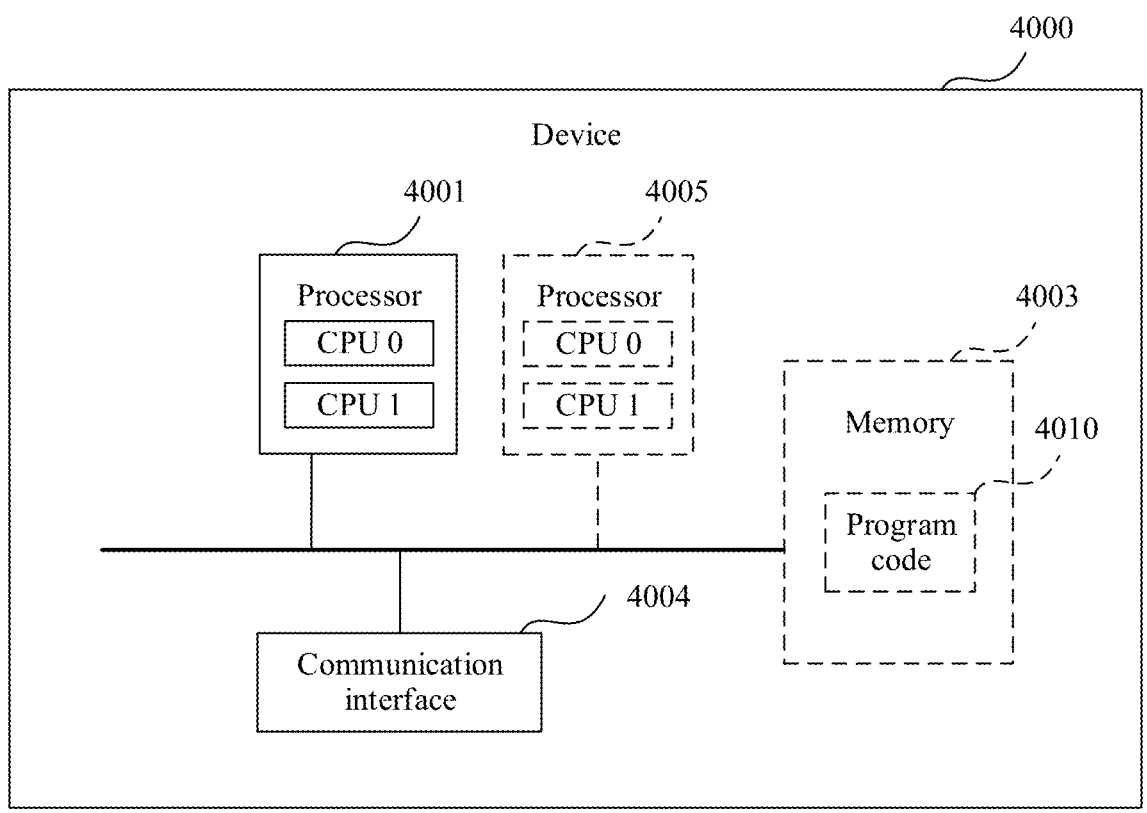
FIG. 14 is a schematic diagram of a structure of an apparatus according to an embodiment.

FIG. 14 is a schematic diagram of a structure of an apparatus 4000 according to an example embodiment of this application. The apparatus 4000 shown in FIG. 14 is configured to perform an operation related to a function of the interface shown in any one of FIG. 3 to FIG. 12. The apparatus 4000 is, for example, a switch, a router, a controller, or may be a server, a storage device, a network device, or the like. The apparatus 4000 may be implemented using a bus architecture.

As shown in FIG. 14, the apparatus 4000 includes at least one processor 4001 and at least one communication interface 4004. In some embodiments, the processor 4001 is coupled to a memory 4003.

The processor 4001 is, for example, a general-purpose central processing unit (CPU), a digital signal processor (DSP), a network processor (NP), a graphics processing unit (GPU), a neural network processing unit (NPU), a data processing unit (DPU), a microprocessor, or one or more integrated circuits configured to implement the solutions of this application. For example, the processor 4001 includes an application-specific integrated circuit (ASIC), a programmable logic device (PLD) or another programmable logic device, a transistor logic device, a hardware component, or any combination thereof. The PLD is, for example, a complex programmable logic device (CPLD), a field programmable logic gate array (FPGA), a generic array logic (GAL), or any combination thereof. The processor 4001 may implement or execute various logical blocks, modules, and circuits described with reference to content disclosed in embodiments of the present disclosure. Alternatively, the processor may be a combination of processors implementing a computing function, for example, a combination of one or more microprocessors, or a combination of a DSP and a microprocessor.

Optionally, the apparatus 4000 further includes a bus. The bus is configured to transmit information between components in the apparatus 4000. The bus may be a peripheral component interconnect (PCI) bus, an extended industry standard architecture (EISA) bus, or the like. The bus may be classified into an address bus, a data bus, a control bus, and the like. For ease of representation, only one bold line is for representing the bus in FIG. 14, but this does not mean that there is only one bus or only one type of bus.

The memory 4003 is, for example, a read-only memory (ROM) or another type of static storage device that can store static information and instructions, a random access memory (RAM) or another type of dynamic storage device that can store information and instructions, an electrically erasable programmable read-only memory (EEPROM), a compact disc read-only memory (CD-ROM) or another compact disc storage, an optical disc storage (including a compact disc, a laser disc, an optical disc, a digital versatile disc, a Blu-ray disc, or the like), a magnetic disk storage medium or another magnetic storage device, or any other medium that can be used to carry or store expected program code in a form of instructions or a data structure and that can be accessed by a computer, but is not limited thereto. For example, the memory 4003 exists independently, and is connected to the processor 4001 through the bus. Alternatively, the memory 4003 may be integrated with the processor 4001.

The communication interface 4004 is any apparatus such as a transceiver, and is configured to communicate with another device or a communication network. The communication network may be the Ethernet, a radio access network (RAN), a wireless local area network (WLAN), or the like. The communication interface 4004 may include a wired communication interface, and may further include a wireless communication interface. The communication interface 4004 may be an Ethernet interface, a fast Ethernet (FE) interface, a gigabit Ethernet (GE) interface, an asynchronous transfer mode (ATM) interface, a wireless local area network (WLAN) interface, a cellular network communication interface, or a combination thereof. The Ethernet interface may be an optical interface, an electrical interface, or a combination thereof. In this embodiment of this application, the communication interface 4004 may be used by the apparatus 4000 to communicate with another device.

In specific implementation, in an embodiment, the processor 4001 may include one or more CPUs, for example, a CPU 0 and a CPU 1 shown in FIG. 14. Each of the processors may be a single-core (single-CPU) processor, or may be a multi-core (multi-CPU) processor. The processor herein may be one or more devices, circuits, and/or processing cores configured to process data (for example, computer program instructions).

In specific implementation, in an embodiment, the apparatus 4000 may include a plurality of processors, for example, the processor 4001 and a processor 4005 shown in FIG. 14. Each of the processors may be a single-core processor (single-CPU) or may be a multi-core processor (multi-CPU). The processor herein may be one or more devices, circuits, and/or processing cores configured to process data (for example, computer program instructions).

In specific implementation, in an embodiment, the apparatus 4000 may further include an output device and an input device. The output device communicates with the processor 4001, and may display information in a plurality of manners. For example, the output device may be a liquid crystal display (LCD), a light emitting diode (LED) display device, a cathode ray tube (CRT) display device, a projector, or the like. The input device communicates with the processor 4001, and may receive an input from a user in a plurality of manners. For example, the input device may be a mouse, a keyboard, a touchscreen device, or a sensor device.

In some embodiments, the memory 4003 is configured to store program code 4010 for performing the solutions in this application, and the processor 4001 can execute the program code 4010 stored in the memory 4003. In other words, the apparatus 4000 may implement functions of the interface shown in any one of FIG. 3 to FIG. 12 using the processor 4001 and the program code 4010 in the memory 4003. The program code 4010 may include one or more software modules. Optionally, the processor 4001 may alternatively store program code or instructions for executing the solutions of this application.

In some embodiments, the communication interface 4004 is configured to perform an operation related to a function of the interface shown in any one of FIG. 3 to FIG. 12.

An embodiment of this application further provides a computer-readable storage medium. The storage medium stores at least one instruction, and the instruction is loaded and executed by a processor to implement functions of the interface shown in any one of FIG. 3 to FIG. 12.

An embodiment of this application provides a computer program (product). When the computer program is executed by a computer, a processor or the computer may be enabled to perform functions of the interface shown in any one of FIG. 3 to FIG. 12.

An embodiment of this application provides a chip, including a processor, configured to invoke, from a memory, instructions stored in the memory and run the instructions, so that a communication device in which the chip is installed performs functions of the interface shown in any one of FIG. 3 to FIG. 12.

An embodiment of this application further provides another chip, including an input interface, an output interface, a processor, and a memory. The input interface, the output interface, the processor, and the memory are connected to each other through an internal connection path. The processor is configured to execute code in the memory. When the code is executed, the processor is configured to perform functions of the interface shown in any one of FIG. 3 to FIG. 12.

In the foregoing embodiments, if a functional part 2 includes m flows of functional units, and a rate of a corresponding MAC data flow that can be processed by each functional unit is R, a maximum rate of a functional part 1 that can be supported by the functional part 2 is m*R. A value of m is usually an integer power of 2, for example, $m=2^k$, where $k=0, 1, 2, \ldots$; and a value of R is usually 5 Gbps, 10 Gbps, 25 Gbps, 50 Gbps, 100 Gbps, 200 Gbps, 400 Gbps, or the like.

In some embodiments, due to introduction of functions such as encoding, transcoding, and FEC to each functional unit, an actual output rate may be higher than nominal 100 Gbps and 200 Gbps. For example, for a MAC data flow of 100 Gbps, if 64B/66B encoding and 256B/257B transcoding are used, and RS (544,514) FEC encoding is added, a rate of the data flow is 106.25 Gbps; or if the FEC is RS (528,514), a rate after encoding is 103.125 Gbps. Generally, the rate is called 100G in the industry. The same applies to other rates.

When a quantity of functional units in the functional part 1 is n, corresponding $n*2^k$ functional units 2 may be used for support.

All or some of the foregoing embodiments may be implemented by software, hardware, firmware, or any combination thereof. When software is used to implement embodiments, all or some of embodiments may be implemented in a form of a computer program product. The computer program product includes one or more computer instructions. When the computer program instructions are loaded and executed on a computer, all or some of the procedures or functions in this application are generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), or a semiconductor medium (for example, a solid-state drive, SSD).

In the foregoing specific embodiments, the objectives, technical solutions, and beneficial effects of this application are further described in detail. It should be understood that the foregoing descriptions are merely specific embodiments of this application, but are not intended to limit the protection scope of this application. Any modification, equivalent replacement, improvement, or the like made based on the technical solutions of this application shall fall within the protection scope of this application.

A person of ordinary skill in the art may be aware that, method operations and modules described with reference to embodiments disclosed in this specification may be implemented by software, hardware, firmware, or a combination thereof. To clearly describe the interchangeability between the hardware and the software, the foregoing has generally described operations and compositions of each embodiment according to functions. Whether functions are performed in a hardware or software manner depends on particular applications and design constraint conditions of the technical solutions. A person of ordinary skill in the art may use different methods to implement the described functions for each particular application, but it should not be considered that the implementation goes beyond the scope of this application.

A person of ordinary skill in the art may understand that all or some of the operations of embodiments may be implemented by hardware or a program instructing related hardware. The program may be stored in a computer-readable storage medium. The storage medium may be a read-only memory, a magnetic disk, or an optical disc, or the like.

When software is used to implement embodiments, all or some of embodiments may be implemented in a form of a computer program product. The computer program product includes one or more computer program instructions. For example, the method in embodiments of this application may be described in a context of machine-executable instructions. The machine-executable instructions are, for example, included in program modules executed in a component on a target real or virtual processor. Generally, the program modules include a routine, a program, a library, an object, a class, a component, a data structure, and the like, and performs a specific task or implements a specific abstract data structure. In various embodiments, functions of the program modules may be combined or divided between the described program modules. The machine-executable instructions for the program modules may be executed locally or within a distributed device. In the distributed device, the program modules may be located in both a local storage medium and a remote storage medium.

Computer program code used to implement the method in embodiments of this application may be written in one or more programming languages. The computer program code may be provided for a processor of a general-purpose computer, a dedicated computer, or another programmable data processing apparatus, so that functions/operations specified in the flowcharts and/or block diagrams are implemented when the program code is executed by the computer or the another programmable data processing apparatus. All of the program code may be executed on a computer, or some may be executed on a computer as a standalone software package, or some may be executed on a computer while some is executed on a remote computer, or all of the program code may be executed on a remote computer or a server.

In the context of embodiments of this application, the computer program code or related data may be carried by any appropriate carrier, so that a device, an apparatus, or a processor can perform various processing and operations described above. An example of the carrier includes a signal, a computer-readable medium, and the like.

An example of the signal may include an electrical signal, an optical signal, a radio signal, a sound signal, or a propagation signal in another forms, such as a carrier wave and an infrared signal.

A machine-readable medium may be any tangible medium that includes or stores a program used for or related to an instruction execution system, apparatus, or device. The machine-readable medium may be a machine-readable signal medium or a machine-readable storage medium. The machine-readable medium may include but is not limited to an electronic, magnetic, optical, electromagnetic, infrared, or semiconductor system, apparatus, or device, or any appropriate combination thereof. A more-detailed example of the machine-readable storage medium includes an electrical connection with one or more wires, a portable computer disk, a hard disk, a random access memory (RAM), a read-only memory (ROM), an erasable programmable read-only memory (EPROM), a flash memory, an optical storage device, a magnetic storage device, or any appropriate combination thereof.

It may be clearly understood by a person skilled in the art that, for the purpose of convenient and brief description, for a detailed working process of the foregoing system, device, and module, refer to a corresponding process in the foregoing method embodiment, and details are not described herein.

In the several embodiments provided in this application, it should be understood that the disclosed system, device, and method may be implemented in other manners. For example, the described device embodiment is merely an example. For example, the module division is merely logical function division and may be other division in actual implementation. For example, a plurality of modules or components may be combined or integrated into another system, or some features may be ignored or not performed. In addition, the displayed or discussed mutual couplings or direct couplings or communication connections may be implemented through some interfaces. Indirect couplings or communication connections between the devices or modules may be electrical connections, mechanical connections, or connections in other forms.

The modules described as separate parts may or may not be physically separate, and parts displayed as modules may or may not be physical modules, may be located in one position, or may be distributed on a plurality of network modules. Some or all of the modules may be selected according to actual requirements to achieve the objectives of the solutions in embodiments of this application.

In addition, functional modules in embodiments of this application may be integrated into one processing module, or each of the modules may exist alone physically, or two or more modules may be integrated into one module. The integrated module may be implemented in a form of hardware, or may be implemented in a form of a software functional module.

When the integrated module is implemented in the form of a software functional module and sold or used as an independent product, the integrated unit may be stored in a computer-readable storage medium. Based on such an understanding, the technical solutions of this application essentially, or the part contributing to the conventional technology, or all or some of the technical solutions may be implemented in the form of a software product. The computer software product is stored in a storage medium and includes several instructions for indicating a computer device (which may be a personal computer, a server, a network device, or the like) to perform all or some of the operations of the method described in embodiments of this application. The foregoing storage medium includes any medium that can store program code, such as a USB flash drive, a removable hard disk, a read-only memory (ROM), a random access memory (RAM), a magnetic disk, or an optical disc.

In this application, the terms such as "first" and "second" are used to distinguish between same or similar items whose effects and functions are basically the same. It should be understood that there is no logical or time-sequence dependency between "first", "second", and "$n^{th}$", and a quantity and an execution sequence are not limited. It should be further understood that although the terms such as "first" and "second" are used in the following descriptions to describe various elements, these elements should not be limited by the terms. These terms are merely used to distinguish one element from another element. For example, without departing from the scope of the various examples, a first image may be referred to as a second image, and similarly, a second image may be referred to as a first image. Both the first image and the second image may be images, and in some cases, may be separate and different images.

It should be further understood that sequence numbers of processes do not mean execution sequences in various embodiments of this application. The execution sequences of the processes should be determined based on functions and internal logic of the processes, and should not be construed as any limitation on the implementation processes of embodiments of this application.

In this application, the term "at least one" means one or more, and the term "a plurality of" means two or more. For example, a plurality of second packets mean two or more second packets. The terms "system" and "network" may be used interchangeably in this specification.

It should be understood that the terms used in the descriptions of various examples in this specification are merely intended to describe specific examples but are not intended to constitute a limitation. The terms "one" ("a" and "an") and "the" of singular forms used in the descriptions of various examples and the appended claims are also intended to include plural forms, unless otherwise specified in the context clearly.

It should be further understood that the term "include" (also referred to as "includes", "including", "comprises", and/or "comprising") used in this specification specifies presence of the stated features, integers, operations, operations, elements, and/or components, with presence or addition of one or more other features, integers, operations, operations, elements, components, and/or their components not excluded.

It should be further understood that the term "if" may be interpreted as a meaning "when" ("when" or "upon"), "in response to determining", or "in response to detecting". Similarly, according to the context, the phrase "if it is determined that" or "if (a stated condition or event) is detected" may be interpreted as a meaning of "when it is determined that" or "in response to determining" or "when (a stated condition or event) is detected" or "in response to detecting (a stated condition or event)".

It should be understood that determining B based on A does not mean that B is determined based on only A, but B may alternatively be determined based on A and/or other information.

It should further be understood that "one embodiment", "an embodiment", or "a possible implementation" mentioned throughout this specification means that particular features, structures, or characteristics related to the embodiments or implementations are included in at least one embodiment of this application. Therefore, "in one embodiment", "in an embodiment", or "in a possible implementation" appearing throughout this specification does not necessarily mean a same embodiment. In addition, these particular features, structures, or characteristics may be combined in one or more embodiments by using any appropriate manner.

The foregoing descriptions are merely optional embodiments of this application, but are not intended to limit this application. Any modification, equivalent replacement, or improvement made without departing from the principle of this application should fall within the protection scope of this application.

What is claimed is:

1. A transmitting device, comprising:
   a transcode circuit;
   an encode and rate matching circuit directly connected to the transcode circuit;
   a data block distribution circuit directly connected to the transcode circuit; and
   multiple groups of circuits coupled to the data block distribution circuit, wherein each of the multiple groups of circuits comprises a scramble circuit, an alignment marker insertion circuit, and a forward error correction (FEC) encode circuit, the scramble circuit of each of the multiple groups of circuits is directly connected to the data block distribution circuit.

2. The transmitting device according to claim 1, wherein a sum of rates of the multiple groups of circuits matches a medium access control (MAC) rate of the encode and rate matching circuit.

3. The transmitting device according to claim 1, further comprising a physical coding sublayer (PCS) circuit configured to perform interleaving on a first data based on an FEC symbol, wherein the first data is output by the FEC encode circuit.

4. The transmitting device according to claim 3, further comprising a physical medium attachment (PMA) circuit configured to interleave second data, wherein the second data is obtained after interleaving is performed on the first data based on the FEC symbol.

5. The transmitting device according to claim 1, wherein the FEC encode circuit is a first-level FEC encode circuit in concatenated FEC encode circuits.

6. The transmitting device according to claim 5, wherein the first-level FEC encode circuit is configured to perform Reed-Solomon (RS) FEC.

7. The transmitting device according to claim 1, wherein the transmitting device further comprises a reconciliation sublayer circuit coupled to the encode and rate matching circuit via a media independent interface (MII).

8. The transmitting device according to claim 2, wherein the MAC rate is 1.6 Tb/s, the multiple groups of circuits comprise two groups of circuits, and a rate of each of the two groups of circuits is 800 Gb/s.

9. The transmitting device according to claim 1, wherein the transcode circuit is configured to perform a 64B/66B-to-256B/257B transcode.

10. A receiving device, comprising:
    a reverse transcode circuit;
    a decode and rate matching circuit directly connected to the reverse transcode circuit;
    a data block distribution circuit directly connected to the reverse transcode circuit; and
    multiple groups of circuits coupled to the data block distribution circuit, wherein each of the multiple groups of circuits comprises a descramble circuit, an alignment marker removal circuit, and a forward error correction (FEC) decode circuit, the descramble circuit of each of the multiple groups of circuits is directly connected to the data block distribution circuit.

11. The receiving device according to claim 10, wherein a sum of rates of the multiple groups of circuits matches a medium access control (MAC) rate of the decode and rate matching circuit.

12. The receiving device according to claim 10, further comprising an alignment lock circuit.

13. The receiving device according to claim 10, wherein the FEC decode circuit is a first-level FEC decode circuit in concatenated FEC decode circuits.

14. The receiving device according to claim 10, further comprising a reconciliation sublayer circuit coupled to the decode and rate matching circuit via a media independent interface (MII).

15. The receiving device according to claim 11, wherein the MAC rate is 1.6 Tb/s the multiple groups of circuits comprise two groups of circuits, and a rate of each of the two groups of circuits is 800 Gb/s.

16. The receiving device according to claim 10, wherein the reverse transcode circuit is configured to perform a 256B/257B-to-64B/66B reverse transcode.

17. A transmission method, comprising:
encoding and rate matching on first data to obtain second data;
transcoding the second data to obtain transcoded data;
distributing the transcoded data to obtain a first portion of the transcoded data and a second portion of the transcoded data;
scrambling, by a first group of circuits, the first portion of the transcoded data to obtain first scrambled data;
inserting, by the first group of circuits, a first alignment mark into the first scrambled data to obtain first alignment data;
encoding, by the first group of circuits, according to a forward error correction (FEC) code, the first alignment data to obtain first encoded data;
scrambling, by a second group of circuits, the second portion of the transcoded data to obtain second scrambled data;
inserting, by the second group of circuits, a second alignment mark into the second scrambled data to obtain second alignment data; and
encoding, by the second group of circuits, according to the FEC code, the second alignment data to obtain second encoded data.

18. The method according to claim 17, wherein a sum of rates of the first group of circuits and the second group of circuits matches a medium access control (MAC) rate for the first data.

19. The method according to claim 17, wherein the method further comprises:
interleaving the first encoded data based on an FEC symbol at a physical coding sublayer (PCS) to obtain first symbol interleaved data; and
interleaving the second encoded data based on the FEC symbol at the PCS to obtain second symbol interleaved data.

20. The method according to claim 19, wherein the method further comprises:
interleaving the first symbol interleaved data at a physical medium attachment (PMA) to obtain first interleaved data; and
interleaving the second symbol interleaved data at the PMA to obtain second interleaved data.

21. The method according to claim 17, wherein the encoding process according to the FEC code is a first-level FEC encode process in concatenated FEC encoding processes.

22. The method according to claim 21, wherein the first-level FEC encoding process is configured to perform Reed-Solomon (RS) FEC.

23. The method according to claim 18, wherein the MAC rate is 1.6 Tb/s and a rate of the first group of circuits is 800 Gb/s and a rate of the second group of circuits is 800 Gb/s.

24. The method according to claim 17, wherein the transcoding is configured to perform a 64B/66B-to-256B/257B transcode.

25. A transmission method, comprising:
decoding, by a first group of circuits, according to a forward error correction (FEC) code, first data to obtain first decoded data;
removing, by the first group of circuits, a first alignment mark from the first decoded data to obtain first alignment removal data;
descrambling, by the first group of circuits, the first alignment removal data to obtain the first descrambled data;
decoding, by a second group of circuits, according to the FEC code, second data to obtain second decoded data;
removing, by the second group of circuits, a second alignment mark from the second decoded data to obtain second alignment removal data;
descrambling, by the second group of circuits, the second alignment removal data to obtain the second descrambled data;
distributing the first descrambled data and the second descrambled data to obtain distributed data;
reverse transcoding the distributed data to obtain reverse transcoded data; and
decoding and rate matching on the reverse transcoded data to obtain third data.

26. The method according to claim 25, wherein a sum of rates of the first group of circuits and the second group of circuits matches a medium access control (MAC) rate for the third data.

27. The method according to claim 25, wherein the decoding process according to the FEC code is a first-level FEC decode process in concatenated FEC decoding processes.

28. The method according to claim 26, wherein the MAC rate is 1.6 Tb/s and a rate of the first group of circuits is 800 Gb/s and a rate of the second group of circuits is 800 Gb/s.

29. The method according to claim 25, wherein the reverse transcoding is configured to perform a 256B/257B-to-64B/66B reverse transcode.

* * * * *